United States Patent
Said et al.

(10) Patent No.: US 12,147,093 B2
(45) Date of Patent: Nov. 19, 2024

(54) DIFFUSION OF NANOPARTICLES INTO TRANSPARENT PLASTIC

(71) Applicant: Rise Nano Optics Ltd., Haifa (IL)

(72) Inventors: Inas Saleh Said, Haifa (IL); Mahmud Ibrahem Diab, Tamra (IL)

(73) Assignee: Rise Nano Optics Ltd., Haifa (IL)

( * ) Notice: Subject to any disclaimer, the term of this patent is extended or adjusted under 35 U.S.C. 154(b) by 0 days.

(21) Appl. No.: 18/674,963

(22) Filed: May 27, 2024

(65) Prior Publication Data
US 2024/0353693 A1    Oct. 24, 2024

Related U.S. Application Data

(63) Continuation of application No. 18/284,305, filed as application No. PCT/IL2022/051080 on Oct. 11, 2022, now Pat. No. 11,994,755.
(Continued)

(51) Int. Cl.
*G02C 7/10* (2006.01)
*B82B 3/00* (2006.01)
*B82Y 20/00* (2011.01)

(52) U.S. Cl.
CPC ............ *G02C 7/102* (2013.01); *B82B 3/0014* (2013.01); *B82Y 20/00* (2013.01); *G02C 7/107* (2013.01)

(58) Field of Classification Search
CPC ... B82Y 30/00; B82Y 20/00; B29D 11/00038; B29D 11/00346; B01J 8/00; G02C 7/102; G02C 7/107; B82B 3/0014
See application file for complete search history.

(56) References Cited

U.S. PATENT DOCUMENTS

| | | |
|---|---|---|
| 4,861,561 A | 8/1989 | Pritchard |
| 4,878,748 A | 9/1989 | Johansen et al. |
(Continued)

FOREIGN PATENT DOCUMENTS

| | | |
|---|---|---|
| CN | 103524037 | 1/2014 |
| IL | 40403 | 4/1976 |
(Continued)

OTHER PUBLICATIONS

Communication Pursuant to Article 94(3) EPC Dated Mar. 26, 2024 From the European Patent Office Re. Application No. 19799581.4 (3 Pages).
(Continued)

*Primary Examiner* — Collin X Beatty

(57) ABSTRACT

A method of preparing an optical element made of a transparent plastic with embedded nanoparticles, the method comprising:
  a) activating the surface of the optical element by attaching sulfate groups to the surface, comprising immersing the optical element in an aqueous solution of sulfuric acid for a period of time at a maintained activation temperature range; and
  b) exposing the activated surface to nanoparticles, and allowing the nanoparticles to diffuse into the optical element;
wherein a concentration of the sulfuric acid solution, the maintained activation temperature range, and the period of time are selected to:
  i) activate the surface sufficiently to at least double a diffusion rate of the nanoparticles into the optical element compared to a diffusion rate of the nanoparticles into the optical element using a same protocol but without activating its surface; and
(Continued)

ii) not cause visible damage to the optical quality of the optical element.

18 Claims, 25 Drawing Sheets

Related U.S. Application Data

(60) Provisional application No. 63/354,740, filed on Jun. 23, 2022, provisional application No. 63/272,744, filed on Oct. 28, 2021.

(56) References Cited

U.S. PATENT DOCUMENTS

| | | | |
|---|---|---|---|
| 5,617,154 | A | 4/1997 | Hoffman |
| 7,078,071 | B2 | 7/2006 | Taketomi et al. |
| 8,345,364 | B2 | 1/2013 | Liberman et al. |
| 8,736,992 | B2 | 5/2014 | Ofir et al. |
| 8,833,937 | B2 | 9/2014 | Shehadeh et al. |
| 9,927,635 | B2 | 3/2018 | Ishak et al. |
| 2001/0029752 | A1 | 10/2001 | Natan et al. |
| 2006/0021468 | A1 | 2/2006 | Ah et al. |
| 2007/0139792 | A1 | 6/2007 | Sayag |
| 2012/0040175 | A1 | 2/2012 | Hurst et al. |
| 2014/0124715 | A1 | 5/2014 | Ofir et al. |
| 2015/0225287 | A1 | 8/2015 | Amin et al. |
| 2016/0090446 | A1 | 3/2016 | Sun et al. |
| 2018/0079953 | A1 | 3/2018 | Shin et al. |
| 2019/0106354 | A1 | 4/2019 | Martin et al. |
| 2020/0131435 | A1* | 4/2020 | Pousthomis ............ B01J 19/06 |
| 2020/0363659 | A1 | 11/2020 | Ambler et al. |
| 2021/0116617 | A1 | 4/2021 | Said et al. |
| 2024/0085727 | A1 | 3/2024 | Said et al. |

FOREIGN PATENT DOCUMENTS

| | | |
|---|---|---|
| TW | 201133620 | 10/2011 |
| WO | WO 2006/135390 | 12/2006 |
| WO | WO 2008/028217 | 3/2008 |
| WO | WO 2010/106370 | 9/2010 |
| WO | WO 2013/084176 | 6/2013 |
| WO | WO 2014/124348 | 8/2014 |
| WO | WO 2019/166472 | 9/2019 |
| WO | WO 2019/215630 | 11/2019 |
| WO | WO 2019/215630 A9 | 11/2019 |
| WO | WO 2016/033425 | 6/2021 |
| WO | WO 2023/073685 | 5/2023 |

OTHER PUBLICATIONS

International Preliminary Report on Patentability Dated May 10, 2024 From the International Bureau of WIPO Re. Application No. PCT/IL2022/051080 (16 Pages).
International Preliminary Report on Patentability Dated Nov. 19, 2020 From the International Bureau of WIPO Re. Application No. PCT/IB2019/053773. (10 Pages).
International Search Report and the Written Opinion Dated Nov. 13, 2019 From the International Searching Authority Re. Application No. PCT/IB2019/053773. (14 Pages).
International Search Report and the Written Opinion Dated Mar. 22, 2023 From the International Searching Authority Re. Application No. PCT/IL2022/051080 (21 Pages).
Invitation to Pay Additional Fees Dated Jan. 9, 2023 From International Searching Authority Re. Application No. PCT/IL2022/051080. (3 Pages).
Invitation to Pay Additional Fees Dated Aug. 21, 2019 From the International Searching Authority Re. Application No. PCT/IB2019/053773. (2 Pages).
Notice of Allowance Dated Jan. 24, 2024 From the US Patent and Trademark Office Re. U.S. Appl. No. 18/284,305. (11 Pages).
Official Action Dated Mar. 1, 2024 From the US Patent and Trademark Office Re. U.S. Appl. No. 17/047,420. (34 Pages).
Restriction Official Action Dated Aug. 4, 2023 From the US Patent and Trademark Office Re. U.S. Appl. No. 17/047,420. (7 pages).
Supplementary European Search Report and the European Search Opinion Dated Apr. 14, 2022 From the European Patent Office Re. Application No. 19799581.4. (16 Pages).
Supplementary Partial European Search Report and the Provisional Opinion Dated Dec. 7, 2021 From the European Patent Office Re. Application No. 19799581.4. (15 Pages).
Ahmad et al. "Effect of Reaction Time on Green Synthesis of Gold Nanoparticles by Using Aqueous Extract of *Elaise guineensis* (Oil Palm Leaves)", 4th International Conference on Process Engineering and Advanced Materials, ICPEAM 2016, Kuala Lumpuralaysia, Aug. 15-17, 2016, Procedia Engineering 148: 467-472, Aug. 15, 2016.
Andrawus et al. "Light Modulates Ocular Complications in An Albino Rat Model of Type 1 Diabetes Mellitus", Translational Visual Science & Technology, 6(4): 1-1-1-13, Jul. 3, 2017.
Brust et al. "Synthesis of Thiol-Derivatised Gold Nanoparticles in A Two-Phase Liquid-Liquid System", Journal of the Chemical Society, Chemical Communications, 1994(7): 801-802, 1994.
Daruich de Souza et al. "Review of the Methodologies Used in the Synthesis Gold Nanoparticles by Chemical Reduction", Journal of Alloys and Compounds, 798: 714-740, Available Online May 28, 2019.
Epifani et al. "Sol-Gel Synthesis and Characterization of Ag and Au Nanoparticles in $SiO_2$, $TiO_2$, and $ZrO_2$ Thin Films", Journal of the American Ceramic Society, 83(10: 2385-2393, Dec. 20, 2004.
Fu et al. "Shape-Controlled Synthesis of Highly Monodisperse and Small Size Gold Nanoparticles", Science in China Series B: Chemsitry, 50(4): 494-500, Aug. 2007.
Gu et al. "Preparation and Antibacterial Properties of Gold Nanoparticles: A Review", Environmental Chemistry Letters, 19(1): 167-187, Published Online Aug. 12, 2020.
Hajipour et al. "Antibacterial Properties of Nanoparticles", Trends in Biotechnology, 30(10): 499-511, Published Online Aug. 9, 2012.
Li et al. "Z-Scan Study on A Silver Nanoparticles Embedded $TeO_2$-$SiO_2$ Glass Prepared by Sol-Gel Method", Key Engineering Materials, 768: 239-245, Published Online Apr. 25, 2018.
Llordes et al. "Tunable Near-Infrared and Visible-Light Transmittance in Nanocrystal-in-Glass Composites", Nature, 500(7462): 323-326, Aug. 15, 2013.
Murayama et al. "Deposition of Gold Nanoparticles on Niobium Pentoxide With Different Crystal Structures for Room-Temperature Carbon Monoxide Oxidation", ChemCatChem Communications, 8(16): 2620-2624, Published Online Jul. 14, 2016.
Polte "Fundamental Growth Principles of Colloid Metal Nanoparticles—A New Perspective", CrystEngComm, 17(36): 6809-6830, Jun. 23, 2015.
Preller et al. "Non-Aqueous Sol-Gel Synthesis of FePt Nanoparticles in the Absence of In Situ Stabilizers", Nanomaterials, 8(5): 297-1-297-16, Published Online May 3, 2018.
Yaghoubi et al. "Self Cleaning $TiO_2$ Coating on Polycarbonate: Surface Treatment, Photocatalytic and Nanomechanical Properties", Surface & Coatings Technology, 204(9-10): 1562-1568, Available Online Oct. 8, 2009.

\* cited by examiner

DIFFUSION OF NANOPARTICLES INTO TRANSPARENT PLASTIC

RELATED APPLICATIONS

This application is a Continuation of U.S. patent application Ser. No. 18/284,305, filed on Sep. 27, 2023, which is a National Phase of PCT Patent Application No. PCT/IL2022/051080 having International Filing Date of Oct. 11, 2022, which claims the benefit of priority under 35 USC § 119 (e) of U.S. Provisional Patent Application No. 63/354,740, filed on Jun. 23, 2022, and U.S. Provisional Patent Application No. 63/272,744, filed on Oct. 28, 2021.

PCT Patent Application No. PCT/IL2022/051080 is also related to PCT Patent Application No. PCT/IB2019/053773 having International Filing Date of May 8, 2019, which claims the benefit of priority under 35 USC § 119 (e) of U.S. Provisional Patent Application No. 62/668,278 filed on May 8, 2018.

The contents of the above applications are all incorporated by reference as if fully set forth herein in their entirety.

FIELD AND BACKGROUND OF THE INVENTION

The present invention, in some embodiments thereof, relates to a transparent optical element with embedded nanoparticles and a method of manufacturing such an optical element and, more particularly, but not exclusively, to a plastic lens used for eyeglasses with embedded gold or silver nanoparticles.

It is known that exposure to ultraviolet light can be harmful to the eyes, and even exposure to visible light, between 400 nm and 530 nm, is potentially harmful to the eyes, particularly for people who are diabetic. Evidence for this is provided, for example, by a study done by Elias Andrawus et al, "Light Modulates Ocular Complications in an Albino Rat Model of Type 1 Diabetes Mellitus" *Translational Vision Sci. & Tech.* (2017) 6(4): 1, doi: 10.1167/tvst.6.4.1. In this study, STZ-induced diabetic rats were exposed to unattenuated white light or to bright light in the blue to yellow range, or to bright red light, or to attenuated yellow light during the 12-hour light phase of a 12-12 light-dark regime. The rats exposed to unattenuated white light, or blue to yellow light, suffered faster cataract development, and more severe retinal damage as indicated by electroretinogram responses and glial fibrillary acidic protein expression in retinal Muller cells, than the rats exposed to attenuated yellow light or to bright red light. The authors conclude that attenuating white light or filtering out the shorter wavelengths had a protective effect on the eyes of the diabetic rats, and they suggest that special glasses attenuating light exposure and filtering out short wavelengths (400-530 nm) may be beneficial for diabetic patients.

U.S. Pat. No. 8,833,937 to Shehadeh et al, describes a retinal light management system that allows for removal of dangerous wavelengths of light while controlling the intensity of the remaining light that is allowed to pass to a user's eyes. In one embodiment, the system involves a pair of glasses that include filters that can be modified in the presence of light to reduce total light intensity reaching a diabetic's eyes.

In U.S. Pat. Nos. 4,878,748 and 5,617,154 to Hoffman, Hoffman describes the UV-associated damage to lens, cornea and retina, as well as its implication in yellow cataracts. He additionally states that blue light is implicated in macular degeneration and retinal damage.

A large number of companies manufacture and sell tinting machines for tinting plastic eyeglass lenses in different colors, such as grey, green, blue, and brown. In these machines, a lens is immersed for a period of time in water, at a temperature of 90° C. to 95° C., in which a tint of the desired color has been dissolved, and the tint diffuses into the lens.

It has been known since the middle Ages that mixing small amounts of gold into molten glass can give the glass a stable red color.

Brust et al, "Synthesis of thiol-derivatised Gold Nanoparticles in a Two-phase Liquid-Liquid System," *J. Chem. Soc., Chem. Commun.* (1994) 801-802, describes using two-phase (water-toluene) reduction of $AuCl_4^-$ by sodium borohydride in the presence of an alkanethiol to prepare solutions of 1-3 nm gold particles bearing a surface coating of thiol.

Mauro Epifani et al, "Sol-Gel Synthesis and Characterization of Au and Ag Nanoparticles in $SiO_2$, $TiO_2$, and $ZrO_2$ Thin Films," *J. Amer. Ceramic Soc.* 83, 2385-2393 (2000) describes silver and gold nanoparticles synthesized by the sol-gel process in $SiO_2$, $TiO_2$, and $ZrO_2$ thin films. A versatile method, based on the use of coordination chemistry, is presented for stabilizing $Ag^+$ and $Au^{+3}$ ions in sol-gel systems. Various ligands of the metal ions were tested, and for each system it was possible to find a suitable ligand capable of stabilizing the metal ions and preventing gold precipitation onto the film surface. The films were characterized by UV-visible optical absorption spectroscopy.

H. Yaghoubi, N. Taghavinia, and E. K. Alamdari, "Self cleaning TiO2 coating on polycarbonate: Surface treatment, photocatalytic and nanomechanical properties," *Surface & Coatings* 204 (2010), 1562-1568, describes a chemical surface treatment method used to create hydrophilic groups on the surface of a polycarbonate substrate, to allow good adhesion of a protective $TiO_2$ coating. X-ray photoelectron spectroscopy showed the treatment led to the oxidation of surface groups. The surface of the polycarbonate was treated in a chemical solution made by dropwise adding 37.5 mL of $H_2SO_4$ (Merck, 95%-97%) to 4 g of $K_2Cr_2O_7$ followed by the addition of 12.5 mL of de-ionized water. The polycarbonate substrates were immersed in the solution at different times, after the solution was cooled down to room temperature.

De Souza et al, "Review of the methodologies used in the synthesis gold nanoparticles by chemical reduction," *Journal of Alloys and Compounds* 798 (2019), 714-740, is a review article on methods of producing gold nanoparticles.

SUMMARY OF THE INVENTION

An aspect of some embodiments of the invention concerns methods of enhancing the diffusion of nanoparticles into a transparent optical element such as a plastic lens, by using a pressure cooker or using chemical activation of the surface of the optical element, as well as the use of nanoparticles in a tinted transparent optical element, such as a plastic lens, to produce a transmission as a function of wavelength with some desirable properties.

There is thus provided, in accordance with an exemplary embodiment of the invention, a method of preparing an optical element made of a transparent plastic with embedded nanoparticles, the method comprising:
  a) activating the surface of the optical element by attaching sulfate groups to the surface; and
  b) exposing the activated surface to nanoparticles, and allowing the nanoparticles to diffuse into the optical element.

Optionally, attaching sulfate groups to the surface comprises immersing the optical element in an aqueous solution of sulfuric acid for a period of time at a maintained activation temperature range.

Optionally, a concentration of the sulfuric acid solution, the maintained activation temperature range, and the period of time are selected to:
  a) activate the surface sufficiently to at least double a diffusion rate of the nanoparticles into the optical element compared to a diffusion rate of the nanoparticles into the optical element using a same protocol but without activating its surface; and
  b) not cause visible damage to the optical quality of the optical element.

Optionally, the maintained temperature range is entirely between 70 and 85 degrees C.

Optionally, exposing the surface to the nanoparticles and allowing the nanoparticles to diffuse into the optical element comprises immersing the optical element in a solution of the nanoparticles in water for a time interval at a maintained diffusion temperature range.

Optionally, immersing the optical element in a solution of the nanoparticles in water for a time interval at a maintained diffusion temperature range comprises maintaining the water at a temperature greater than 100° C. at a pressure greater than 1 atmosphere.

Optionally, the optical element comprises a lens, and the solution of nanoparticles in water has a great enough concentration of nanoparticles, the maintained diffusion temperature range is great enough, and the time interval is long enough, so that enough nanoparticles diffuse into the lens, or become firmly bound to the lens, so that the nanoparticles absorb at least 10% of the energy of light passing through the lens for at least one wavelength between 400 and 700 nm.

Optionally, the solution of nanoparticles in water has a concentration of between 0.3 mg and 200 mg of nanoparticles per liter of water, the maintained diffusion temperature range is entirely between 85 and 100 degrees C., and the time interval is between 10 minutes and 3 hours.

There is further provided, in accordance with an exemplary embodiment of the invention, a method of preparing an optical element made of a transparent plastic with embedded or firmly bound nanoparticles, the method comprising:
  a) exposing the optical element to nanoparticles and to a liquid that causes the nanoparticles to diffuse into or become firmly bound to the optical element; and
  b) maintaining the optical element and the liquid at a range of pressures greater than one atmosphere, and at a range of diffusion temperatures greater than the boiling point of the liquid at one atmosphere, while the liquid remains in a liquid state, for a time interval, while the nanoparticles diffuse into or become firmly bound to the optical element.

Optionally, the liquid comprises water, and exposing the optical element to the nanoparticles and the liquid comprises immersing the optical element in a solution of the nanoparticles in the water.

Optionally, the liquid is at least 99% water by weight.

Optionally, the range of pressures is entirely between 0.5 bar above one atmosphere, and 1 bar above one atmosphere.

Optionally, the optical element comprises a lens, and the solution of nanoparticles in water has a great enough concentration, the maintained diffusion temperature range is high enough, and the time interval is long enough, so that enough nanoparticles diffuse into or firmly bind to the lens so that the nanoparticles absorb at least 10% of the energy of light passing through the lens, at at least one wavelength between 400 and 700 nm.

Optionally, the solution of nanoparticles in water has a concentration of between 0.3 mg and 200 mg of nanoparticles per liter of water, the maintained diffusion temperature range is entirely between 105 and 125 degrees C., and the time interval is between 10 minutes and 3 hours.

Optionally, the method also includes washing the optical element after the nanoparticles diffuse into or firmly bind to it.

Optionally, the nanoparticles comprise gold, silver, or both.

Optionally, an average diameter of the nanoparticles is between 5 nm and 100 nm.

Optionally, the nanoparticles are substantially spherical with a standard deviation in diameter less than 20%.

Optionally, the method also comprises tinting the optical element by immersing it in a heated aqueous solution of a selected tint, for a tinting time period.

Optionally, tinting the optical element is done before or after diffusing the nanoparticles into the optical element.

Optionally, the optical element comprises one or more of polycarbonate (PC), diethylene glycol bis (allyl carbonate), polystyrene (PS), acrylics or polymethyl methacrylate (PMMA), polyethylene terephthalate (PET), polyether ether ketone (PEEK), MR7, MR8, MR-174, and photochromic material.

Optionally, the optical element comprises an eyeglass lens.

There is further provided, according to an exemplary embodiment of the invention, an optical element made of a transparent plastic colored with an added tint and with embedded or firmly bound nanoparticles, for which a concentration of the tint is great enough to absorb at least 10% of white light between 400 and 700 nm that passes through it, and a concentration of the nanoparticles is great enough to absorb at least 10% of energy of white light between 400 and 700 nm that passes through it.

Optionally, the tint has greater average transmission between 480 nm and 530 nm than between 530 nm and 640 nm, the nanoparticles have lower average transmission between 400 nm and 530 nm than between 530 nm and 640 nm, the concentration of nanoparticles is great enough and the concentration of tint is small enough so that the transmission is less than 10% for all wavelengths between 400 nm and 530 nm and the average transmission is more than 2.5% between 560 nm and 640 nm, and the concentration of tint is great enough so that the average transmission between 480 nm and 530 nm is greater than the average transmission between 400 and 480 nm and the average transmission between 530 nm and 640 nm.

Optionally, the optical element comprises a photochromic plastic and for at least a range of ultraviolet wavelengths it has a transmission at least 10 times lower than if it had no embedded or firmly bound nanoparticles.

Optionally, the optical element comprises a photochromic eyeglass lens, wherein the embedded or firmly bound nanoparticles have a higher concentration on a side of the eyeglass lens that would face a wearer's eye, than on a side of the lens that would face away from the wearer's eye.

There is further provided, in accordance with an exemplary embodiment of the invention, a method of manufacturing a transparent photochromic optical element with embedded or firmly bound nanoparticles, comprising:
  a) placing water and nanoparticles into a container; and b) leaving an optical element in the container with the water and nanoparticles for a nanoparticle diffusion period while the nanoparticles diffuse into or firmly bind to the optical element.

Optionally, the optical element already comprises a photochromic material when it is placed in the container containing the water and nanoparticles.

Optionally, the method also comprises incorporating a photochromic material into the optical element, after diffusing the nanoparticles into the optical element or firmly binding the nanoparticles to the optical element.

Optionally, the nanoparticles comprise gold nanoparticles prepared from a solution of a gold compound at a preparation temperature, the method comprising selecting a photochromic material for the optical element, selecting a concentration of the nanoparticles to be diffused into or firmly bound to the optical element, and selecting the preparation temperature, to give the optical element with the embedded or firmly bound nanoparticles a specified color when the photochromic material is not activated.

Optionally, the specified color is red, pink, purple, yellow, or brown.

Optionally, the specified color is brown.

Optionally, the average transmission of the optical element between 450 and 550 nm is less than 60%, and the selected preparation temperature is between 15° C. and 60° C.

Alternatively, the average transmission of the optical element between 450 and 550 nm is greater than 70%, and the selected preparation temperature is between 80° C. and 120° C.

Optionally, the optical element is an eyeglass lens with a front surface and a back surface, and leaving the optical element in a container containing water and nanoparticles for a nanoparticle diffusion period comprises exposing the back surface but not the front surface to the water and nanoparticles.

There is further provided, in accordance with an exemplary embodiment of the invention, an optical element comprising a photochromic material, with nanoparticles, between 2 and 100 nm in diameter, embedded in or firmly bound to it that decrease its transmission of light for at least some visible wavelengths.

Optionally, the optical element with the photochromic material alone, but without the embedded or firmly bound nanoparticles, when exposed to 1000 $W/m^2$ of sunlight, has a transmission that is more than 10% for at least some wavelengths between 400 and 530 nm, but the optical element with the photochromic material and the embedded or firmly bound nanoparticles, when exposed to 1000 $W/m^2$ of sunlight, has a transmission that is 10% or less for all wavelengths between 400 and 530 nm.

Optionally, the optical element with the photochromic material alone, but without the embedded or firmly bound nanoparticles, when exposed to 800 $W/m^2$ of sunlight, has a transmission that is more than 10% for at least some wavelengths between 400 and 530 nm, but the optical element with the photochromic material and the embedded or firmly bound nanoparticles, when exposed to 800 $W/m^2$ of sunlight, has a transmission that is 10% or less for all wavelengths between 400 and 530 nm.

Optionally, the optical element has an average transmission between 400 and 700 nm of at least 10%, when exposed to 1000 $W/m^2$ of sunlight.

Optionally, the optical element has an average transmission between 400 and 700 nm of at least 50%, when the photochromic material is not activated.

Optionally, the transmission is 75% or less for all wavelengths between 400 and 530 nm, when the photochromic material is not activated.

There is further provided, according to an exemplary embodiment of the invention, a method of manufacturing gold nanoparticles with a specified characteristic of absorbance as a function of wavelength, comprising:
a) selecting a preparation temperature according to the specified characteristic of absorbance as a function of wavelength;
b) mixing a gold compound with a solvent; and
c) causing the gold compound to reduce to metallic gold and precipitate as gold nanoparticles between 2 and 100 nm in diameter at the selected preparation temperature.

Optionally, the specified characteristic of absorbance as a function of wavelength is a higher average absorbance between 500 and 550 nm than between 400 and 450 nm, and the selected preparation temperature is between 80° C. and 120° C.

Alternatively, the specified characteristic of absorbance as a function of wavelength is a higher average absorbance between 400 and 450 nm than between 500 and 550 nm, and the selected preparation temperature is between 15° C. and 60° C.

There is further provided, according to an exemplary embodiment of the invention, a method of preventing eye damage in a diabetic subject, comprising the subject wearing eyeglasses with at least one lens an optical element according to an exemplary embodiment of the invention.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 8:
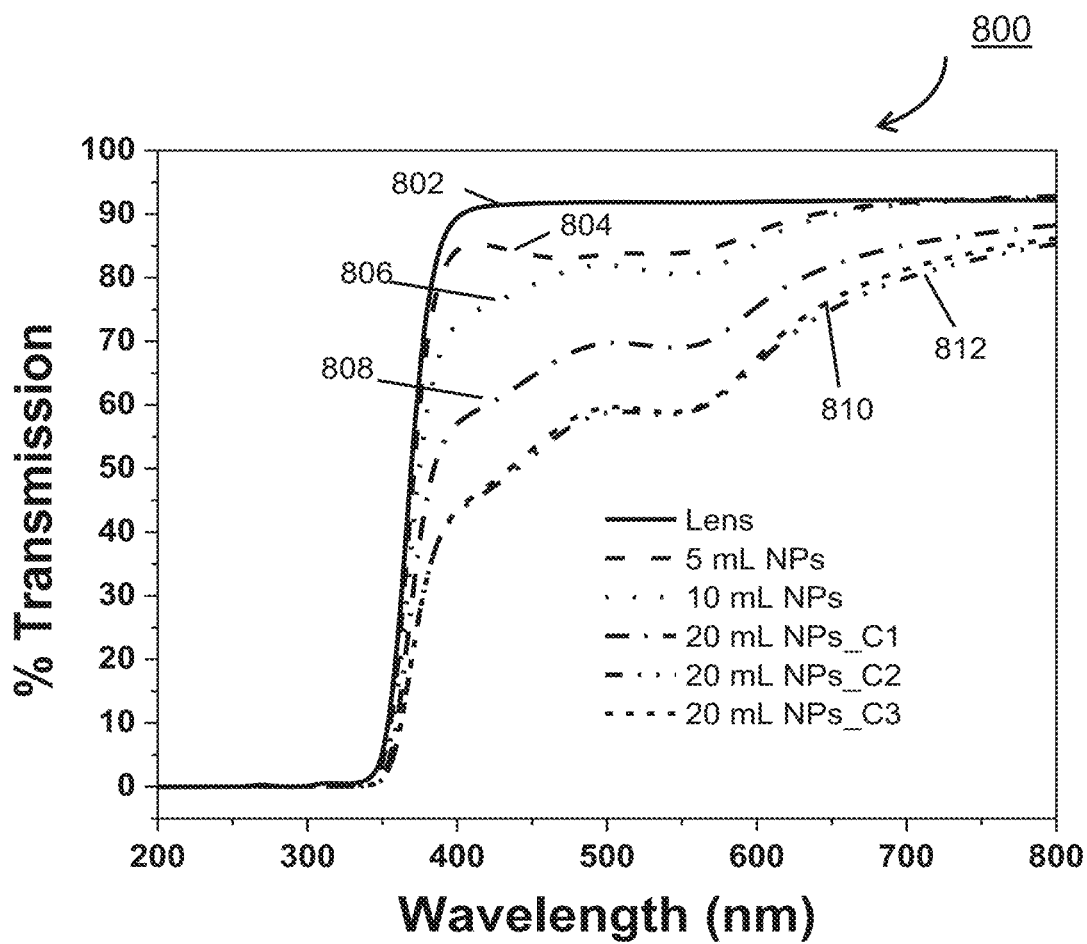
Figure 9A:
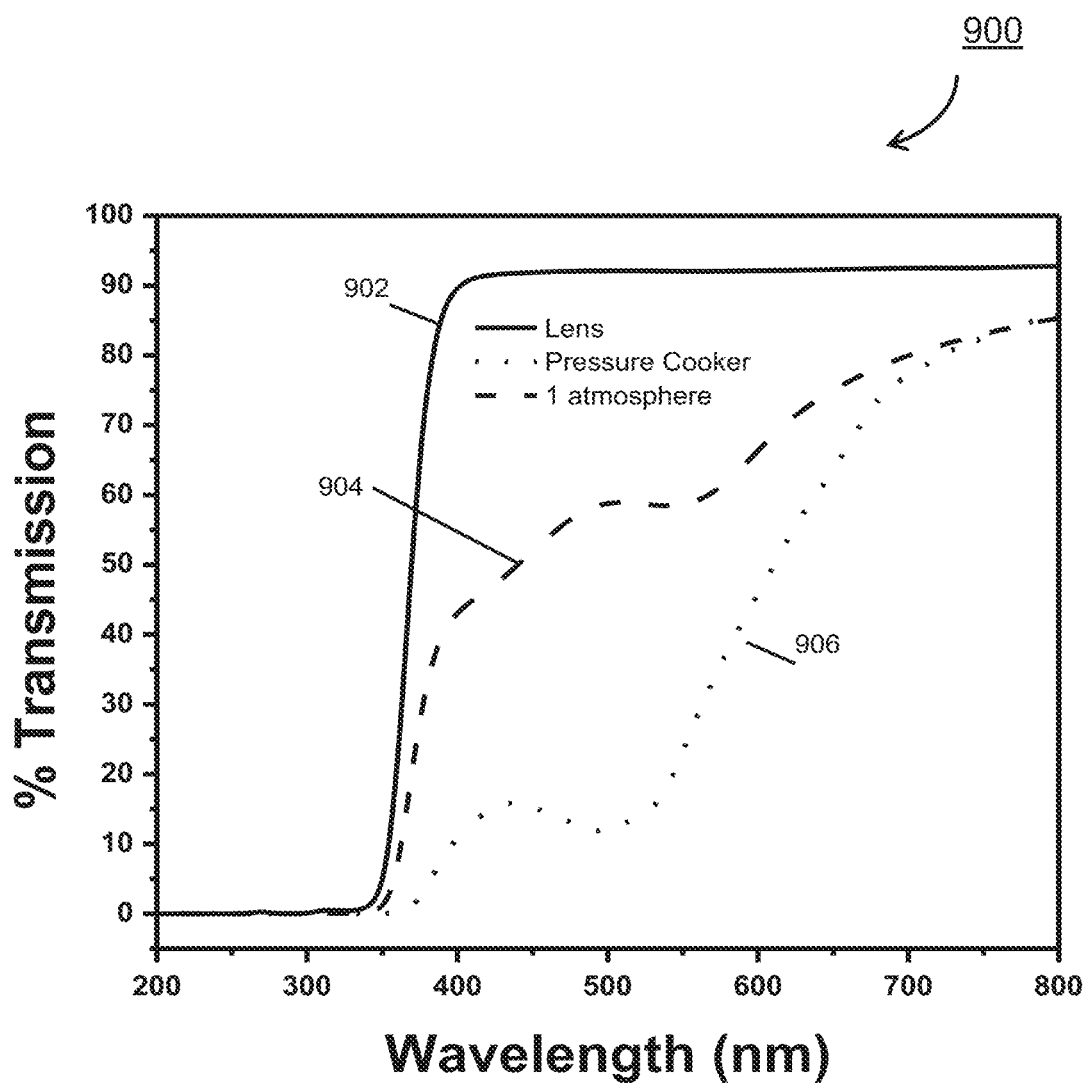
Figure 9B:
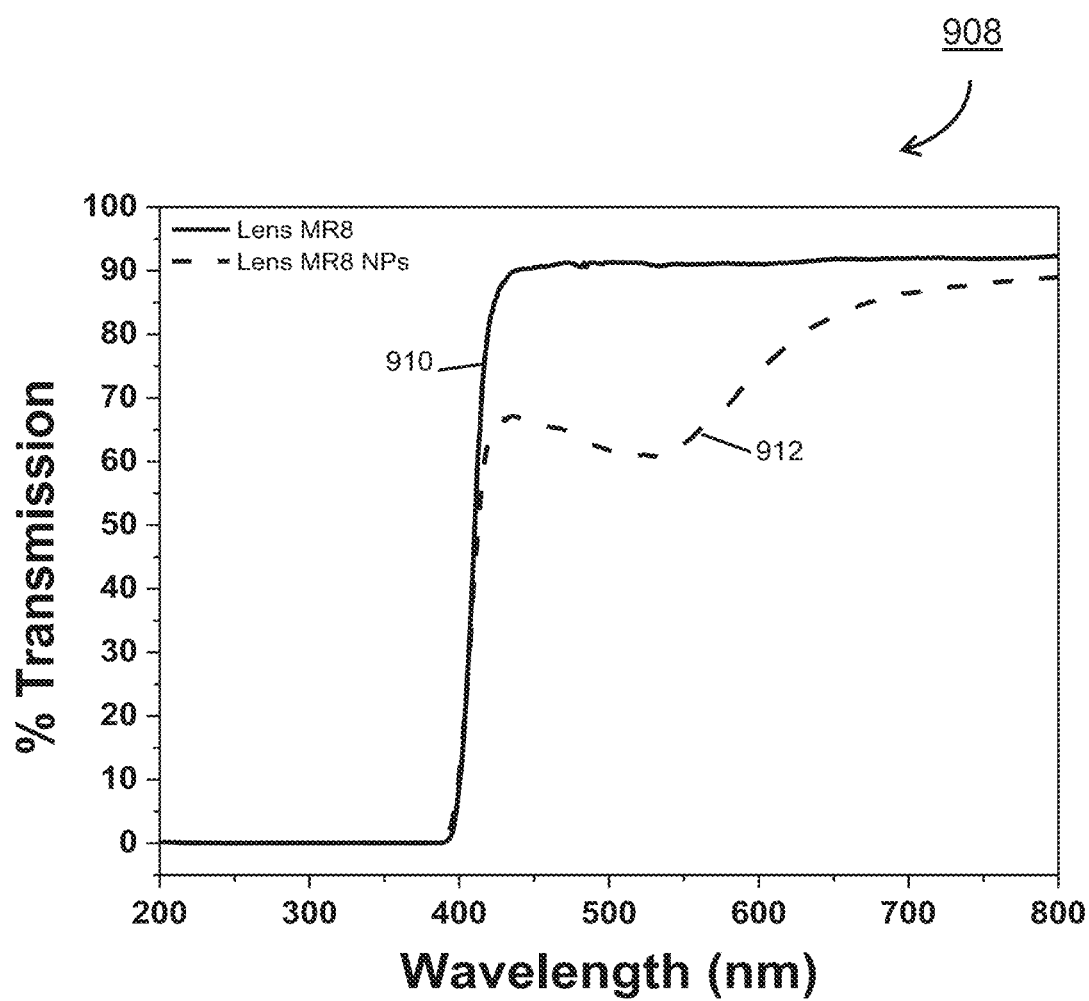
Figure 10:
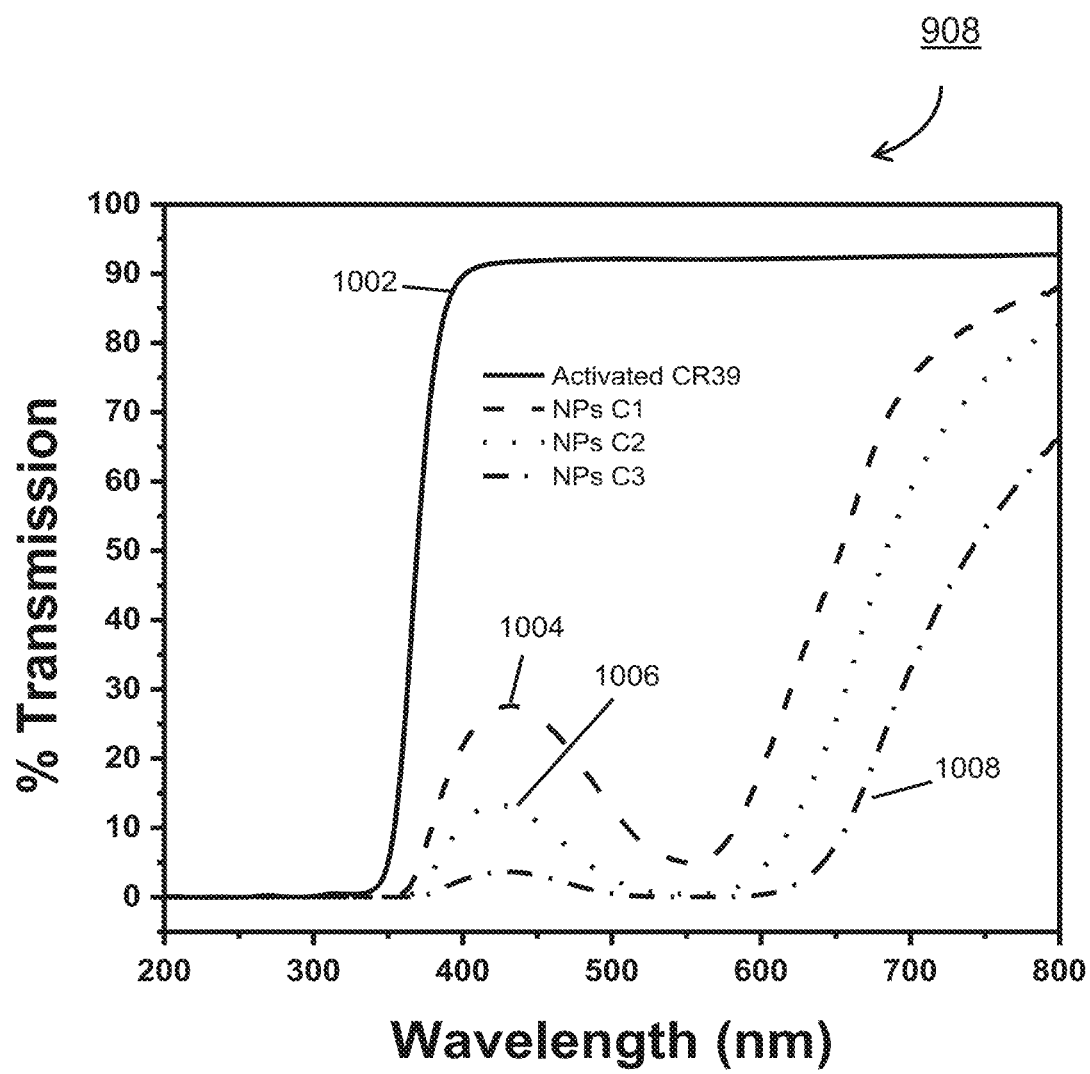
Figure 11:
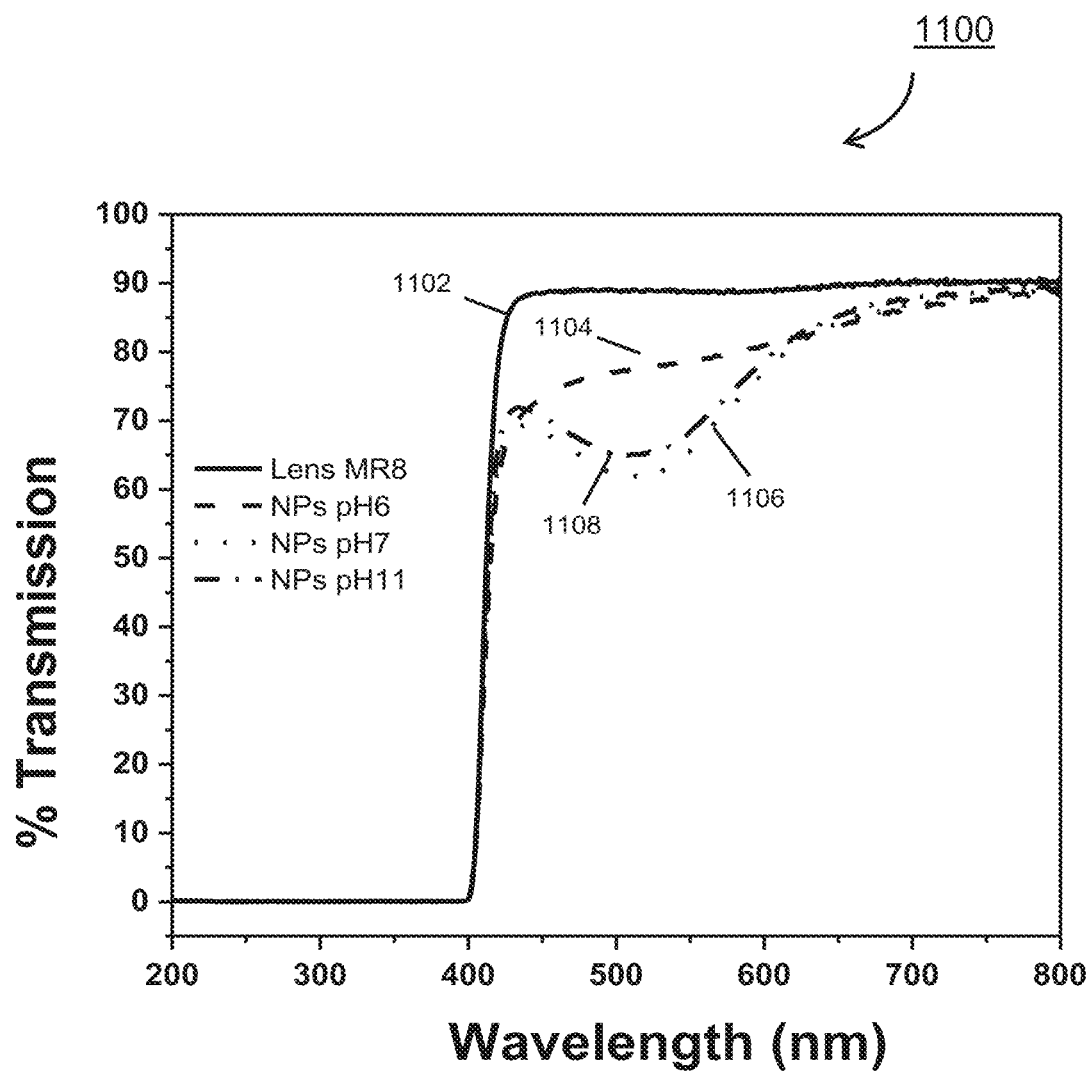
Figure 12:
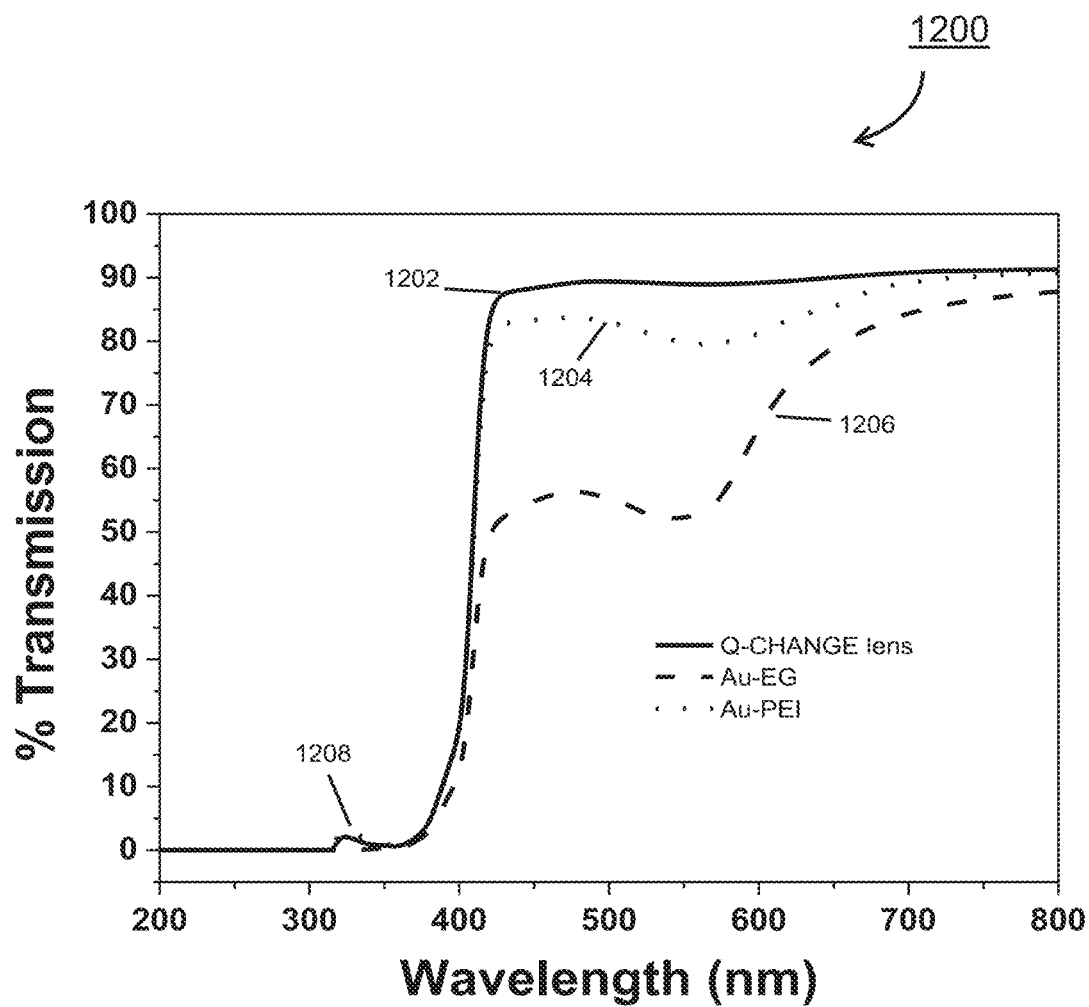
Figure 13:
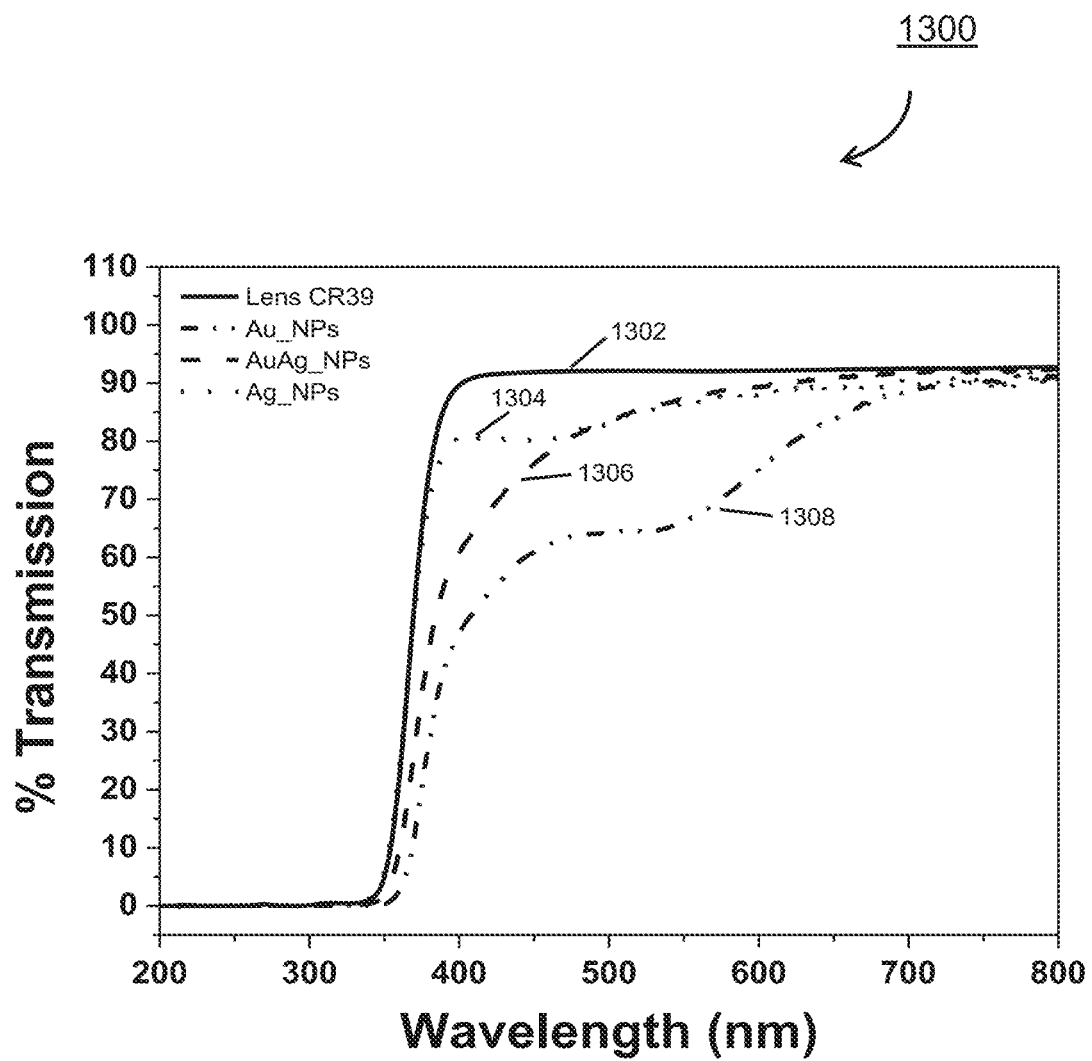
Figure 14A:
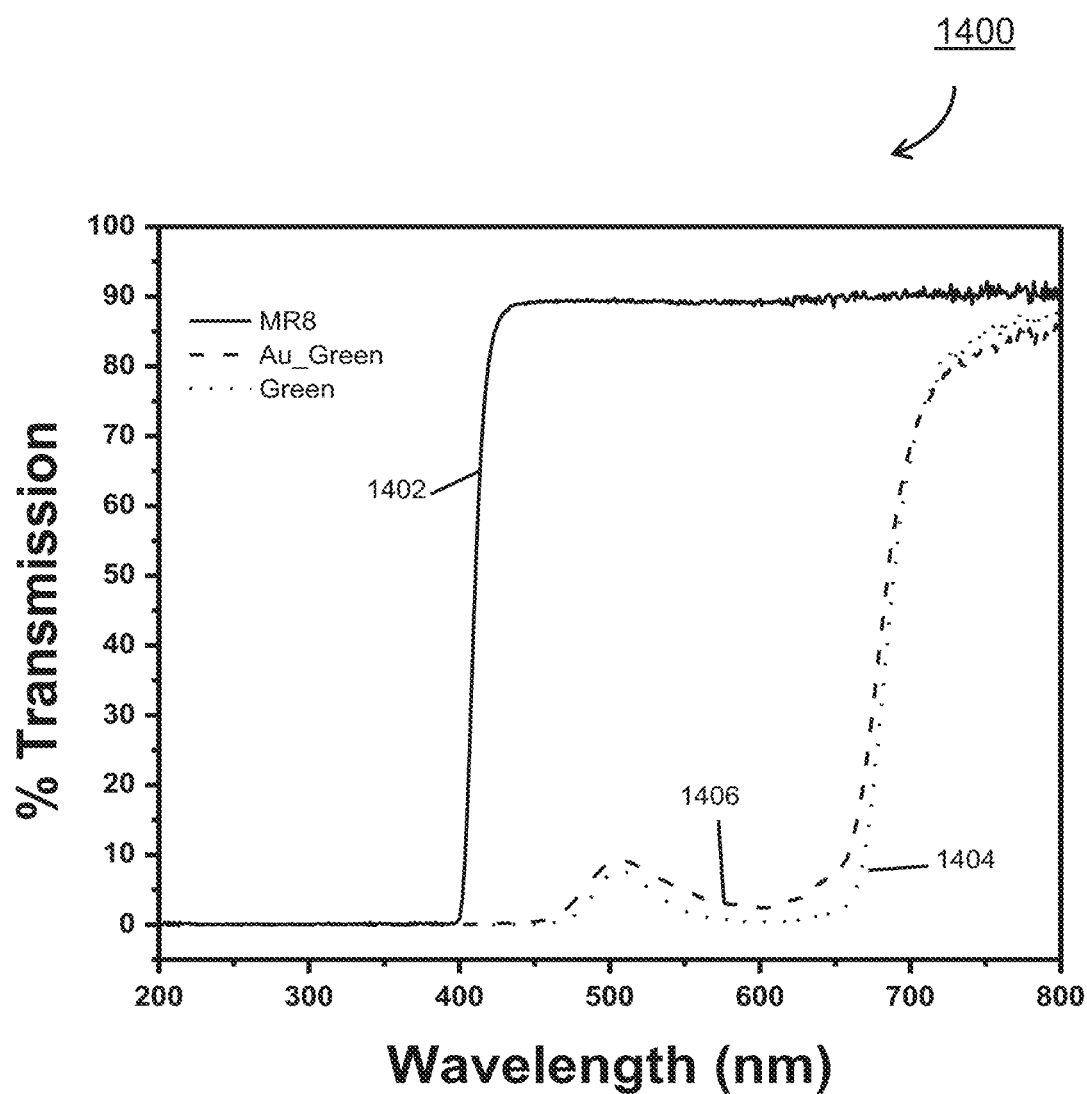
Figure 14B:
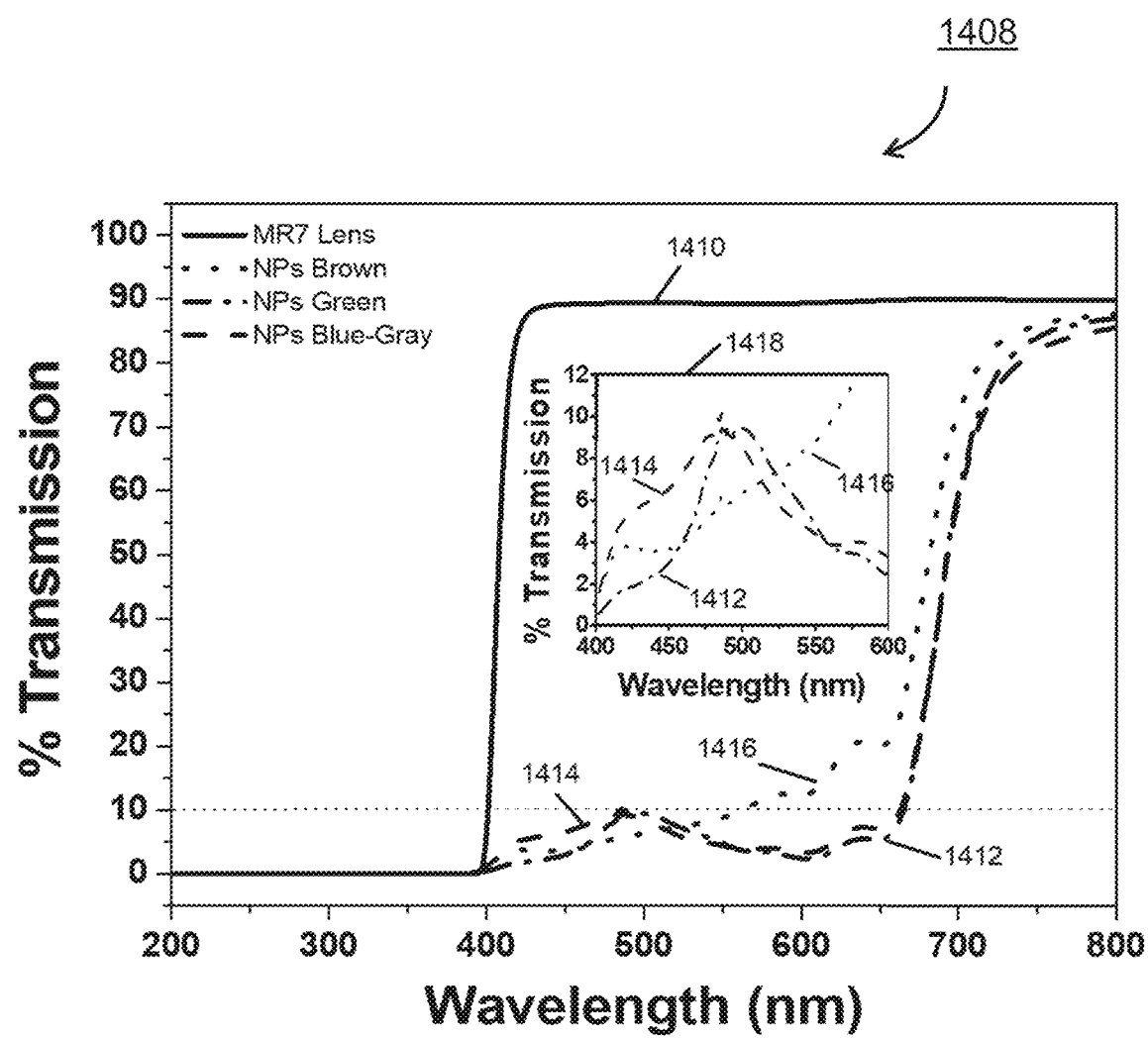
Figure 15:
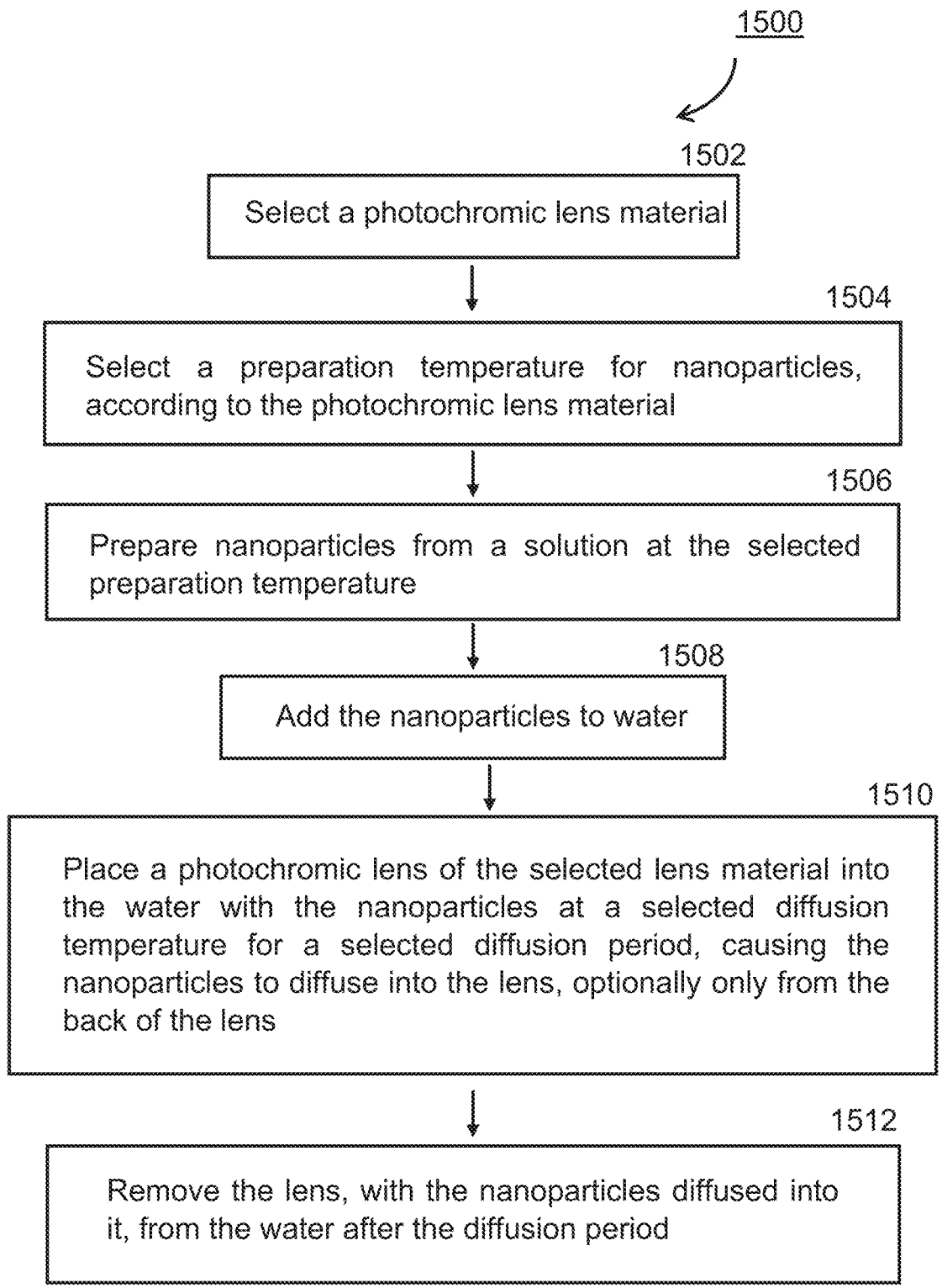
Figure 16:
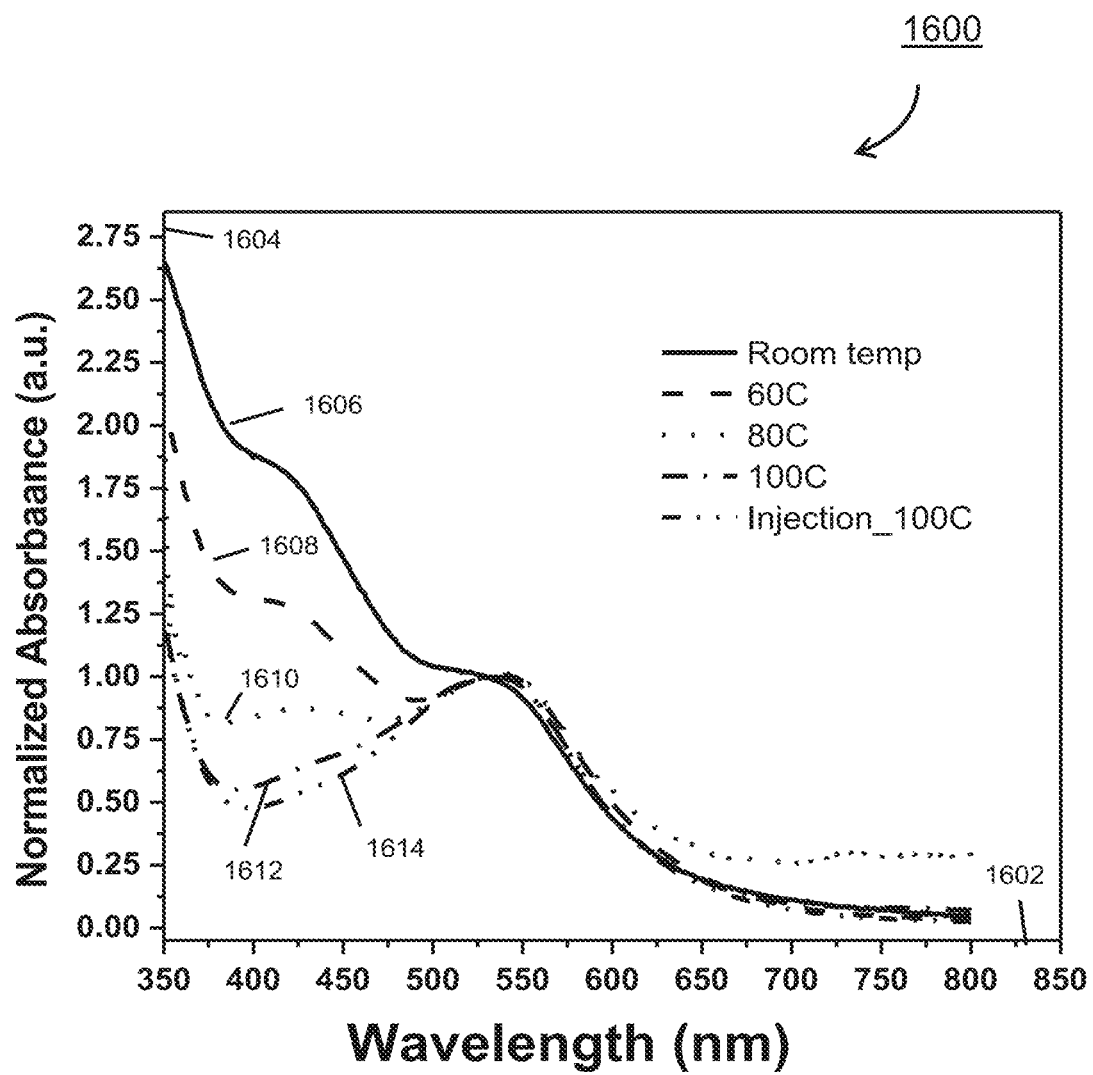
Figure 17A:
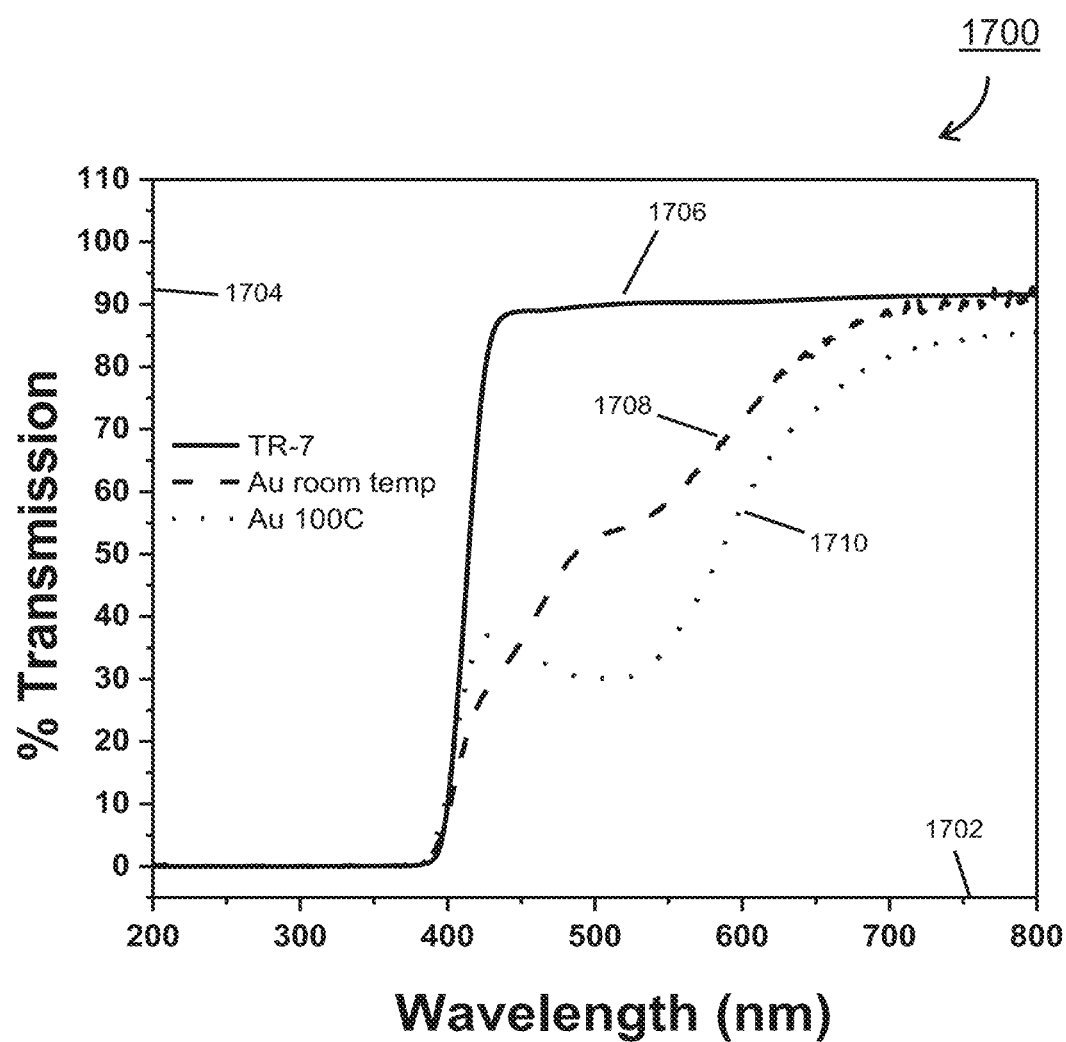
Figure 17B:
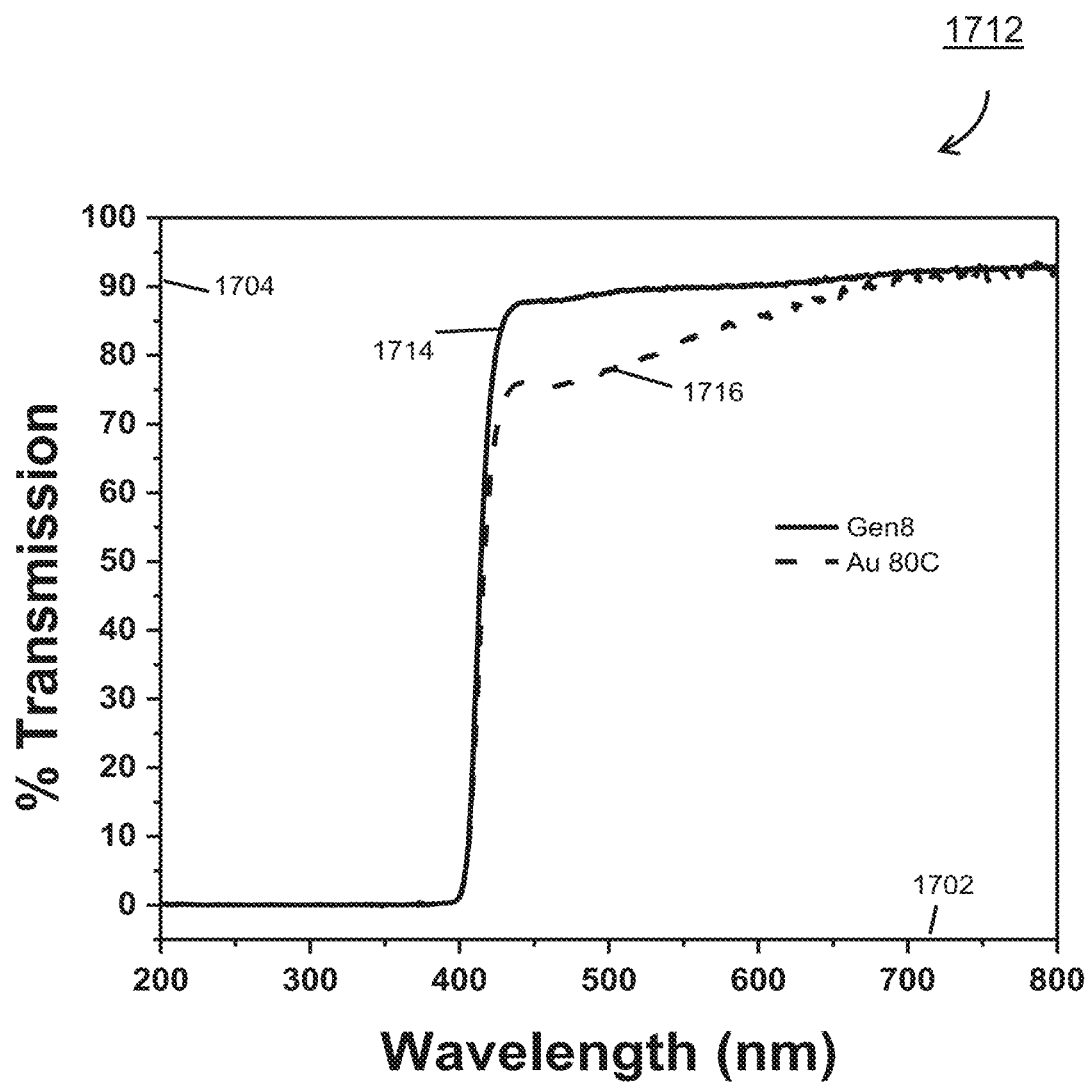
Figure 17C:
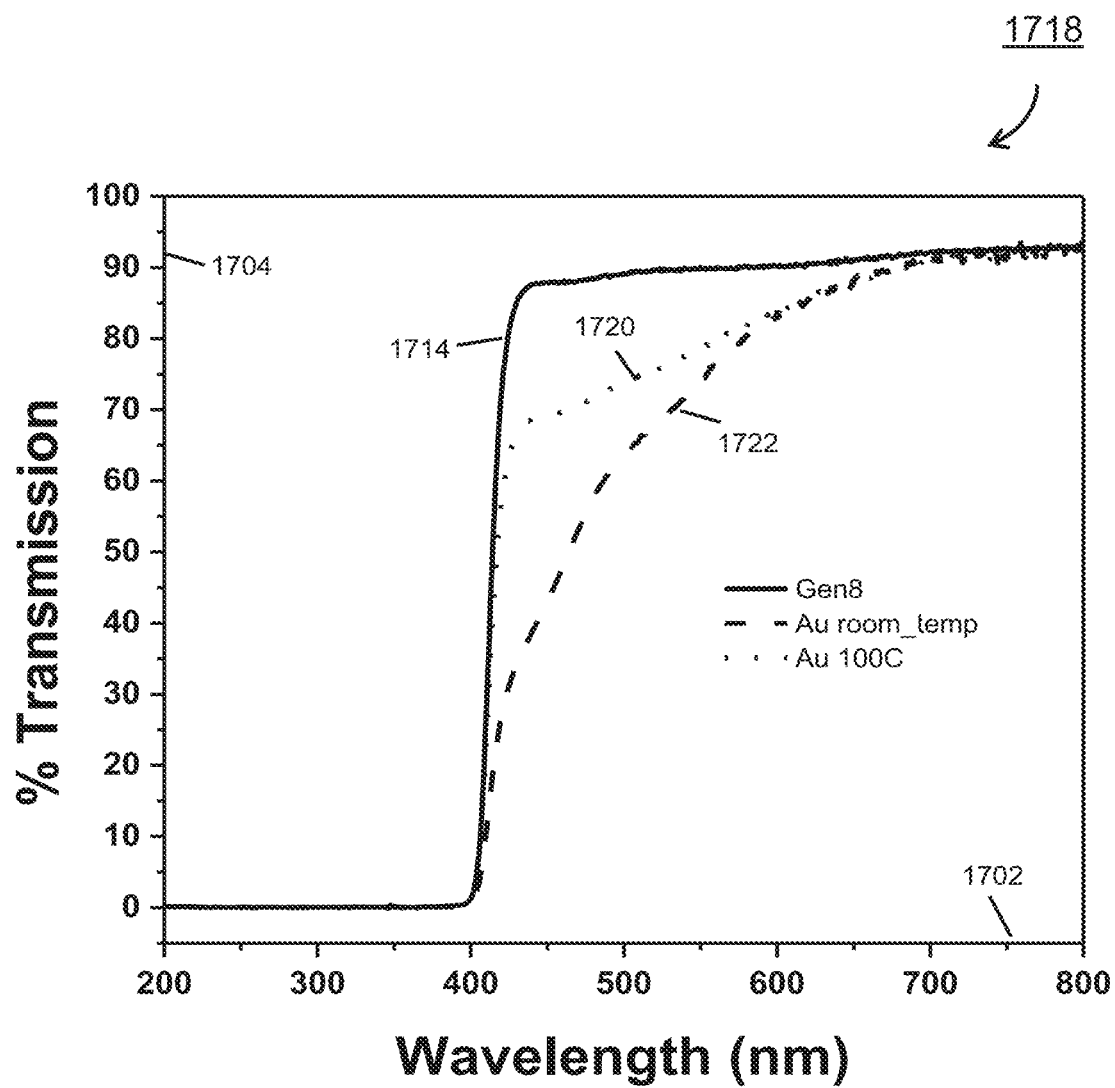
Figure 18A:
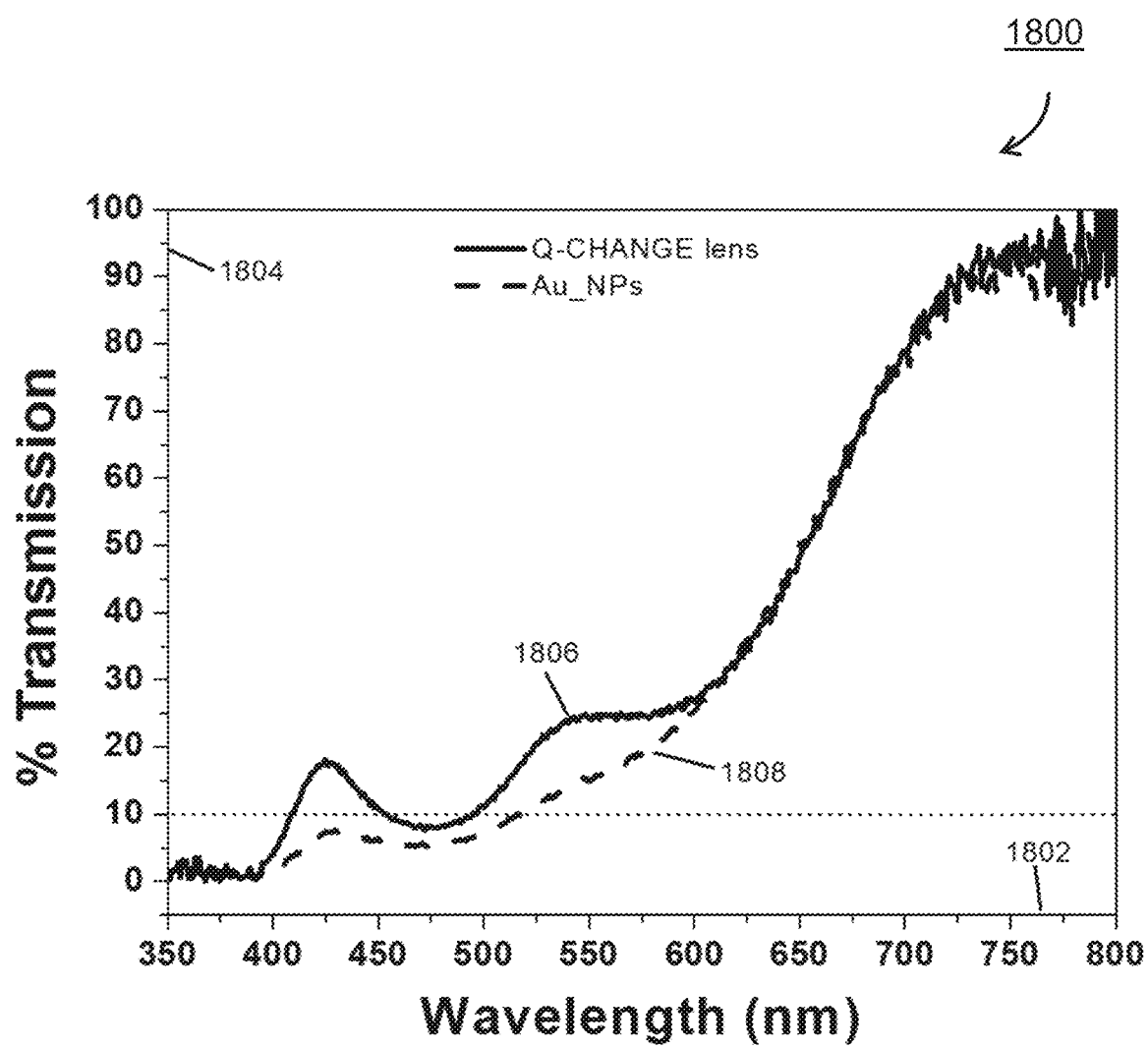
Figure 18B:
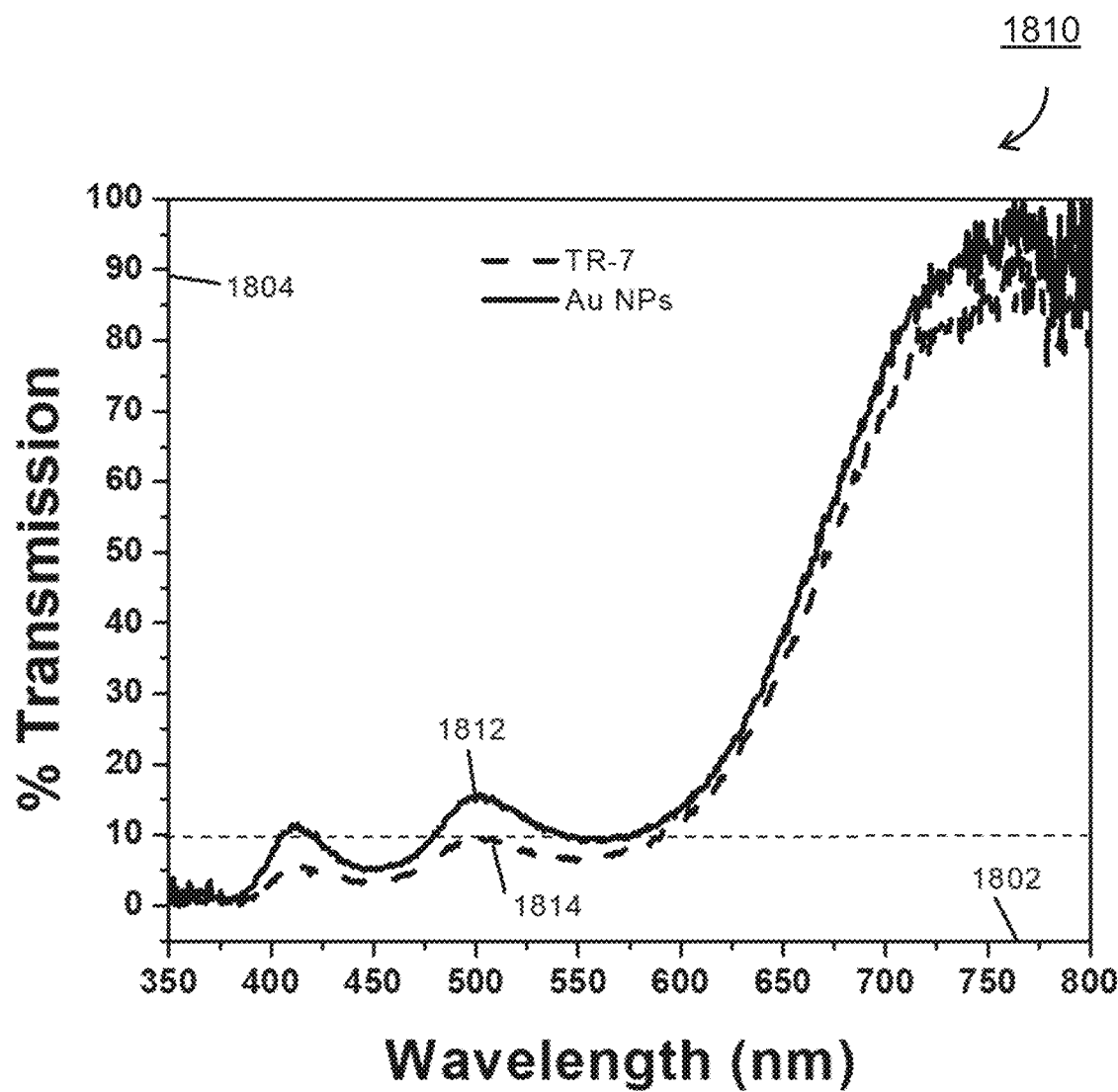
Figure 18C:
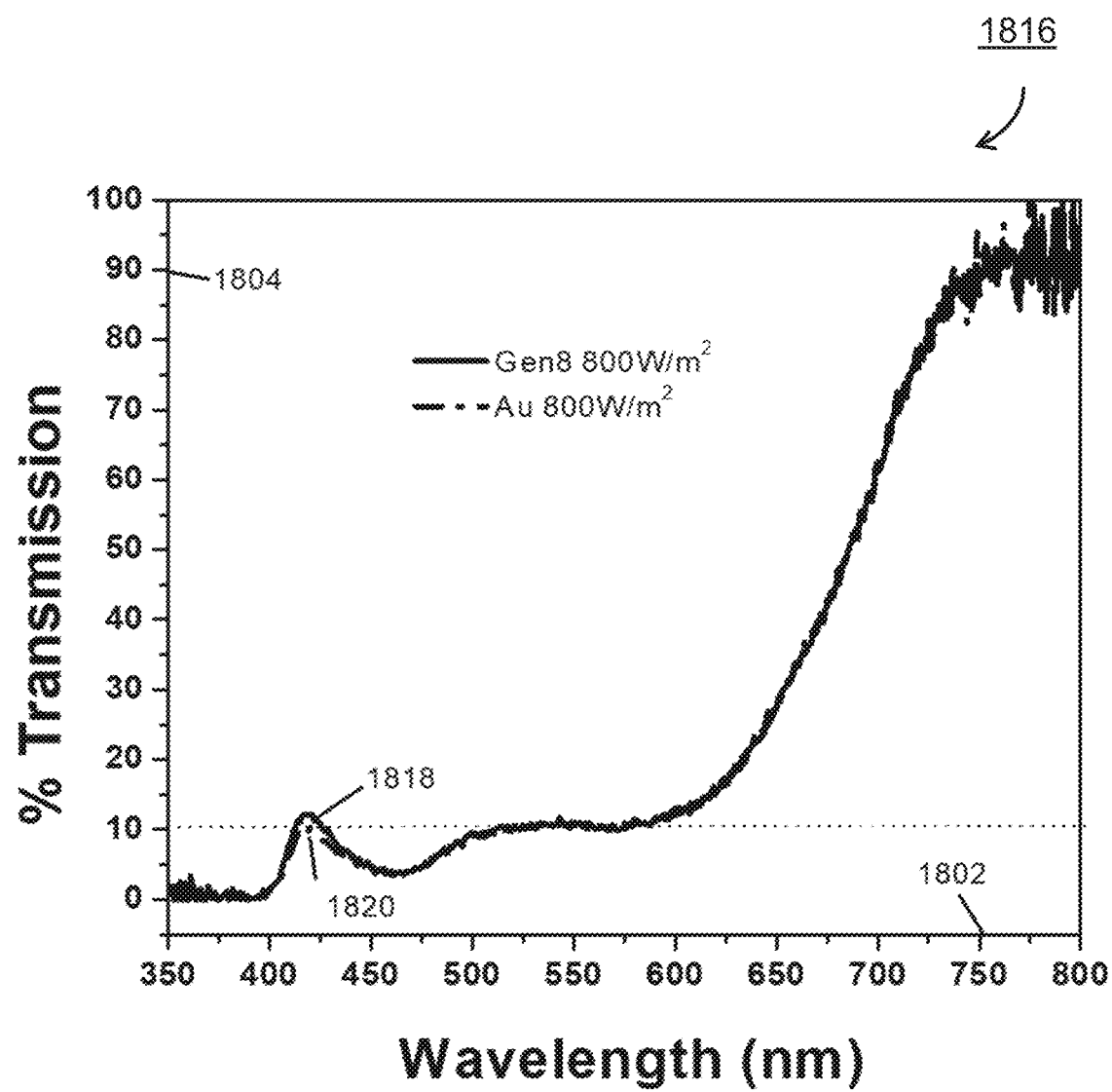

FIG. 8 schematically shows transmission as a function of wavelength for a transparent low density plastic optical element, with different concentrations of gold nanoparticles in a heated water solution diffusing into the optical element using different immersion times, without using a pressure cooker or an activated surface, according to an exemplary embodiment of the invention;

FIG. 9A and FIG. 9B schematically show transmission as a function of wavelength respectively for a low density plastic optical element and for a high density plastic optical element, for gold nanoparticles in a heated water solution diffusing into the optical element, each plot comparing the results of heating the water solution in a pressure cooker and heating the water solution at 1 atmosphere, according to an exemplary embodiment of the invention;

FIG. 10 schematically shows transmission as a function of wavelength for a transparent low density plastic optical element with a chemically activated surface, with gold nanoparticles in a heated water solution diffusing into the optical element using different immersion times, according to an exemplary embodiment of the invention;

FIG. 11 schematically shows transmission as a function of wavelength for a transparent high density plastic optical element, with gold nanoparticles diffusing into the optical element from a heated water solution in a pressure cooker, showing the effect of using water solutions with different values of pH, according to an exemplary embodiment of the invention;

FIG. 12 schematically shows transmission as a function of wavelength for a Q-CHANGE transparent plastic optical element, with chemically activated surface, with gold nanoparticles, in heated water, diffusing into the optical element, showing the effects of using nanoparticles prepared with different surface ligands, according to an exemplary embodiment of the invention;

FIG. 13 schematically shows transmission as a function of wavelength for a transparent low density plastic optical element, for gold nanoparticles, gold-silver nanoparticles, and silver nanoparticles diffusing into the optical element from a heated water solution using a pressure cooker but without using surface activation, according to an exemplary embodiment of the invention;

FIG. 14A schematically shows transmission as a function of wavelength for a transparent high density plastic optical element tinted green without nanoparticles, and for an optical element of the same plastic tinted green with gold nanoparticles diffused into it, according to an exemplary embodiment of the invention;

FIG. 14B schematically shows transmission as a function of wavelength for transparent high density plastic optical elements with embedded gold nanoparticles, and tinted respectively with green, blue-grey, and brown tint, according to an exemplary embodiment of the invention;

FIG. 15 is a flowchart for a method of preparing photochromic lenses, for example plastic photochromic lenses, with embedded nanoparticles that can provide additional protection against light with wavelengths between 400 and 520 nm, without being too dark, both in sunlight and in indoor lighting conditions, according to an exemplary embodiment of the invention;

FIG. 16 schematically shows absorption as a function of wavelength for gold nanoparticles prepared using different preparation temperatures, according to an exemplary embodiment of the invention;

FIG. 17A schematically shows transmission as a function of wavelength for a TR-7 photochromic lens in indoor lighting, with no added nanoparticles, and with added gold nanoparticles prepared using a preparation temperature of 20° C. to 25° C., and using a preparation temperature of 100° C., according to an exemplary embodiment of the invention;

FIG. 17B schematically shows transmission as a function of wavelength for a Gen-8 photochromic lens in indoor lighting, with no added nanoparticles, and with added gold nanoparticles prepared using a preparation temperature of 80° C., according to an exemplary embodiment of the invention;

FIG. 17C schematically shows transmission as a function of wavelength for a Gen-8 photochromic lens in indoor lighting, with no added nanoparticles, and with added gold nanoparticles, at a slightly greater concentration than for the plot shown in FIG. 17B, prepared using a preparation temperature of 20° C. to 25° C., and using a precipitation temperature of 100° C., according to an exemplary embodiment of the invention;

FIGS. 18A and 18B schematically show transmission as a function of wavelength, respectively for Q-CHANGE and TR-7 photochromic lenses, at a simulated sunlight intensity of 1000 W/m$^2$, without added nanoparticles, and with a minimum concentration of added gold nanoparticles, prepared using a preparation temperature of 20° C. to 25° C., to bring the transmission down to 10% or less at all wavelengths between 400 and 530 nm, according to an exemplary embodiment of the invention; and FIG. 18C schematically shows transmission as a function of wavelength for a Gen-8 photochromic lens, at a simulation sunlight intensity of 800 W/m$^2$, without added nanoparticles, and with a minimum concentration of added gold nanoparticles, prepared using a preparation temperature of 80° C., to bring the transmission down to 10% or less at all wavelengths between 400 and 530 nm, according to an exemplary embodiment of the invention.

DESCRIPTION OF SPECIFIC EMBODIMENTS OF THE INVENTION

The present invention, in some embodiments thereof, relates to a transparent optical element, such as a plastic lens, with embedded nanoparticles and a method of manufacturing such an optical element and, more particularly, but not exclusively, to a plastic lens used for eyeglasses with embedded gold or silver nanoparticles.

An aspect of some embodiments of the invention concerns a method of embedding nanoparticles in a transparent material, for example an optical element such as an eyeglass lens made of a transparent plastic, by first chemically activating the surface of the material to increase the permeability of the material to the nanoparticles. In some embodiments of the invention, the surface is activated by attaching sulfate groups to the surface, for example by immersing the optical element in a heated solution of sulfuric acid in water. Once the surface has been activated, it is exposed to nanoparticles, which diffuse into the surface. In some embodiments of the invention, a liquid causes the nanoparticles to diffuse into the material. For example, the material is immersed in a solution of nanoparticles in water, optionally heated to a temperature of 85 to 100 degrees C., and the nanoparticles diffuse into the material. Alternatively, instead of using water, a different polar liquid is used, such as an alcohol or acetone, or a mixture of such solvents is used, optionally with other materials dissolved in it, for example to change its pH, and it should be understood that these alternatives apply to any method described herein where nanoparticles in water diffuse into an optical element, including when the surface of the optical element is not activated. The nanoparticles, for example nanoparticles made of gold, silver, or both gold and silver, provide the transparent material with a desired transmission as a function of wavelength, which in the case of eyeglasses can serve to protect the user's eyes, particularly from ultraviolet, blue, or green light, while allowing in adequate visible light, at those wavelengths and at longer wavelengths, for the user to see easily.

As used herein, "an optical element made of a transparent plastic" or "an eyeglass lens made of a transparent plastic" includes an optical element, or an eyeglass lens, made of any transparent plastic used for eyeglass lenses, including polycarbonate (PC), diethylene glycol bis (allyl carbonate), also known by the name CR-39, polystyrene (PS), acrylics or polymethyl methacrylate (PMMA), polyethylene terephthalate (PET), and polyether ether ketone (PEEK). In addition, there are a series of plastic eyeglass lens materials made by Mitsui Chemical, made of a combination of materials, with brand names beginning with MR, including MR7, MR8, and MR-174. There are also photochromic plastic materials used for eyeglass lenses, including Q-CHANGE, a new generation of photochromic lens material developed by Zhenjiang CV Optics 2019, and TR-7 and Gen-8, made by Transition. In the tests described herein with Q-CHANGE lenses, the type of lens material used had a refractive index of 1.56. It should be understood that references herein to test results using Q-CHANGE lenses refer to lenses made of the Q-CHANGE lens material with refractive index 1.56.

The inventors have found that this kind of chemical surface treatment can greatly increase the diffusion of nanoparticles into the kinds of transparent plastic that are used for eyeglass lenses, compared to the same kind of plastic which has not been chemically treated. This chemical activation may be especially useful for high density plastic, with a high refractive index, such as MR7, MR8, and MR-174, which may be important for making eyeglasses, and into which it may be difficult or impossible to diffuse nanoparticles in the absence of such chemical activation. The chemical activation can speed up the time needed to diffuse nanoparticles into the plastic, shortening the manufacturing time, and may make it possible to achieve nanoparticle densities that cannot be obtained at all without chemical activation of the surface.

The inventors have found that this chemical activation can be achieved with sulfuric acid, but not with nitric acid or hydrochloric acid, and, without limiting the method to any specific theory of how it works, the inventors believe that the chemical activation is achieved by attaching sulfate groups to the surface, which facilitate the passage of gold and silver nanoparticles through the surface and into the plastic.

An aspect of some embodiments of the invention concerns a method of embedding nanoparticles in a transparent material, for example a transparent plastic optical element such as an eyeglass lens, by exposing the surface of the transparent material to nanoparticles, and to a liquid that causes the nanoparticles to diffuse into the material, at a pressure above atmospheric pressure, at a temperature above the boiling point of the liquid at atmospheric pressure. For example, the liquid is water or a water solution, with the nanoparticles suspended in it and the transparent material immersed in it, in a pressure cooker. The pressure cooker is sealed and heated, until it reaches an elevated pressure, and the water or water solution reaches a temperature above 100 degrees C., for example the boiling point of the water or water solution at that pressure. For example, the pressure is less than 0.3 bar above 1 atmosphere, or between 0.3 bar and 0.5 bar above 1 atmosphere, or between 0.5 and 0.6 bar above 1 atmosphere, or between 0.6 and 0.7 bar, or between 0.7 and 0.8 bar, or between 0.8 and 0.9 bar, or between 0.9 bar and 1 bar above 1 atmosphere, or between 1 and 2 bars above 1 atmosphere, or between 2 and 5 bars above 1 atmosphere, or more than 5 bars above 1 atmosphere, and the temperature is optionally maintained at or near the boiling point of the water or water solution at that pressure. Alternatively, the pressure is varied over the time, for example going up and down more than once, and optionally with the temperature, at any given time, being close to the boiling point of the water or water solution at that pressure. Heating the water or water solution under pressure allows it to reach a higher temperature than heating the water or water solution in an ordinary vessel at atmospheric pressure.

For example, if the solution is almost pure water and has a boiling point of 100° C. at atmospheric pressure, then it cannot exceed a temperature of 100° C. at one atmosphere, but in a pressure cooker, with a pressure of 0.9 bar above atmospheric pressure, the boiling point will be 118.6° C., and that temperature can be achieved in the solution. The higher temperature can greatly increase the diffusion rate of nanoparticles into the material, compared to the same process performed at one atmosphere at a temperature of 100° C. or less. For some higher density plastics that are often used for eyeglass lenses, such as MR7 or MR8 or MR174, it may be impossible to diffuse nanoparticles into the lens at all without using a pressure cooker, at least if chemical activation of the surface is not used. Even for lower density plastic lens materials such as CR39, using a pressure cooker in this way can speed up the manufacturing process, for example to produce a lens with a given concentration of nanoparticles, and/or it can make it possible to achieve a concentration of nanoparticles in the material that could not be achieved at all at atmospheric pressure at a temperature of 100° C. or less. An eyeglass lens with embedded nanoparticles, produced in this way, can protect a user from possibly harmful wavelengths of light in the ultraviolet, blue, or green.

Optionally, the nanoparticles are diffused into the optical element using a water pressure above atmospheric pressure and a water temperature above 100° C., for example in a pressure cooker, and the optical element has a chemically activated surface using the activation method described above.

Optionally, when the nanoparticles are diffused into the optical element using a water pressure above atmospheric pressure, or the optical element has a chemically active surface, or both, the resulting concentration of nanoparticles in the optical element is great enough to significantly affect the transmission of light through the optical element. For example, the optical element comprises a lens, for example an eyeglass lens, and when light passes through the lens in a direction normal to the center of the front surface of the lens, for at least one wavelength between 400 and 700 nm, at least 5% or at least 10% or at least 20% or at least 30% or at least 50% or at least 70% or at least 90% of the energy of the light is absorbed by the nanoparticles. Optionally, for all wavelengths between 400 and 600 nm, or for all wavelengths between 400 and 500 nm, at least 5% or at least 10% or at least 20% or at least 30% or at least 50% or at least 70% or at least 90% of the energy of the light is absorbed by the nanoparticles.

It should be understood that, with or without activating the surface of the optical element, and with or without using a water pressure above atmospheric pressure, the nanoparticles may diffuse a large distance into the optical element, for example a significant fraction of the thickness of the optical element. But in some embodiments of the invention, for example with a different water temperature, a different diffusion time period, and/or a different surface treatment of the optical element, the nanoparticles may diffuse only a short distance below the surface, for example less than 1 mm, or less than 1 µm, or even less than the diameter of the nanoparticles. In some embodiments of the invention, the nanoparticles may diffuse far enough into the optical element that they are firmly bound to the optical element, and are not removed by cleaning the surface of the optical element with water, alcohol, acetone, a soap or detergent solution, or another solvent or mixture of solvents that is used for cleaning dirt or oil or grease off the surface of glass, or off the surface of a hard plastic used for lenses and other optical elements. In some embodiments of the invention, the nanoparticles may not diffuse into the optical element at all, but the method described for diffusing nanoparticles into the optical element may instead cause the nanoparticles to become firmly bound to the surface of the optical element, and not to be removed when the surface of the optical element is cleaned by such a solvent. It should be understood that any description herein of a method for diffusing nanoparticles into a transparent plastic optical element, or of a product produced by such a method, or of a product comprising a transparent plastic optical element with embedded nanoparticles, may also apply additionally or alternatively to a method of causing nanoparticles to become firmly bound to the surface of such an optical element, and to a product produced by such a method, or comprising a transparent plastic optical element with nanoparticles firmly bound to its surface. It should be understood that any reference herein to nanoparticles diffusing into or firmly binding to an optical element includes the case where the nanoparticles diffuse into and firmly bind to the optical element, and any reference herein to nanoparticles embedded in or firmly bound to an optical element includes the case where the nanoparticles are embedded in and firmly bound to the optical element. As used herein, nanoparticles are said to be integrated to an optical element if they are embedded in the optical element or firmly bound to the optical element or both.

An aspect of some embodiments of the invention concerns a transparent material, for example an optical element, such as an eyeglass lens, made of a transparent plastic, which is tinted, for example using a conventional material used for tinting sunglasses, and also has embedded nanoparticles. Optionally, both the tint and the embedded nanoparticles contribute significantly to the transmission curve of the lens. For example, the tint, and the nanoparticles, each absorb at least 5%, or at least 10%, or at least 20%, or at least 30%, or at least 40%, of the energy of white light between 400 nm and 700 nm that passes through the lens, the light uniformly distributed over the area of the lens, and propagating in a direction normal to the surface of the front of the lens at its center. Here, "white light" means light of equal intensity per unit wavelength. The combination of embedded nanoparticles and tint may result in a transmission as a function of wavelength with desired properties, that cannot be achieved by tint alone, and/or cannot be achieved by embedded nanoparticles alone.

For example, it may be important, for protecting a user's eyes, to have a transmission of less than 10% for all wavelengths between 400 nm and 530 nm, and even lower at wavelengths shorter than 400 nm. Although most transparent plastics used in eyeglass lenses have a transmission that is very low at wavelengths shorter than 350 nm or shorter than 400 nm, these plastics usually have high transmission, for example about 90%, in visible light at wavelengths longer than 400 nm, and either tinting or embedded nanoparticles or a combination of the two is needed to reduce transmission to less than 10% at wavelengths between 400 and 530 nm. If the lens is tinted green, blue-grey, or grey, and has no embedded nanoparticles, then the transmission will generally be much higher, on average, between 480 and 530 nm, than the transmission between 530 and 640 nm on average. In order to keep the transmission below 10% at all wavelengths between 400 and 530 nm, the concentration of tint will have to be great enough so that the average transmission, between 530 and 640 nm will be very low, well below 2.5%. Since the transmission is also low below 530 nm, this will make the glasses very dark, and difficult to see through. But if there are embedded nanoparticles in the lens, for example gold nanoparticles, then the transmission between 400 nm and 530 nm can be kept below 10% with less tint, because gold nanoparticles absorb light well between 400 and 530 nm. Because the nanoparticles absorb much less light at wavelengths between 530 and 640 nm, the average transmission between 530 and 640 nm can be greater than 2.5%, and the glasses will not be difficult to see through. Here, "average transmission" over a range of wavelengths refers to an average that is equally weighted per interval of wavelength, and is defined as the integral of the transmission as a function of wavelength, over the range of wavelengths, divided by the difference between the maximum and minimum wavelength in the range of wavelengths.

A potential advantage of using blue-grey, green or grey tint in the lens, in addition to embedded nanoparticles, is that the tint makes it possible for the lens to be visibly colored blue-grey or green or grey, while still achieving the desired low transmission, less than 10%, at all wavelengths below 530 nm, and adequately high transmission, for example above 2.5% on average, between 530 and 640 nm. With embedded gold nanoparticles, and in the absence of any tint, the lenses may look pink or purple. Optionally, there is enough blue-grey or green or grey tint added to the lens so that the transmission is higher, on average, between 480 and 530 nm, than it is between 530 and 640 nm and between 400 and 480 nm. This will make the lens look blue-grey or green or grey, with the color depending on an average wavelength of the transmitted visible light, typically about 460 nm for blue-grey and about 510 nm for green, and on how high transmission is in the red, at wavelengths greater than 640 nm. Higher transmission in the red, together with a peak in transmission between 480 nm and 530 nm, may make the lens look more grey. The lens can also use tints of other colors, such as brown or blue, together with embedded nanoparticles.

Another potential advantage of using nanoparticles in eyeglass lenses, together with tint of any color, is that the tinting process has been found to take less time for a lens that already has nanoparticles embedded in it. For example, a lens of refractive index 1.6, without embedded nanoparticles, that requires 90 minutes to tint with brown tint, can be tinted to the same extent with brown tint in only 30 minutes, at the same temperature and the same concentration of tint, if it has gold nanoparticles embedded in it. The same lens without embedded nanoparticles takes 330 minutes to tint with gray or green tint, and only 120 minutes to tint gray or green to the same extent, with embedded gold nanoparticles.

Another potential advantage of using nanoparticles in eyeglasses lenses is that gold and silver nanoparticles may have antibacterial properties. The inventors believe that when the methods described in FIGS. 3-7 are used to produce eyeglass lenses with embedded nanoparticles, some of the nanoparticles will be embedded in the surface of the lens, exposed to the outside. Those nanoparticles may kill bacteria that are transferred to the surface of the lens by one person, preventing the bacteria from infecting another person who subsequently handles the lens. The antibacterial properties of gold and silver nanoparticles are described, for example, by Mohammed J. Hajipour et al, "Antibacterial properties of nanoparticles," *Trends in Biotechnology* 30, 499-511 (2012), which discusses silver nanoparticles; and by Xiao Gu et al, "Preparation and antibacterial properties of gold nanoparticles: a review," *Environmental Chemistry Letters* 19, 167-187 (2021).

Using embedded nanoparticles in eyeglass lenses, together with tint of any color, has still another potential advantage. Some plastic materials used for eyeglass lenses, for example Q-CHANGE, have a narrow range of wavelengths in the ultraviolet where the transmission is much greater than at other wavelengths in the ultraviolet. For example, the transmission in that range is greater than 1%, or greater than 2%. In the case of Q-CHANGE, the range of ultraviolet wavelengths is centered at about 320 nm, and the transmission in that range is about 2.5%. These ultraviolet wavelengths are potentially harmful to the eyes. The tints used for eyeglasses, including activated photochromic materials, do not absorb much light at these wavelengths, but gold nanoparticles do. When a Q-CHANGE lens has a great enough concentration of gold nanoparticles to keep the transmission less than 10% between 400 nm and 530 nm, when the photochromic material is activated, then the transmission at and around 320 nm will be less than 0.1%, much lower than for a Q-CHANGE lens that only has photochromic material, but no nanoparticles. Having very low transmission at 320 nm, and throughout the ultraviolet, is potentially important for protecting the eyes.

In some embodiments of the invention, when nanoparticles are embedded in a photochromic lens, the nanoparticles are concentrated strongly on the side of the lens that is facing the wearer's eye, and away from the side of the lens that is facing the sunlight. For example, when the lens is immersed in a solution of nanoparticles, to diffuse the nanoparticles into the lens, it is placed in the solution to only a shallow depth, that does not cover the lens, and the nanoparticles diffuse only into the bottom surface of the lens, which is the surface that will face the wearer's eyes, and not into the top surface, which is the surface that will face the sunlight. Alternatively, the front surface of the lens, the side that will face the sunlight, is temporarily covered with a material that will block nanoparticles from diffusing into that surface, while the nanoparticles are free to diffuse into the back surface of the lens, that will face the user's eyes. For an eyeglass lens that has not yet been incorporated into eyeglass frames, the front surface may be defined as the convex surface and the back surface may be defined as the concave surface, when one surface of the lens is convex and the other surface is concave. Alternatively, the front surface may be defined as a surface that has been designated in advance to be facing the front of the eyeglasses, once the lenses have been incorporated into the eyeglasses, and the opposite surface is the back surface. In these cases, ultraviolet in the sunlight can enter the lens, causing the photochromic material to become dark, even if the photochromic material is mixed into the interior of the lens, as is the case with Q-CHANGE lenses, but the ultraviolet, as well as visible light between 400 and 530 nm, will be absorbed by the nanoparticles embedded on the side of the lens facing the wearer's eye, protecting the eyes from ultraviolet and short wavelengths of visible light. For photochromic lenses, such as TR-7 and Gen-8 lenses, where the photochromic material is coated onto the front surface of the lens rather than mixed into the interior, it may not be important to have nanoparticles diffuse into the lens only from the back surface.

An aspect of some embodiments of the invention concerns a photochromic optical element, for example a plastic lens for photochromic eyeglasses, that has embedded nanoparticles, for example gold nanoparticles, and/or a method of making such an optical element. For example, the optical element is left in a container containing water and nanoparticles for a diffusion period, for example heated water, while the nanoparticles diffuse into the optical element.

Optionally, the optical element already incorporates a photochromic material before diffusing the nanoparticles into it, for example because a photochromic material has been mixed into the molten plastic of the optical element when it was formed, or because a photochromic material has been coated onto the front surface of the optical element, before diffusing nanoparticles into the optical element. As used herein, mixing photochromic material into the plastic that forms the optical element, and coating photochromic material on the surface of the optical element, are both referred to as incorporating the photochromic material into the optical element. Alternatively, the nanoparticles are diffused into the optical element before a photochromic material is coated on its front surface, or a portion of the photochromic material has been incorporated into the lens before diffusing the nanoparticles into the lens, and a portion of the photochromic material is incorporated into the lens, for example by coating its front surface, only after diffusing the nanoparticles into the lens. In some embodiments of the invention, a photochromic material may be incorporated into a lens by diffusing the material into the lens, similarly to the way tints for non-photochromic sunglasses are often diffused into a lens, before, during, and/or after diffusing the nanoparticles into the lens.

In some configurations of the invention, the embedded nanoparticles absorb more light, in the range between 400 and 530 nm, than the photochromic material would absorb by itself, without the embedded nanoparticles, in indoor lighting conditions, when the photochromic material is not activated, and/or in sunlight, for example in sunlight at 1000 W/m² or at 800 W/m² or at 600 W/m², when the photochromic material is activated. Light at wavelengths between 400 and 530 nm may be harmful to the eyes of some people, in particular diabetics, and using photochromic glasses with embedded nanoparticles may provide more protection for them than photochromic glasses without embedded nanoparticles. Additionally or alternatively, the embedded nanoparticles absorb more light than the photochromic material would by itself, in one or more sub-ranges of the range from 400 to 530 nm, for example from 400 to 450 nm, or from 400 to 500 nm, which may be particularly harmful to the eyes of diabetics and other people. For example, the photochromic optical elements without the embedded nanoparticles transmit more than 10% of light for at least some wavelengths between 400 and 530 nm, or in a sub-range of that range, in sunlight when the photochromic material is activated, but transmit less than 10% of light for all wavelengths between 400 and 530 nm, or in the sub-range, with the embedded nanoparticles. Optionally, the photochromic optical elements with the embedded nanoparticles transmit less than 75% of the light, for all wavelengths between 400 and 530 nm, or in a sub-range of that, in lighting conditions when the photochromic material is not activated, providing some additional protection to diabetics even indoors, or behind a glass window when the photochromic material may not be activated because the glass window blocks the ultraviolet wavelengths in sunlight that activate the photochromic material. Optionally, the photochromic optical elements, with the embedded nanoparticles, are not so dark, in sunlight and/or indoors, that they are difficult to see through. For example, their average transmission, for wavelengths between 400 and 700 nm, is at least 10%, or at least 13%, or at least 17%, when the photochromic material is activated in sunlight, at 1000 W/m² or at 800 W/m² or 600 W/m², and/or is at least 50%, or at least 60%, or at least 70%, when the photochromic material is not activated.

In some embodiments of the invention, gold nanoparticles are selected, in order to achieve a selected color for the photochromic optical element, depending on the photochromic material used. For example, as will be described, for some photochromic materials, gold nanoparticles are selected with a higher absorbance in the blue, 400 to 450 nm, than in the green, 500 to 550 nm, while for other photochromic materials, gold nanoparticles are selected with a higher absorbance in the green, 500 to 550 nm, than in the blue, 400 to 450 nm. Optionally, the gold nanoparticles are selected according to a preparation temperature that they are prepared at, and the preparation temperature of the nanoparticles affects the color of the optical element. The inventors have found that the absorbance of the gold nanoparticles, as a function of wavelength, generally depends on the temperature at which they are prepared from a gold compound in a solvent, for example from $HAuCl_4 \cdot 3H_2O$ in ethylene glycol, optionally using a reducing agent, for example aniline, to reduce the gold compound to metallic gold nanoparticles. Possibly the preparation temperature affects the properties of the surface plasmon resonance of the gold nanoparticles, which affects their absorbance as a function of wavelength. When a high preparation temperature is used, for example between 80° C. and 120° C., the nanoparticles may have lower absorbance of blue light, 400 to 450 nm, than of green light, 500 to 550 nm. When a lower preparation temperature is used, for example between 15° C. and 60° C., the nanoparticles may have lower absorbance of green light, 500 to 550 nm, than of blue light, 400 to 450 nm. The concentration of nanoparticles in the photochromic optical element may be selected in order to bring the transmission down below 8% or 10% or 13% for all wavelengths between 400 and 530 nm, or in a sub-range of those wavelengths, in sunlight, and this concentration generally depends on the photochromic material. For example, one photochromic material used for eyeglasses, Gen-8, already has a relatively low transmission for 400 to 530 nm in sunlight even without embedded nanoparticles, and only a relatively low concentration of embedded nanoparticles is needed to bring the transmission below 10%. But two other photochromic materials used for eyeglasses, Q-CHANGE and TR-7, have a higher transmission for 400 to 530 nm in sunlight, without embedded nanoparticles, and a higher concentration of embedded nanoparticles may be needed to bring the transmission down to 10%. The inventors have found that when a relatively large concentration of embedded nanoparticles is used, for example enough to bring the average transmission between 450 and 550 nm below 60% when the photochromic material is not activated, then nanoparticles prepared at temperatures between 80° C. and 100° C. tend to make the optical element a fairly saturated red in color, when the photochromic material is not activated, while nanoparticles prepared at temperatures between 20° C. and 60° C. tend to make the optical element brown in color, when the photochromic material is not activated. When a relatively low concentration of embedded nanoparticles is used, for example low enough so that the average transmission between 450 and 550 nm is above 70% when the photochromic material is not activated, then nanoparticles prepared between 80° C. and 100° C. tend to make the optical element light brown in color, when the photochromic material is not activated, while nanoparticles prepared between 20° C. and 60° C. tend to make the optical element a fairly saturated yellow in color, when the photochromic material is not activated. Since brown is a more popular color for sunglasses than red or yellow, using nanoparticles prepared at a relatively high temperature, for example 80° C. to 100° C., may be a better choice when a relatively low concentration of embedded nanoparticles is used, while using nanoparticles prepared at a relatively low temperature, 20° C. to 60° C., may be a better choice when a relatively high concentration of embedded nanoparticles is used. A different choice of nanoparticle preparation temperature may be made if a different color is desired for the lenses when the photochromic material is not activated.

An aspect of some embodiments of the invention is a method of selecting a preparation temperature for gold nanoparticles, according to a selected characteristic of the absorbance of the nanoparticles as a function of wavelength. For example, the nanoparticles are prepared from $HAuCl_4 \cdot 3H_2O$ in ethylene glycol, using a reducing agent such as aniline. If the selected characteristic is greater absorbance of blue light, 400-450 nm, than of green light, 500-550 nm, then the selected preparation temperature may be between 20° C. and 60° C., while if the selected characteristic is greater absorbance of green light, 500-550 nm than of blue light, 400-450 nm, then the selected preparation temperature may be between 80° C. and 100° C.

An aspect of some embodiments of the invention concerns a method for protecting a diabetic subject from eye damage, for example diabetic retinopathy and/or cataracts, by the subject wearing eyeglasses in which at least one lens, made of a transparent plastic, is tinted, for example using a conventional material used for tinting sunglasses, and also has embedded nanoparticles. Optionally, both the tint and the embedded nanoparticles contribute significantly to the transmission curve of the lens.

An aspect of some embodiments of the invention concerns a method of preventing eye damage to a diabetic subject, for example diabetic retinopathy and/or cataracts, by the subject wearing photochromic eyeglasses in which at least one lens has embedded nanoparticles. Optionally, the embedded nanoparticles contribute significantly to the transmission curve of the lens, when photochromic material comprised in the lens is activated by sunlight, and/or when the photochromic material is not activated by sunlight.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

Preparation of Gold and Silver Nanoparticles

Figure 1A:
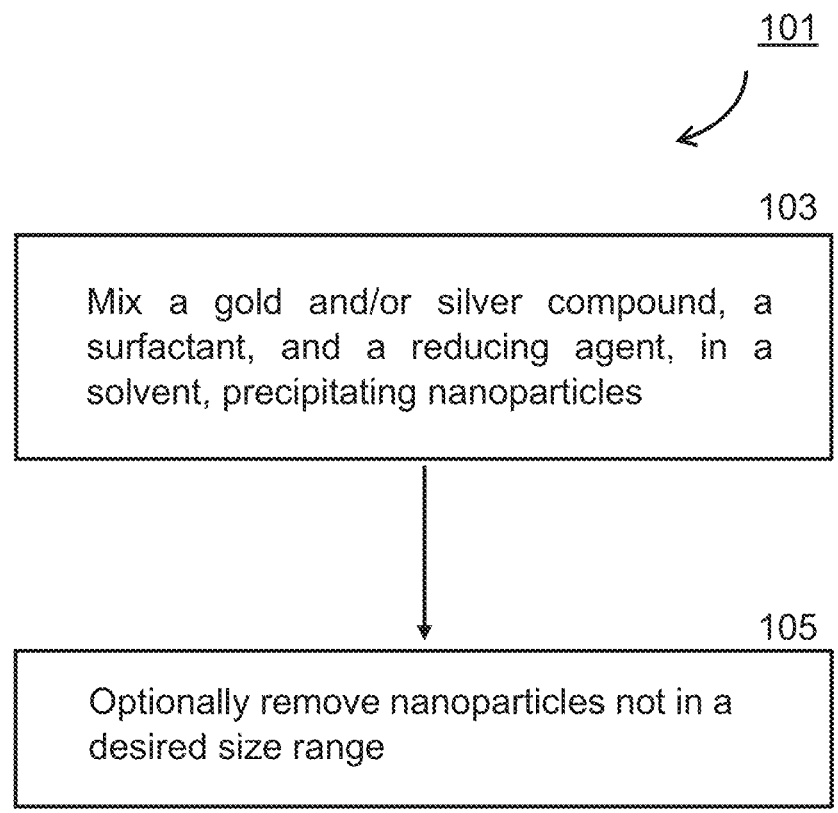
FIG. 1A is a flowchart for a method of preparing gold and/or silver nanoparticles according to an exemplary embodiment of the invention.

Referring now to the drawings, FIG. 1A shows a flowchart 101, for a method of manufacturing nanoparticles made of gold and/or silver, according to an exemplary embodiment of the invention. At 103, a gold compound, for example $HAuCl_4 \cdot H_2O$, a silver compound, for example $AgNO_3$, or both, is mixed with a reducing agent, for example aniline, or $NaBH_4$, in a solvent, for example water or ethylene glycol, together with a surfactant, which is optionally the same as the solvent as in the case of ethylene glycol, precipitating the nanoparticles. The surfactant produces a ligand that passivates the surface of the nanoparticles, so that the gold and/or silver precipitates into nanoparticles, rather than into a larger mass. At 105, nanoparticles that are not in a selected size range are optionally removed, for example by one or more of settling under gravity, by centrifuging, or by filtering.

Figure 1B:
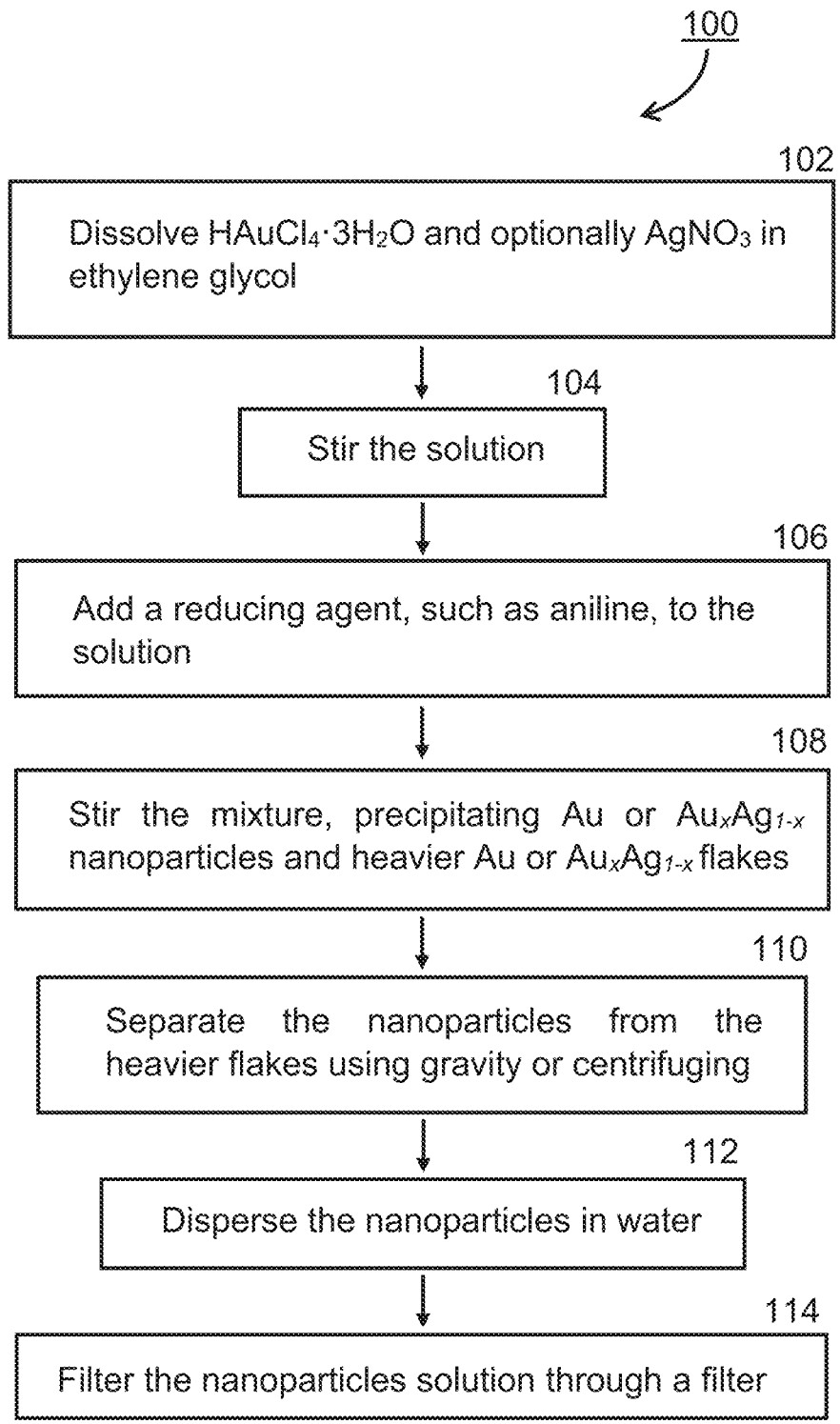
FIG. 1B is a flowchart for a method of preparing gold nanoparticles, or nanoparticles made of a bimetallic compound of gold and silver, that are suitable for embedding in a transparent optical element, such a plastic lens, using the methods of FIGS. 3-7 according to an exemplary embodiment of the invention, with more details than the more general flowchart shown in FIG. 1A.

FIG. 1B shows a flowchart 100, with more details than FIG. 1A, for a method of manufacturing gold (Au) nanoparticles, or nanoparticles made of a bimetallic compound of gold and silver ($Au_xAg_{1-x}$), according to an exemplary embodiment of the invention. At 102, a compound of gold, for example $HAuCl_4 \cdot 3H_2O$, is dissolved in a liquid solvent that it is soluble in, such as ethylene glycol, which also acts as a surfactant, coating the nanoparticles with ligands. For example, 90 mg of $HAuCl_4 \cdot 3H_2O$ is added to 40 mL of ethylene glycol. The inventors have found that this 90 mg of $HAuCl_4 \cdot 3H_2O$ in 40 mL of ethylene glycol yields 28 mg of gold nanoparticles, using the method described in FIGS. 1A-B. If $Au_xAg_{1-x}$ nanoparticles are being made, then a silver compound, such as $AgNO_3$, is also dissolved in the solvent, for example 25 mg of $AgNO_3$ for 90 mg of $HAuCl_4 \cdot 3H_2O$. The choice of surfactant affects the type of ligands that will surround the nanoparticles, which in turn can affect how easily the nanoparticles will diffuse into an optical element such as a plastic lens. For this purpose, the inventors have found that ethylene glycol, which results in nanoparticles with ligands of polyhydric and dihydric alcohols, is a particular good choice of surfactant for gold nanoparticles. When some other surfactants are used, water may be used as the solvent. Gold nanoparticles produced by other choices of surfactant, such as sodium citrate, which produces nanoparticles with carboxylic acid and hydroxy acids as ligands, Cetyltrimethylammonium Bromide (CTAB), which produces nanoparticles with ammonium ligands, and Branched Polyethylenimine (PEI), octadecylamine, oleylamine, or dodecylamine, all of which produce nanoparticles with amine ligands, have been found by the inventors not to diffuse into the plastic materials used for eyeglass lenses, as well as nanoparticles made using ethylene glycol. However, the inventors have found that PEI works well for making silver nanoparticles, as will be described below in FIG. 2. Polyvinyl alcohol (PVA) may also be used as a surfactant. Optionally, instead of using water and/or ethylene glycol as a solvent, an organic solvent, not miscible with water, is used as the solvent, as described for example in the related application PCT Patent Application No. PCT/IB2019/053773, cited above, and the nanoparticles, after precipitating in the organic solvent, are transferred to water or another polar solvent by vigorously stirring the organic solvent with the polar solvent. In this case, different surfactants, soluble in the organic solvent, or the organic solvent itself acting as a surfactant, may be used to produce different ligands. For example, an alkyl thiol ligand agent is used as a surfactant, such as octadecanethiol, decanethiol, hexanethiol, or butanethiol, producing nanoparticles with thiol ligands, as described by the inventors in PCT Patent Application No. PCT/IB2019/053773.

Other surfactants that have been used for producing ligands on gold nanoparticles include mercaptopropionic acid, described by Y. Kuroda, K. Fukumoto, and K. Kuroda, "Uniform and high dispersion of gold nanoparticles on imogolite nanotubes and assembly into morphologically controlled materials," *Appl. Clay Sci.* 55 (2012) 10-17; triphenylphosphine, described by G. A. Dichello, T. Fukuda, T. Mackawa, R. L. D. Whitby, S. V. Mikhalovsky, M. Alavijch, A. S. Pannala, and D. K. Sarker, "Preparation of liposomes containing small gold nanoparticles using electrostatic interactions," *Eur. J. Pharm. Sci.* 105 (2017) 55-63; and polyvinylpyrrolidone, described by J.-H. Lee, K. Kamada, N. Enomoto, J. Hojo, "Morphology-selective synthesis of polyhedral gold nanoparticles: what factors control the size and morphology of gold nanoparticles in a wet-chemical process," *J. Colloid Interface Sci.* 316 (2007) 887-892. De Souza et al, cited above, describes other surfactants and ligands used for gold nanoparticles, including chitosan biopolymer to produce chitosan ligands, dodecanethiol, and sulfuric tripodal ligands.

At 104, the solution is stirred, to thoroughly dissolve the gold compound and optionally the silver compound. It has been found that stirring for 30 minutes at a preparation temperature of 60° C., for example, produces good results.

At 106, a reducing agent, such as aniline, for example 0.3 mL of pure aniline, is quickly added to the solution, for example within 1 or 2 seconds or less. Adding the reducing agent quickly has the potential advantage that it may help to ensure that the process of reducing the gold compound and optionally the silver compound to metallic gold, or bimetallic gold and silver, is uniform and lasts for the same time over the whole solution, which in turn my make the nanoparticles more uniform in size and shape. Other reducing agents, such as sodium borohydride ($NaBH_4$) can also be used to produce gold or bimetallic nanoparticles, but the inventors have found that gold nanoparticles produced using $NaBH_4$ as a reducing agent do not diffuse well into lenses, although it works well for silver nanoparticles. Alternatively, gold nanoparticles are produced without adding a reducing agent, keeping the $HAuCl_4 \cdot 3H_2O$ dissolved in ethylene glycol at a preparation temperature of 110° C. to 120° C.

Alternatively, instead of first mixing the $HAuCl_4 \cdot 3H_2O$ with ethylene glycol or another solvent while maintaining them at the preparation temperature for an extended time, and then adding the reducing agent quickly, the reducing agent is first mixed with the solvent while maintaining them at the preparation temperature for an extended time, and the $HAuCl_4 \cdot 3H_2O$, optionally with a small amount of the solvent, is added quickly. For example, 0.3 mL of aniline is mixed with 40 mL of ethylene glycol at a preparation temperature of 60° C. for 30 minutes, and 90 mg of $HAuCl_4 \cdot 3H_2O$, dissolved in 1 mL of ethylene glycol, is then added quickly, within 1 or 2 seconds, to the aniline solution. This has the potential advantage that it may produce gold nanoparticles of a different size, which may have different optical properties. For example, the inventors have found that mixing 90 mg of $HAuCl_4 \cdot 3H_2O$ with 40 mL ethylene glycol, for 30 minutes at 60° C., and then quickly adding 0.3 mL of aniline, produces gold nanoparticles of diameter 50 nm. While mixing 0.3 mL of aniline with 40 mL of ethylene glycol for 30 minutes at 60° C., and then quickly adding 90 mg of $HAuCl_4 \cdot 3H_2O$ dissolved in 1 mL of ethylene glycol, produces gold nanoparticles of diameter 20 nm.

The inventors have found that the absorbance of gold nanoparticles as a function of wavelength can be affected by this difference in preparation method, even for the same preparation temperature, perhaps due to the different size of the resulting nanoparticles, as illustrated by curves 1612 and 1614 of FIG. 16, described below. For both curves 1612 and 1614, the nanoparticles were prepared at the same preparation temperature, 100° C. For curve 1612, the $HAuCl_4 \cdot 3H_2O$ was mixed with ethylene glycol for 30 minutes and the aniline was then added in 1 or 2 seconds, producing nanoparticles 50 nm in diameter. For curve 1614, the aniline was mixed with ethylene glycol for 30 minutes and the $HAuCl_4 \cdot 3H_2O$ was then added in 1 or 2 seconds, producing nanometers 20 nm in diameter, which had slightly lower absorbance of blue light, 400 to 450 nm, than the larger nanoparticles used for curve 1612.

At 108, the mixture is stirred for an extended time at the preparation temperature, for example for one hour, precipitating a mixture of Au or $Au_xAg_{1-x}$ nanoparticles, and larger Au or $Au_xAg_{1-x}$ flakes. The inventors have found that keeping the mixture at different selected preparation temperatures while the nanoparticles are precipitating results in nanoparticles with different optical absorption properties as a function of a wavelength. This is shown below in FIGS. 15 and 16, for gold nanoparticles prepared at room temperature, at 60° C., at 80° C., and at 100° C.

At 110, the nanoparticles are separated from the heavier flakes, for example by allowing the flakes to settle under the influence of gravity, or by using a centrifuge to separate them more quickly. The nanoparticles remain suspended in the solution, and may be poured off. Alternatively, the flakes are not removed by settling under gravity, or by using a centrifuge, but only by filtering, as described below. But in the embodiment of the invention described in FIG. 1B, both methods are used sequentially to separate the nanoparticles from the flakes.

At 112, the solution with the separated nanoparticles is diluted in water. For example, if the nanoparticles were reduced in 40 mL of ethylene glycol, or another solvent, then some or all of the 40 mL of solvent with nanoparticles, for example less than 2 mL, or between 2 and 5 mL, or between 5 and 10 mL, or between 10 and 20 mL, or between 20 and 40 mL, or all 40 mL, is dissolved in enough water to almost fill the container that is going to be used to diffuse the nanoparticles into the lens, for example 0.9 liters in the case of the experiments done by the inventors with diffusion at atmospheric pressure. Alternatively, more than 40 mL of the solvent with nanoparticles is prepared, and between 40 and 60 mL of it is dissolved in the water, or between 60 and 100 mL, or more than 100 mL. When the nanoparticles are going to be diffused into the lens using a pressure cooker, as described in FIG. 3, then enough water is used to almost fill up the pressure cooker, for example 3.5 liters of water in the experiments done by the inventors. In that case, the inventors found that better results were obtained if the full 40 mL of solvent with nanoparticles are used, or if even a larger volume of solvent with nanoparticles is prepared and used, for example 50 mL or 70 mL or 100 mL, with the same ratio of $HAuCl_4 \cdot 3H_2O$ to solvent. Adding a larger volume of the solution with precipitated nanoparticles to a given volume of water generally results in a greater concentration of nanoparticles in the optical element.

At 114, the diluted nanoparticle solution is filtered through a filter. The inventors have found that a filter of 0.2 µm pore size yields good results, but requires a very high pressure difference to force the solvent and nanoparticles through the filter. As an alternative, which does not require such a high pressure difference, two 50 µm filters, one behind the other, for example the filters manufactured by Ahlstrom with catalog number 323-2528400400, also give good results. The result is a water solution of quite uniform nanoparticles, which produce a consistent transmission curve, as a function of wavelength, in the optical element. For example, the nanoparticles are nearly spherical, with a standard deviation in diameter of more than 20%, or between 20% and 10%, or between 10% and 5%, or between 5% and 2%, or less than 2%. The average diameter is less than 5 nm, or between 5 nm and 10 nm, or between 10 nm and 20 nm, or between 20 nm and 30 nm, or between 30 nm and 50 nm, or between 50 nm and 100 nm, or greater than 100 nm.

The inventors have found that the diameter of the nanoparticles is affected by the concentration of the gold and/or silver compound in the solvent, the concentration of reducing agent, and whether the gold and/or silver compound is dissolved first in the solvent and then the reducing agent is added, or the reducing agent is dissolved first in the solvent and then the gold and/or silver compound is added. With the procedure described above, the gold nanoparticle diameter is found to be 50 nm when the $HAuCl_4 \cdot 3H_2O$ is dissolved first in the ethylene glycol, and 20 nm when the aniline is dissolved first in the ethylene glycol.

The concentration of gold nanoparticles in the water, after diluting and filtering, is typically about 28 mg for each 40 mL of the undiluted nanoparticle solution that was added to the water, using the method and parameters described for FIG. 1B. Alternatively, the concentration is less than 10 mg per 40 mL of undiluted solution, or between 10 and 28 mg per 40 mL of undiluted solution, or between 28 and 50 mg per 40 mL of undiluted solution, or more than 50 mg per 40 mL of undiluted solution. The concentration of gold nanoparticles in the water, after diluting and filtering, is, for example, less than 0.3 mg per liter, or between 0.3 and 1 mg per liter, or between 1 and 2 mg per liter, or between 2 and 5 mg per liter, or between 5 and 10 mg per liter, or between 10 and 20 mg per liter, or between 20 and 50 mg per liter, or between 50 and 100 mg per liter, or between 100 and 200 mg per liter, or more than 200 mg per liter.

Figure 2:
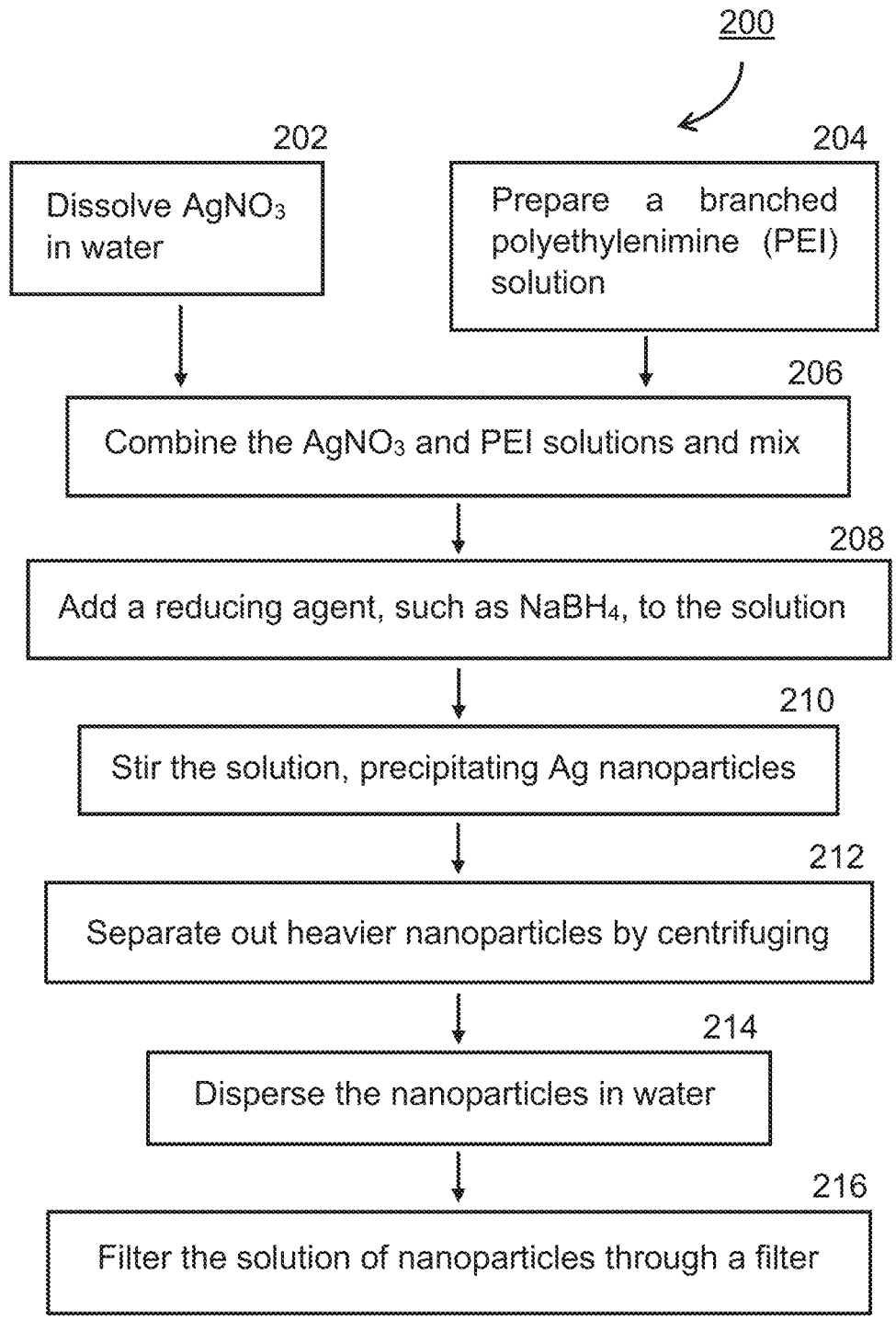
FIG. 2 is a flowchart for a method of preparing silver nanoparticles that are suitable for embedding in a transparent optical element such as a plastic lens, using the methods of FIGS. 3-7 according to an exemplary embodiment of the invention, with more details than in the more general flowchart shown in FIG. 1A.

FIG. 2 shows a flowchart 200 for a method of producing silver nanoparticles, with more details than FIG. 1A. At 202, a soluble silver compound, such as silver nitrate ($AgNO_3$), is dissolved in water. For example, 40 mg of $AgNO_3$ is dissolved in 30 mL of water. This produces 25 mg of silver nanoparticles at the end of the method. At 204, a solution is prepared of branched polyethylenimine (PEI), a surfactant, in water. For example, 0.15 mg of PEI is dissolved in 10 mL of water. Alternatively a different surfactant and/or a different solvent is used, but the inventors have found that using branched PEI and water produces good results for silver nanoparticles. At 206, the $AgNO_3$ and PEI solutions are mixed together, making a total of 40 mL of solution, Optionally they are mixed together at an elevated temperature, for example mixing for 30 minutes at 60° C. has been found to produce good results.

At 208, a reducing agent is added quickly to the solution of $AgNO_3$ and PEI, for example within 1 or 2 seconds or less. For example, sodium borohydride ($NaBH_4$) has been found to work well for producing silver nanoparticles by this method. For example, 4 mg of $NaBH_4$ is dissolved in 0.5 mL of water, and 0.1 mL of that solution is added to the 40 mL of solution with the $AgNO_3$ and PEI. Alternatively, aniline is used as the reducing agent, for example 0.3 mL of pure aniline, as described in FIG. 1B for the gold nanoparticles.

At 210, the reducing agent and the $AgNO_3$ and PEI solution are stirred together for an extended time at a preparation temperature, for example 60° C., for example for one hour, precipitating silver nanoparticles. At 212, the solution with the nanoparticles is centrifuged, to remove heavier nanoparticles and any other particles of silver, which are discarded after the solution with the smaller nanoparticles is poured off and saved. At 214, the saved solution with the smaller nanoparticles is diluted with water. The amount of water used is enough, for example, to fill up most of the container that will be used to diffuse the nanoparticles into a lens. For example, in the experiments done by the inventors, 0.9 liters of water were used when the nanoparticles were going to be diffused into a lens at atmospheric pressure, in a 1-liter container, and 3.5 liters of water were used when the nanoparticles were going to be diffused into a lens at higher pressure in a 4-liter pressure cooker.

Optionally, all of the saved solution of nanoparticles, for example 40 mL, is diluted with the water. Alternatively, to produce a lower concentration of nanoparticles in the water, only some of the saved solution is diluted with the water, for example less than 5 mL, or between 5 and 10 mL, or between 10 and 20 mL, or between 20 and 40 mL, or more than 40 mL of the saved solution is produced, and more than 40 mL of it is added to the water, for example between 40 and 60 mL, or between 60 and 100 mL, or more than 100 mL.

At 216, the diluted solution, with precipitated nanoparticles, is passed through a filter, which removes larger nanoparticles, leaving smaller nanoparticles that are nearly uniform in size. As in the case of gold nanoparticles described above, a filter with 0.2 µm pore size works well, but requires a very high pressure difference to push the solution through it, and alternatively two filters with 50 µL pore size, one behind the other, also produce good results and require a much smaller pressure difference. The resulting nanoparticles, for example, are nearly spherical, with a standard deviation in diameter of more than 20%, or between 20% and 10%, or between 10% and 5%, or between 5% and 2%, or less than 2%. The average diameter is less than 5 nm, or between 5 nm and 10 nm, or between 10 nm and 20 nm, or between 20 nm and 30 nm, or between 30 nm and 50 nm, or between 50 nm and 100 nm, or greater than 100 nm. Using the procedure described, with $AgNO_3$ as the silver compound, $NaBH_4$ as the reducing agent, PEI as the surfactant, and water as the solvent, has been found to produce silver nanoparticles of diameter 20 nm.

Typically, using the method and parameters described, each 40 mL of the undiluted nanoparticle solution has about 25 mg of silver nanoparticles. Alternatively, each 40 mL has between 10 and 25 mg, or between 25 and 50 mg, of silver nanoparticles, or less than 10 mg or more than 50 mg. After diluting with the water, the resulting nanoparticle solution, which is used for diffusing nanoparticles into an optical element as described in FIGS. 3-7, has less than 0.3 mg of nanoparticles per liter of water, or between 0.3 and 1 mg per liter, or between 1 and 2 mg per liter, or between 2 and 5 mg per liter, or between 5 and 10 mg per liter, or between 10 and 20 mg per liter, or between 20 and 50 mg per liter, or between 50 and 100 mg per liter, or between 100 and 200 mg per liter, or more than 200 mg per liter.

Optionally, for either the gold nanoparticles or the bimetallic gold and silver nanoparticles prepared by the method of FIG. 1B, or the silver nanoparticles prepared by the method of FIG. 2, other material is dissolved in the water, either before or after the filtering, and, if before the filtering, either before or after the undiluted nanoparticle solution is added to the water. For example, an acid or alkali is added to the water, to change its pH. As noted below in the description of FIG. 11, the pH of the solution can have a substantial effect on the rate of diffusion of the nanoparticles into the lens. In the experiment described there, the greatest diffusion rate was obtained for a pH between 8 and 11.

Diffusing Nanoparticles into Optical Element Using a Pressure Cooker

Figure 3:
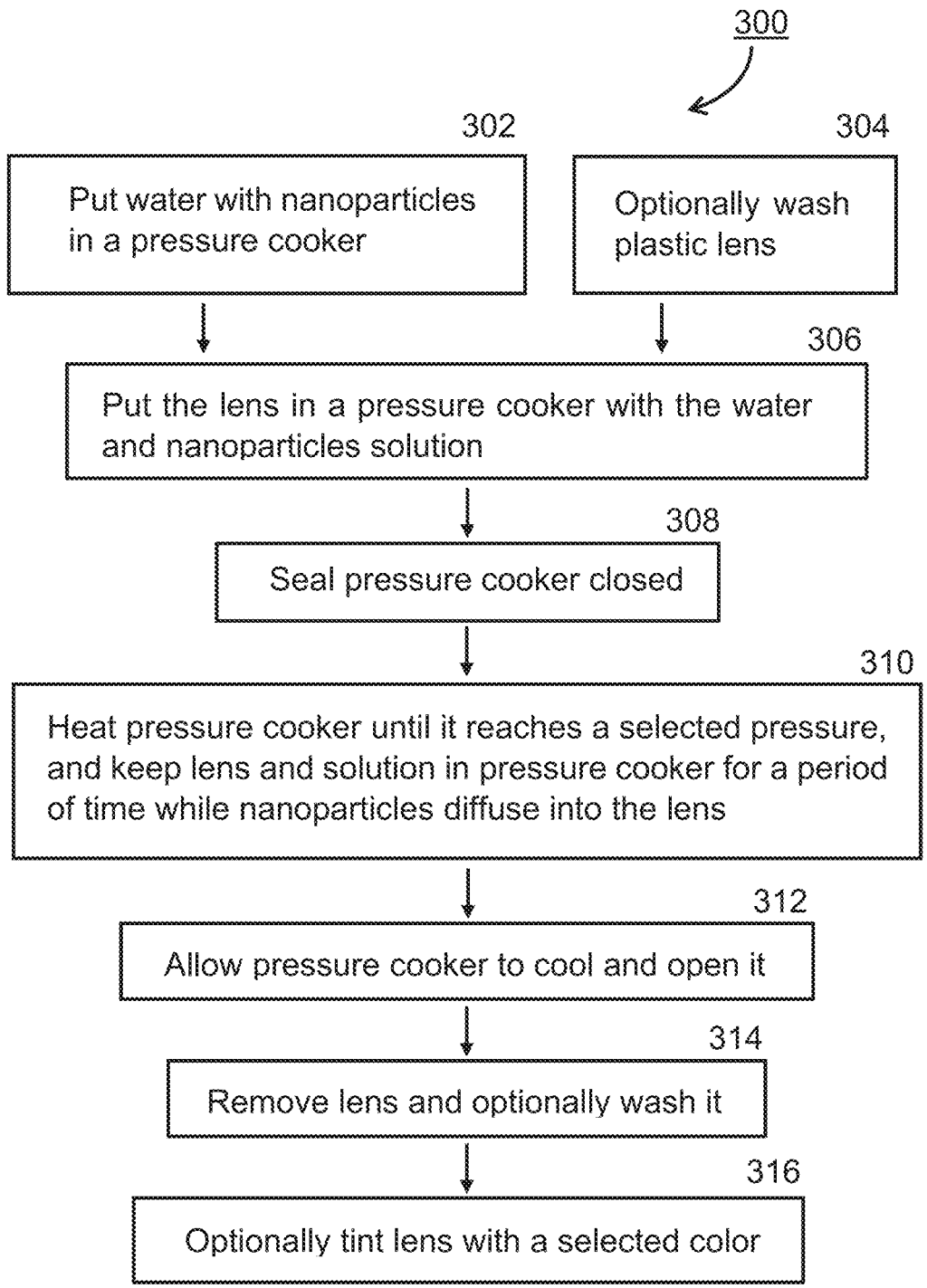
FIG. 3 is a flowchart for a method of diffusing nanoparticles, such as those made according to the methods of FIGS. 1B and 2, into a transparent optical element such as a plastic lens, using a pressure cooker, according to an exemplary embodiment of the invention.
Figure 4:
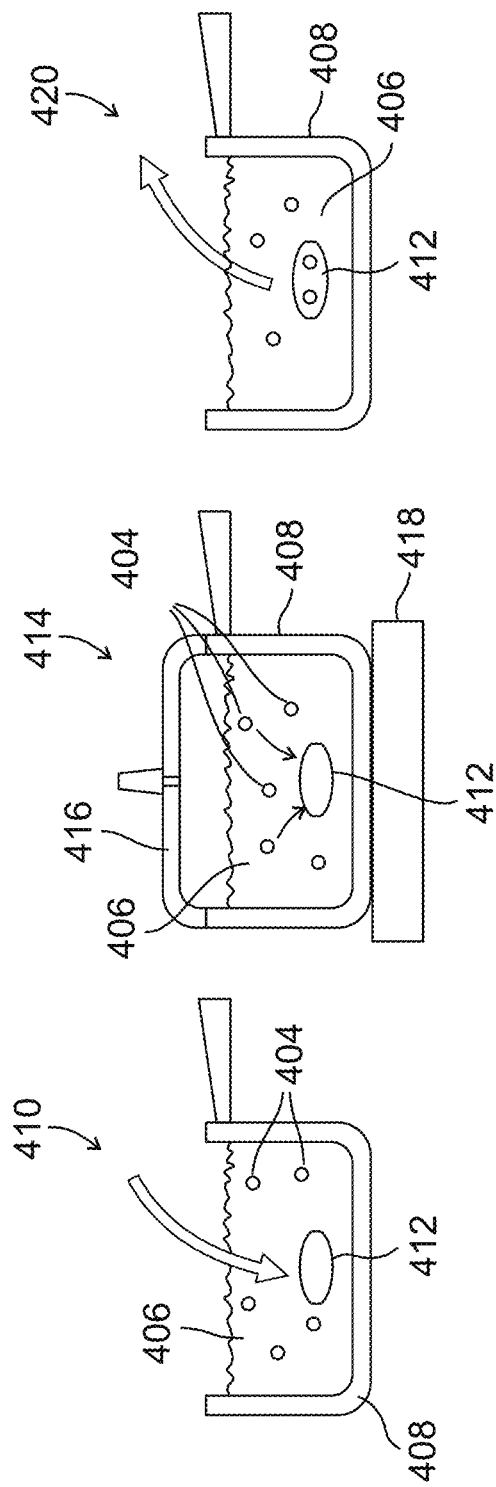
FIG. 4 is a drawing schematically illustrating the elements of the method of the flowchart of FIG. 3, according to an exemplary embodiment of the invention.

FIG. 3 shows a flowchart 300 for a method of diffusing nanoparticles, dissolved or suspended in water, into a transparent optical element immersed in the water, such as a plastic eyeglass lens. The method uses a pressure cooker to heat the water to temperatures above 100° C., according to an exemplary embodiment of the invention. The method works with a wide variety of plastics used for eyeglass lenses, including high density and low density plastics, and photochromic and non-photochromic lenses. This is illustrated, for example, in the plots of transmission vs. wavelength shown in FIGS. 8-14B and 17A-18C below. FIG. 4 shows a series of schematic drawings illustrating the method of flowchart 300. Optionally, instead of using water to diffuse the nanoparticles into the optical element, another solvent, or a mixture of water and another solvent, or water and/or another solvent with a solute dissolved in it, is used, and in this case the pressure cooker can be used to reach temperatures above the boiling point of the solvent, whatever it is. Using a solvent other than water, or using a mixture of water and another solvent, or water and/or another solvent with a solute dissolved in it, may also be done for diffusing nanoparticles into a transparent optical element at atmospheric pressure, using a container that is not pressurized.

At 302 of the flowchart, the diluted solution of nanoparticles in water, prepared for example using the methods described in FIG. 1B or FIG. 2, is put in a pressure cooker. In the experiments done by the inventors, a water volume of 3.5 liters was used in the pressure cooker, and the volume of nanoparticle solution before dilution with the water was, for example, 5 mL, or 10 mL, or 20 mL, or 40 mL, or 50 mL. When the method of FIG. 1B was used to prepare gold nanoparticles, the mass of the gold nanoparticles was 28 mg for each 40 mL of undiluted solution. It should be understood that the term "nanoparticle solution" is used herein to describe nanoparticles suspended in water or another liquid. Because nanoparticles are intermediate in size between molecules, which are considered to be dissolved, and microscopic particles, which are considered to be suspended, it is somewhat arbitrary whether such nanoparticles suspended in water or ethylene glycol are referred to as a "solution" or a "suspension" of nanoparticles. It should also be understood that terms such as "nanoparticle solution in water" may refer to a solution in water that has other material dissolved in it as well, for example to change its pH. But optionally, any other material dissolved in the water is of a small enough quantity, for example less than 2% or less than 1% or less than 0.5% or less than 0.2% of the water by weight, that it has a negligible effect on the boiling point of the water, for example it affects the boiling point by less than 5° C. or less than 2° C. or less than 1° C. or less than 0.5° C.

At 304 of flowchart 300, a plastic eyeglass lens, or other optical element, is optionally washed, for example in water, which may remove surface contamination that may inhibit nanoparticles from diffusing into the surface. At 306 of flowchart 300, corresponding to drawing 410 of FIG. 4, lens 412 is placed in pressure cooker 408 with water 406 and nanoparticles 404. Optionally, the lens 312 other optical element rests on a support, not shown in FIG. 4, when it is in pressure cooker 408, which has the potential advantage that the support may make it possible to better control which part of the surface of the lens or other optical element are exposed to the water and nanoparticles and which are not. At 308, and drawing 414 of FIG. 4, the pressure cooker is sealed closed with cover 416, and at 310, the pressure cooker is heated on a heater 418 until it reaches a pressure, above atmospheric pressure, and it is optionally kept at a pressure above atmospheric pressure, for a selected period of time, while nanoparticles 404 diffuse into lens 412. Optionally, the pressure cooker is maintained at a constant selected pressure during this period of time. In a pressure cooker, the temperature is typically equal to the boiling point of the water at that pressure, since it is the steam resulting from the boiling of the water that increases the pressure. The diffusion rate of nanoparticles into the lens depends on the temperature of the water, which in turn depends on the pressure. Maintaining the pressure cooker at a selected pressure, for a selected period of time, has the potential advantage that the final concentration of nanoparticles in the lens will be consistent, resulting in a product with a consistent transmission curve as a function of wavelength. For most of the experiments done by the inventors, the pressure cooker was maintained at a pressure of 0.9 bar above atmospheric pressure, or a total pressure of 1.9 bar, while the nanoparticles diffused into the lens. This corresponds to a temperature (a boiling point of water) of 118.6° C. In other experiments, the pressure was maintained at 0.55 bar above atmospheric pressure, which corresponds to a temperature of 112° C., and at 0.75 bar above atmospheric pressure, which corresponds to a temperature of 116° C. In most of these experiments, the maximum pressure was maintained for 40 to 60 minutes, but other time periods are optionally used, for example 10 minutes, or 20 minutes, or 80 minutes, or 120 minutes, or longer, intermediate, or shorter time periods. In general, it was found that, for a given type of lens material, and keeping other parameters constant, a longer time period and a higher pressure resulted in a greater concentration of nanoparticles in the lens.

However, it was found that using too high a pressure, for too long a time, could damage the optical quality of the lens. No damage was seen, for any of the lenses tested, with a pressure of 0.9 bar above atmospheric pressure, maintained for 60 minutes or less. As used herein, the optical quality of the lens refers to the lens not scattering light randomly from its surface, or from internal faults, in a way that might interfere with clarity of vision of a person looking at something through the lens, for example from frosting or scratches on the surface, or internal cracks, and refers to the shape of the lens, and the index of refraction of the lens, not being changed in a way that would visibly change its optical properties.

At 312, the pressure cooker is allowed to cool, and it is opened. At 314 of flowchart 300, and drawing 420 of FIG. 4, lens 412 is removed from water 406, and optionally washed, for example with water or ethanol. This washing may remove nanoparticles and any other material that may be loosely adhering to the surface without being embedded in or firmly bound to the lens, and which may come off easily later, changing the transmission curve. Removing this material during the manufacturing process by washing it off may help to keep the transmission curve consistent over the lifetime of the lens. Such material adhering loosely to the surface may also inhibit tint from diffusing into the lens, or may make the rate of diffusion of tint unpredictable, or may make the amount of tint in the lens inhomogeneous over the area of the lens, potential problems that can potentially be avoided if the lens is washed off.

At 316, tint of a selected color is optionally diffused into the lens, optionally with the lens resting on a support. Optionally, this is done using conventional tinting machines used for tinting eyeglass lenses, in which the lens is immersed in water, with tint dissolved in it, for example at a temperature of 90° to 95° C., for a duration between 30 minutes and 6 hours. Alternatively, tint and nanoparticles are diffused into the lens at the same time, which has the potential advantage that only a single step is needed. But diffusing tint and nanoparticles into the lens in separate steps, has the potential advantage that different time periods and temperatures can be used for diffusing the nanoparticles and diffusing the tint. In general, the optimum time periods and temperatures for diffusing nanoparticles and diffusing tint into the lens may be very different. Alternatively, if separate steps are used for diffusing the tint and diffusing the nanoparticles, the tint is diffused into the lens first. But diffusing the nanoparticles into the lens before diffusing the tint into the lens has the potential advantage that, as the inventors have observed, the tint may diffuse into the lens more quickly if the lens already has nanoparticles embedded in it.

Using a Lens with Chemical Surface Activation

Figure 5:
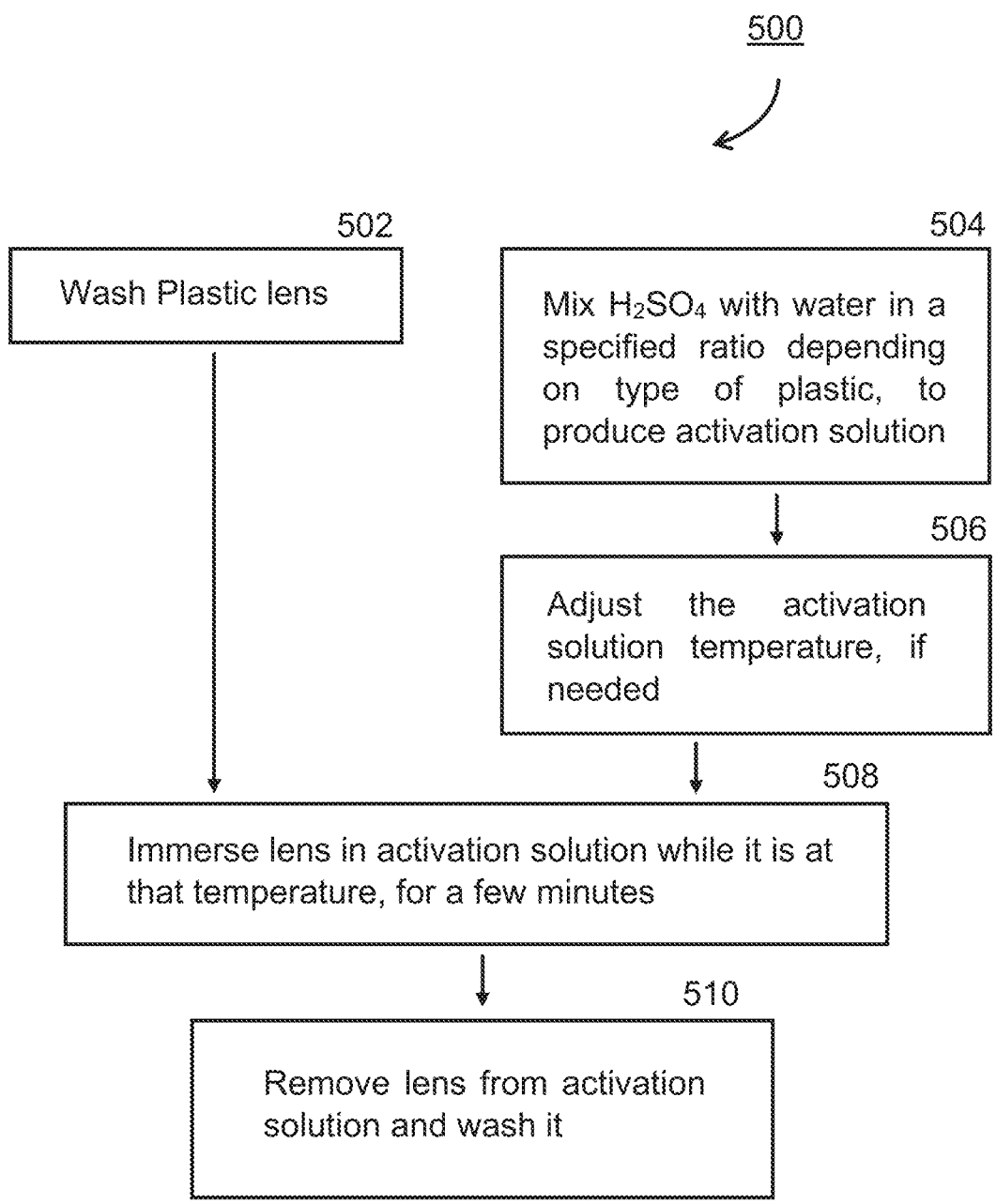
FIG. 5 is a flowchart for a method of chemically activating the surface of a transparent optical element, such as a plastic lens, to increase the diffusion of nanoparticles into it, according to an exemplary embodiment of the invention.
Figure 6:
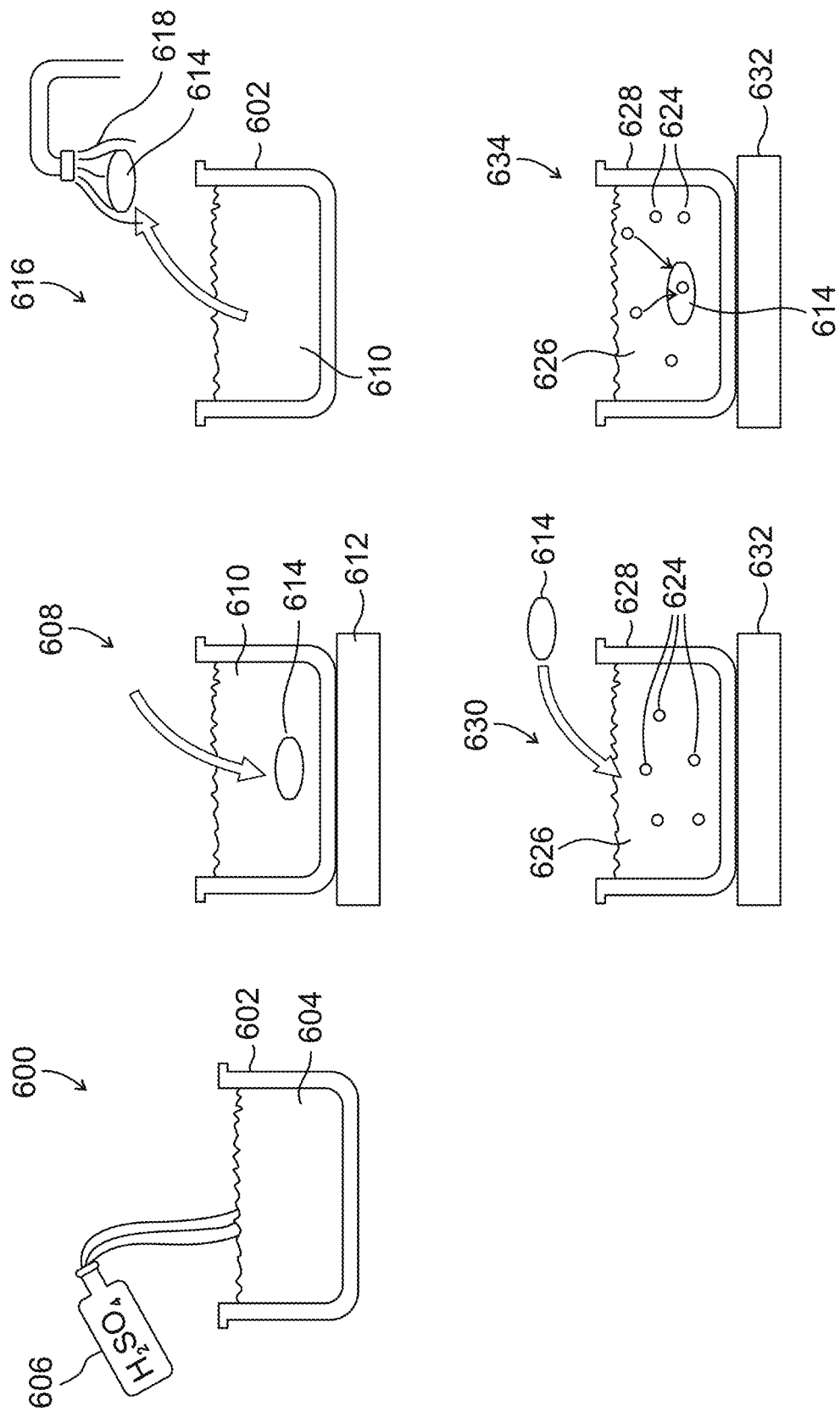
FIG. 6 is a drawing schematically illustrating the elements of the method of activating a surface described in the flowchart of FIG. 5, and the method of diffusing nanoparticles through the activated surface described in the flowchart of FIG. 7, according to an exemplary embodiment of the invention.
Figure 7:
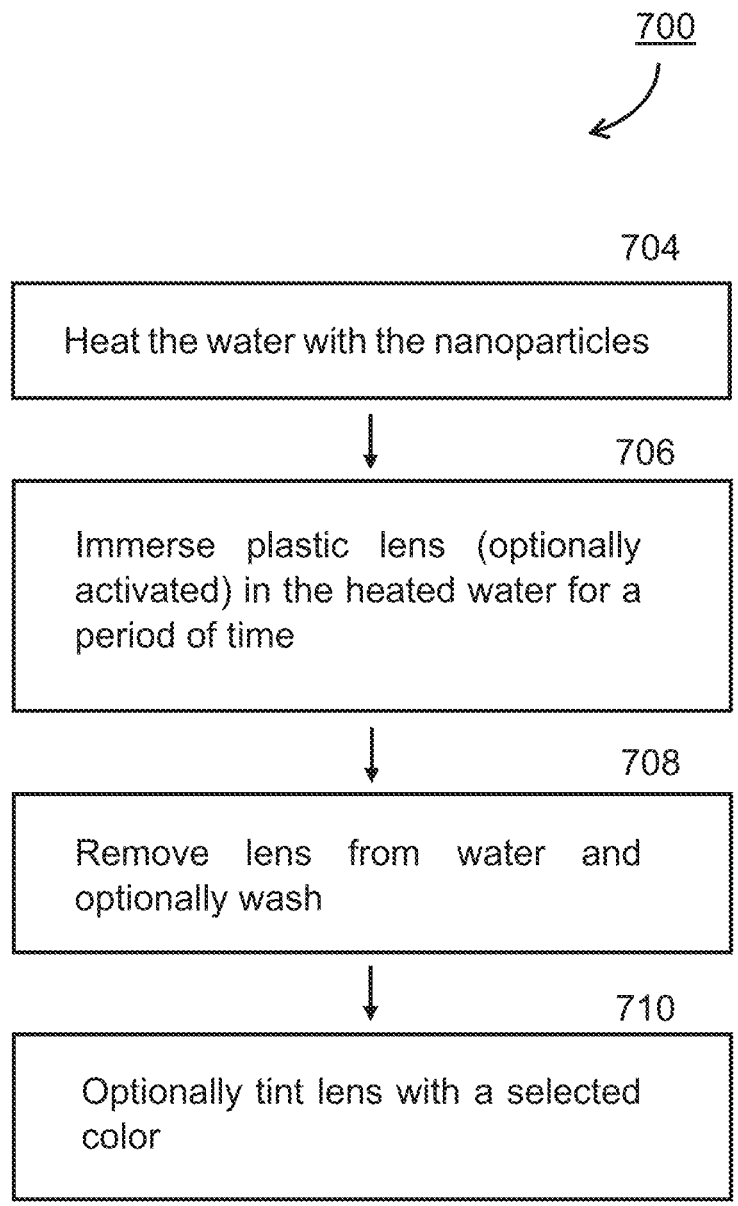
FIG. 7 is a flowchart for a method of diffusing nanoparticles into a transparent optical element, such as a plastic lens, after activating its surface according to the method of the flowchart in FIG. 5, according to an exemplary embodiment of the invention.

FIG. 5 shows a flowchart 500 for a method of chemically activating the surface of a lens, or another transparent optical element, to increase the ability of nanoparticles to diffuse into the lens. FIG. 6 schematically illustrates the process of chemically activating the surface of the lens, and FIG. 7 shows a flowchart 700 for a method of diffusing nanoparticles into a lens with a chemically activated surface.

At 502 the lens, or other optical element, is optionally washed, for example with water. This washing has the potential advantage of ensuring that the surface will be clean, without surface contamination that might interfere with the activation. At 504 in flowchart 500, corresponding to drawing 600 in FIG. 6, sulfuric acid 606 ($H_2SO_4$), for example 95%-97% analytical, is added to water 604, optionally de-ionized water, in container 602, in a specified ratio, depending on the type of plastic that the lens is made of, to produce an activation solution. The inventors have found that the following ratios of water to sulfuric acid give good results for these kinds of plastic used for eyeglass lenses.

TABLE 1

Ratio of water to sulfuric acid for surface activation of different lens materials

| Lens material | Refractive index | Ratio of water to acid |
| --- | --- | --- |
| CR-39 | 1.499 | 30:40 |
| Q-Change | 1.56 | 15:40 |
| MR8 | 1.6 | 15:40 |
| MR7 | 1.67 | 20:40 |

These ratios of water to sulfuric acid activate the surface of the lens, substantially increasing the diffusion rate of nanoparticles into the lens, for example at least doubling the diffusion rate, but do not damage the surface of the lens in a way that would affect its optical quality, using an activation time of 30 seconds to 3 minutes, at 70° C. to 78° C.

Here, "doubling the diffusion rate of nanoparticles into the lens" means, for example, that the same final concentration of nanoparticles in the lens, the number of nanoparticles per area of the lens, as indicated by the transmission curve, is at least twice as great, relative to what the concentration of nanoparticles would be with the same protocol without activating the surface of the lens, at least for some protocols. The "protocol" includes the type of material and shape and size of the lens, the volume of undiluted nanoparticle solution in the water, the way the undiluted nanoparticle solution is prepared, the volume of water, the diffusion time interval, and the water temperature. Increasing the diffusion rate may allow the same transmission curve to be achieved with a shorter diffusion time interval, or may allow a higher saturation concentration of nanoparticles to be achieved.

Adding the sulfuric acid to water at 504 produces an exothermic reaction that may heat the water, for example to about 100° C. At 506, the temperature of the activation solution is adjusted, for example to a specified temperature or temperature range between 70° C. and 95° C., by letting it cool if is above the specified temperature, or by heating it if it has fallen below the specified temperature. The specified temperature for activating the surface of the lens may depend on the type of plastic. For CR-39, MR7 and MR8, the inventors have found that the activation works best if the activation solution is at a temperature of 70° C. to 78° C. For Q-change, temperatures from 70° C. to 95° C. appear to work well. At 508, corresponding to drawing 608 in FIG. 6, lens 614 is immersed in activation solution 610 for a period of time, for example between 30 seconds and 3 minutes, while the activation solution is heated by a heater 612. At 510, corresponding to drawing 616 in FIG. 6, lens 614 is removed from activation solution 610 and optionally washed, for example with water 618. Washing the lens with water has the potential advantage that remaining acid on the surface is removed, and does not damage the surface.

At 704 in flowchart 700, corresponding to drawing 630 in FIG. 6, nanoparticles 624 diluted in water 626, for example 0.9 liters of water, prepared for example according to the method of FIG. 1B or FIG. 2, are heated in a container 628 by heater 632, for example to a selected temperature or temperature range between 85° C. to 100° C., optionally between 90° C. and 95° C. At 706, corresponding to drawings 630 and 634 in FIG. 6, activated lens 614 is immersed in heated water 626 for a selected time interval. Optionally, the lens rests on a support, not shown in FIG. 6, when it is immersed in the heated water, which has the potential advantage that the support may make it possible to better control which parts of the surface of the lens are exposed to the water and nanoparticles and which are not. Alternatively, lens 614 is immersed in water 626 before it is heated, and the water is heated with the lens already immersed in it. Immersing the lens only after the water has reached the selected temperature has the potential advantage that it may be possible to more precisely control the time period of the diffusion of nanoparticles into the lens, and to more precisely control the final concentration of embedded nanoparticles in the lens. The time interval is, for example, between 10 minutes and 3 hours. A typical time interval used in experiments by the inventors was 40 minutes, and is some experiments a time interval of 80 or 120 minutes was used.

At 708, the lens is removed from the water and optionally washed, for example with water or ethanol, similarly to what is described for 314 in flowchart 300. At 710, a tint is optionally diffused into the lens, for example using a conventional tinting machine used for tinting eyeglass lenses, similar to what is described for 316 in flowchart 300.

In some embodiments of the invention, a portion of the surface of the lens is blocked from having nanoparticles diffuse into it by covering it with some material during the diffusion of nanoparticles into the lens. Alternatively or additionally, a portion of the surface of the lens is blocked from having nanoparticles diffuse into it, or has a reduced number of nanoparticles diffuse into it, by covering that portion of the lens surface by some material when the lens surface is being activated. This procedure can produce a lens in which different areas of the lens have different transmission curves. For example, it may be desirable for the upper and lower portions of bifocal lenses to have different transmission curves. Or it may be desirable for thicker and thinner areas of a lens to have different diffusion rates of nanoparticles, for example to make the transmission curves of thicker and thinner areas more similar to each other than they would be if the diffusion rate were uniform across the lens. Optionally, there are two of more stages of diffusing nanoparticles into the lens, with different parts of the surface blocked at different stages, to produce a lens with a more complicated nanoparticle concentration as a function of location on the area of the lens.

Dependence of Transmission Curve on Concentration of Nanoparticles

FIG. 8 shows a schematic plot 800 of percent transmission as a function of wavelength, for eyeglass lenses with different concentrations of embedded gold nanoparticles. The percent transmission for light of a given wavelength is defined herein as the ratio of transmitted light to incident light at that wavelength, through the thickness of the lens, averaged over the area of the lens, for incident light that is propagating in a direction that is normal to the surface of the lens at its center, and is uniform in intensity over the area of the lens. But for the lenses whose transmission curves are given herein, the inventors found that the percent transmission was almost the same when measured with a narrow beam going through the center of the lens, since the transmission is quite uniform over the area of the lens.

The different lenses whose transmission curves are shown in FIG. 8 have different concentrations of nanoparticles because different quantities of nanoparticles were added to the water before diffusing the nanoparticles into the lens, and because the diffusion into the lens was continued for different time intervals. All of the lenses were made out of CR-39 plastic, without chemically activating the surface, keeping the water at 90° C. to 95° C. at atmospheric pressure. Curve 802 shows the transmission for the lens before diffusing nanoparticles into it. The transmission is very low, less than 1%, at wavelengths below 340 nm, but rises to 90% at 400 nm, and remains at 90% for longer wavelengths. Curve 804 shows the transmission using 5 mL of the undiluted gold nanoparticle solution in ethylene glycol, prepared according to the method described in FIGS. 1A-B, with 28 mg of gold nanoparticles per 40 mL of undiluted nanoparticle solution, and with the undiluted solution diluted in 0.9 liters of water, and with a diffusion time interval of 40 minutes. Curve 806 shows the transmission for a lens prepared using the same parameters, but using 10 mL of the undiluted gold nanoparticles solution. Curve 808 shows the transmission for a lens prepared using the same parameters, but using 20 mL of the undiluted gold nanoparticle solution. Curve 810 shows the transmission for a lens prepared using the same parameters as the lens for curve 808, but using a diffusion time interval of 80 minutes. Curve 812 shows the transmission for a lens prepared using the same parameters as the lens for curves 808 and 810, but using a diffusion time interval of 120 minutes.

As expected, using a higher concentration of nanoparticles in the water, or a longer diffusion time interval, results in a lens with a larger concentration of embedded nanoparticles, and hence with a lower percent transmission at each wavelength, but with transmission curves of similar shape. However, there is very little difference between curves 810 and 812, indicating that the concentration of nanoparticles in the lens saturates when 20 mL of undiluted nanoparticle solution is used, with diffusion time interval of 80 minutes, and using a longer diffusion time interval results in very little increase in the number of nanoparticles embedded in the lens. Without limiting the possible explanations for this effect, the inventors believe that this saturation occurs because the surface of the lens becomes full of attached nanoparticles, which do not diffuse further into the lens, possibly blocked by nanoparticles that are already diffused further into the lens, and these nanoparticles on the surface of the lens block other nanoparticles in the water from attaching to the surface of the lens and diffusing into it. It is not known what the distribution of embedded nanoparticles is as a function of depth beneath the surface of the lens, at saturation.

Even at the saturation concentration of nanoparticles, the transmission is 50% to 60% at 400 nm to 530 nm, much greater than the 10% transmission that is desired in that range of wavelengths. To achieve the higher concentrations of nanoparticles needed to get the transmission below 10% in this range of wavelengths, chemical surface activation or a pressure cooker can be used, as will be described below.

Transmission Curves for Lenses Prepared with a Pressure Cooker

FIGS. 9A and 9B show the effect of using a pressure cooker on the concentration of embedded gold nanoparticles, in two different kinds of plastic used for eyeglass lenses, one of lower index of refraction and one of higher index of refraction. FIG. 9A shows a plot 900 of transmission curves as a function of wavelength for lenses made of CR-39, a plastic with the relatively low index of refraction of 1.499. Curve 902 shows the transmission curve for the lens without any embedded nanoparticles, the same curve as curve 802 in FIG. 8. Curve 904 shows the transmission curve for gold nanoparticles diffused into the lens, without chemical activation of the surface, at atmospheric pressure, at a temperature of 90° C. to 95° C., using 20 mL of undiluted gold nanoparticle solution, containing 14 mg of gold nanoparticles, diluted by 0.9 liters of water, with a diffusion time interval of 120 minutes. This is the same as curve 812 in FIG. 8, and represents the maximum concentration of gold nanoparticles that can be obtained at atmospheric pressure without chemically activating the surface of the lens. Curve 906 shows a transmission curve for the same type of lens, with the same ratio of gold nanoparticle mass to volume of water, and the same diffusion time interval, but using a pressure cooker with a pressure of 0.9 bar above atmospheric pressure, at a temperature of 118.6° C. In this case, the concentration of nanoparticles in the lens is substantially higher, and the transmission at a given wavelength is substantially times lower than for curve 904, for example the transmission is below 20% between 400 nm and 530 nm, instead of between 50% and 60%.

FIG. 9B shows a plot 908, similar to plot 900, but for lenses made from MR8, with a higher index of refraction, 1.6 rather than 1.499. The plastic with higher index of refraction has higher density, and it is more difficult to diffuse nanoparticles into it. In FIG. 9B, curve 910 is the transmission curve for the lens without any nanoparticles diffused into it. The transmission is very low, less than 1%, below 400 nm, but rises to about 90% above 430 nm. For this higher density plastic, without chemically activating the surface of the lens, no detectable gold nanoparticles diffuse into the lens at atmospheric pressure and temperatures below 100° C., even with a high concentration of nanoparticles in the water and a long diffusion time interval, so the curve for that case would be the same as curve 910. Curve 912 is the transmission curve for the greatest concentration of gold nanoparticles that could be diffused into the lens, without chemically activating the surface, using a pressure cooker at 0.9 bar above atmospheric pressure, at 118.6° C., The transmission is substantially lower than for the lens without embedded nanoparticles, but substantially higher than when the pressure cooker is used with a lower density plastic, as seen in curve 906 of FIG. 9A.

Transmission Curves for Chemically Activated Lenses

FIG. 10 shows a plot 1000 of transmission as a function of wavelength, for lenses made of CR-39, a plastic with relatively low index of refraction, using chemical activation of the surface, with different concentrations of gold nanoparticles. Curve 1002 shows the transmission for the lens without any embedded nanoparticles, and is the same as curve 802 of FIG. 8. Curve 1004 is the transmission curve for a lens in which nanoparticles are diffused for a time interval of 40 minutes, using 40 mL of undiluted nanoparticle solution prepared according to the method of FIGS. 1A-B, diluted with 0.9 liters of water. Curve 1006 show the transmission for a lens prepared in the same way, but using a diffusion time interval of 80 minutes. Curve 1008 shows the transmission for a lens prepared in the same way, but using a diffusion time interval of 120 minutes. At this diffusion time interval and volume of undiluted nanoparticle solution, the concentration of nanoparticles in the lens is saturated, and using a longer diffusion time interval or a larger volume of undiluted nanoparticle solution would not increase the concentration of nanoparticles in the lens any further. Curves 1004, 1006 and 1008 may be compared with curves 808, 810 and 812, which used the same quantity of undiluted nanoparticle solution and the same diffusion time intervals, but without chemical activation of the surface of the lens. Chemical activation results in a considerably greater concentration of embedded nanoparticles, and a considerably lower transmission at any given wavelength.

Effect of pH and Ligand Type on Nanoparticle Diffusion Rate

FIG. 11 shows a plot 1100 of transmission curves as a function of wavelength, for lens made of MR8 plastic with a refractive index of 1.6, relatively high, showing the effect of using different values of pH in the water from which the nanoparticles are diffusing into the lens. A pressure cooker was used, with 3.5 liters of water, at a pressure of 0.9 bar above atmospheric pressure, corresponding to 118.6° C. water temperature. For each curve, the volume of undiluted gold nanoparticle solution was 40 mL, and the diffusion time interval was 40 minutes, which produced about 50% of the saturation concentration of gold nanoparticles for MR8 lenses using a pressure cooker at 0.9 bar. This is the same concentration of gold nanoparticles that the inventors found gave good transmission curves for lenses with both embedded gold nanoparticles and tinting, as described in FIGS.

14A and 14B. Saturation of the concentration of gold nanoparticles in this lens could be obtained with a diffusion time interval of 120 minutes, using 40 mL of undiluted nanoparticle solution.

Curve 1102 shows the transmission for the lens without any embedded nanoparticles, and is the same as curve 910 in FIG. 9B. Curve 1104 shows the transmission when the water had a pH of 5. Curve 1106 shows the transmission when the water had a pH of 8, and is the same as curve 912 in FIG. 9B. Curve 1108 shows the transmission when the water had a pH of 11. The greatest diffusion of nanoparticles was achieved when the water had a pH of 8, with the diffusion almost as great when the water had a pH of 11.

FIG. 12 shows a plot 1200 of transmission as a function of wavelength, for lenses, with chemically activated surface, made of Q-CHANGE, a photochromic plastic with an index of refraction of 1.56, showing the effect of using gold nanoparticles coated with different types of ligand. The type of ligand depends on the surfactant used when precipitating the nanoparticles, according to the method of FIGS. 1A-B. Curve 1202 is the transmission curve for the lens, with chemically activated surface, without embedded nanoparticles. Curve 1204 is the transmission curve for a lens, using PEI as the surfactant, and water as the solvent, when precipitating the nanoparticles. Curve 1206 is the transmission curve for a lens, using ethylene glycol as a surfactant and as a solvent, when precipitating the nanoparticles. Using ethylene glycol results in gold nanoparticles with a much greater diffusion rate into the lens than using PEI, and in the other experiments done by the inventors with gold nanoparticles, ethylene glycol was used as the surfactant and solvent.

Use of Nanoparticles in Lenses to Block Ultraviolet

Curve 1202 has a small bump 1208, centered at 320 nm in the ultraviolet, where the transmission is about 2.5%. This much ultraviolet light at 320 nm can cause harm to the user's eyes. When the lens has enough gold nanoparticles to keep the transmission below 10% between 400 nm and 530 nm, then transmission will be much lower than 2.5%, even below 0.1%, at 320 nm, providing good protection for the user's eyes. As noted above, if the nanoparticles are confined mostly to a thin layer at the back of lens, on the side facing the user's eyes, and/or the photochromic material is confined to a surface layer at the front of the lens, facing the sunlight, then the nanoparticles can protect the user's eyes from ultraviolet light, including at 320 nm, without blocking ultraviolet in sunlight from activating the photochromic material when the user is in sunlight.

Transmission Curves for Gold, Silver, and $Au_xAg_{1-x}$ Nanoparticles

FIG. 13 shows a plot 1300 of transmission curves as functions of wavelength for a lens with embedded gold nanoparticles, a lens with embedded silver nanoparticles, and a lens with embedded bimetallic gold-silver nanoparticles ($Au_xAg_{1-x}$, with x believed to be about 0.67, based on the initial amounts of $HAuCl_4 \cdot 3H_2O$ and $AgNO_3$ used, and on the shape of the absorption curve). All the lenses are made from CR-39 plastic, without chemical activation of the surface, using a pressure cooker at a pressure of 0.9 bar above atmospheric pressure. The nanoparticles were made using the methods of FIG. 1B and FIG. 2. All three lenses used 40 mL of undiluted nanoparticle solution diluted in 3.5 liters of water, with a diffusion time interval of 120 minutes which is enough to saturate the concentration of embedded nanoparticles. A long diffusion time interval was not used because it was found that using a longer diffusion time interval, at such a high temperature, can damage the lens.

Curve 1302 is the transmission curve for the lens without embedded nanoparticles, and is the same as curve 802 in FIG. 8. Curve 1304 is for the lens with silver nanoparticles, curve 1306 is for the lens with bimetallic gold-silver nanoparticles, and curve 1308 is the curve for gold nanoparticles. Curve 1308 looks similar to curve 812 in FIG. 8, which used a higher concentration of nanoparticles, 20 mL diluted in 0.9 liters of water, but did not use a pressure cooker, and the concentration of gold nanoparticles in the lens is apparently about the same in the two cases. At least for CR-39 without surface activation and using a pressure cooker at 0.9 bar, and maybe under other conditions as well, greater absorption of light can be obtained using gold nanoparticles, than using silver or bimetallic gold-silver nanoparticles. All three curves have a qualitatively similar shape.

Transmission Curves for Green Tint Alone, and Green Tint with Nanoparticles

FIG. 14A shows a plot 1400 with transmission curves as a function of wavelength, for an MR8 lens, of refractive index 1.6, with green tint alone, and with green tint plus embedded gold nanoparticles. The nanoparticles were diffused into the lens using a pressure cooker at 0.9 bar above atmospheric pressure without chemical activation of the surface. Curve 1402 is the transmission curve for the lens without nanoparticles or tint, and is the same as curve 910 in FIG. 9B and curve 1102 in FIG. 11.

Curve 1404 is the transmission curve for a lens with green tint but no nanoparticles. Just enough green tint was used to keep the transmission less than 10% throughout the range of wavelengths between 400 nm and 530 nm. The maximum transmission in this range was 10%, at 510 nm. Because the green tint has much lower transmission at 560 nm to 640 nm, than at 510 nm, the average transmission between 560 nm and 640 nm is quite low, about 1%. Together with the fact that the transmission is also quite low between 400 nm and 560 nm, this makes the lens very dark, too dark to easily see through. Only 6.2% of white light, defined as light of equal intensity per unit wavelength between 400 nm and 700 nm, would be transmitted through the lens. This much green tint would not normally be used in sunglasses, but if much less green tint is used, so that the glasses are easy to see through, for example so that the average transmission between 560 nm and 640 nm is 2.5% or more, then the transmission will not be below 10% at all wavelengths between 400 and 530 nm, and the user's eyes will be exposed to these potentially harmful wavelengths.

This problem can potentially be solved if the green tint is combined with embedded gold nanoparticles in the lens. Curve 1406 shows a transmission curve for such a lens. The gold nanoparticles were diffused into the lens using a pressure cooker at 0.9 bar above atmospheric pressure, without chemical activation of the surface, using 40 mL of undiluted gold nanoparticle solution diluted in 3.5 liters of water, with a diffusion time interval of 40 minutes, the same parameters used for FIG. 11. This concentration of gold nanoparticles is about 50% of the maximum concentration that could be achieved in an MR8 lens using a pressure cooker at 0.9 bar. The amount of green tint was adjusted so that the transmission at all wavelengths between 400 nm and 530 nm would be 10% or less. The maximum transmission between 400 nm and 530 nm is again 10% at 510 nm. This requires less green tint than in the situation where there are no embedded nanoparticles. Because the gold nanoparticles, unlike the green tint, transmit much more light at 560 nm to 640 nm than they do at 400 nm to 530 nm, the average transmission between 560 nm to 640 nm is 2.5%, much greater than for curve 1404, and the lenses will be easy to see through. A total of 9.4% of white light would be transmitted through the lens. With this concentration of green tint and gold nanoparticles, the lens appears visibly green. If a higher concentration of gold nanoparticles were used, the lens would not appear so green, but the color would be more affected by the nanoparticles, which impart a pink or purple color to the lens.

A similar result will pertain for blue-grey tint, which also has a peak in transmission between 400 and 530 nm, and low transmission between 560 nm and 640 nm. The grey tint may also have a peak in transmission between 400 and 530 nm, and low transmission between 560 and 640 nm, so the addition of gold nanoparticles to the lens will have a similar advantage for lenses with grey tint.

Transmission Curves for Lens with Gold Nanoparticles and Tints of Different Colors FIG. 14B shows a plot 1408 of transmission curves for an MR7 lens, with an index of refraction of 1.67, with embedded gold nanoparticles and tints of three different colors, green, blue-grey, and brown. As in FIG. 14A, the concentration of tint and the concentration of nanoparticles were adjusted so that the transmission was less than 10% for all wavelengths between 400 nm and 530 nm, while the average transmission between 530 nm and 640 nm was greater than 2.5%. But the concentration of nanoparticles was low enough so that the lens had the color of the tint, rather than the pink or purple color imparted by the nanoparticles. The lenses were prepared using a pressure cooker, at 0.9 bar, with 40 mL of undiluted gold nanoparticle solution diluted in 3.5 liters of water, and a diffusion time interval to 40 minutes, to diffuse the nanoparticles into the lens. Even though MR7 has a higher index of refraction than MR8, the inventors have found that, using a pressure cooker at 0.9 bar, nanoparticles diffuse about equally quickly, or even slightly more quickly, into MR7 than into MR8. This may be related to the fact that MR7 has a softer surface than MR8, and scratches more easily.

Curve 1410 is the transmission curve for the lens without any tint or nanoparticles. Curve 1412 shows the transmission for green tint with nanoparticles. Curve 1414 shows the transmission for blue-grey tint with nanoparticles. Curve 1416 shows the transmission for brown tint with nanoparticles. A detailed plot 1418 of the wavelength range between 400 and 600 nm, with the vertical axis only showing the range between 0% and 12% transmission, makes it easier to see the differences between curves 1412 and 1414, which make the lens look green in the case of curve 1412, and blue-grey in the case of curve 1414. Curve 1412 has a peak at about 500 nm, in the green, and curve 1414 has a peak at about 485 nm, in the blue-green. In addition curve 1412 is skewed more toward the long wavelength side, rising more rapidly with wavelength to the left of the peak and falling more slowly with wavelength to the right of the peak, while curve 1414 is skewed more toward the short wavelength side, rising more slowly with wavelength to the left of the peak and falling more quickly with wavelength to the right of the peak. The average transmitted wavelength, for white light going through the lens for curve 1412, is about 510 nm, and the average transmitted wavelength, for white light going through the lens for curve 1414 is about 465 nm. This difference in the peaks and the shapes of curves 1412 and 1414 accounts for the difference in color of the two lenses. Curve 1416, for a lens with brown tint, is quite different, rising monotonically as a function of wavelength.

Use of Nanoparticles in Photochromic Lenses to Reduce Transmission at 400-530 nm FIG. 15 shows a flowchart 1500 for a method of diffusing nanoparticles into photochromic optical elements, for example plastic photochromic lenses, that can provide additional protection against visible light in the range between 400 and 530 nm, that may be harmful to the eye, especially for people with diabetes. This is in addition to the potential benefit, discussed above, of protecting the eye from ultraviolet light, around 320 nm, that is transmitted by a Q-CHANGE photochromic lens. It should be understood that "lens" as used herein refers to any piece of transparent material that is used for eyeglasses or for other optical equipment, even if it is of uniform thickness and is not used to produce a refractive effect, such as a correction of nearsightedness or farsightedness and/or astigmatism, but only to filter out some light, for example in non-prescription sunglasses. Ideally, photochromic lenses will protect the eye from visible light between 400 and 530 nm, with less than 10% transmission throughout this range when the photochromic material is activated by sunlight, but will not be so dark that they are difficult to see through, either indoors or in sunlight. For example, the average transmission of the lens, between 400 and 700 nm, is optionally between 3% and 5%, or between 5% and 10%, or between 10% and 20%, or between 20% and 30%, or at least 30%, when exposed to sunlight at 1000 W/m$^2$, and the average transmission between 400 and 700 nm is optionally between 20% and 30%, or between 30% and 50%, or between 50% and 70%, or more than 70%, in indoor lighting conditions that do not activate the photochromic material. Providing some protection against light between 400 and 530 nm, even indoors, may be another goal for photochromic lenses, for example by keeping transmission in this range below 80% or 70% when the photochromic material is not activated.

Another potential advantage of reducing transmission between 400 and 530 nm, when the photochromic material is not activated, is that it will provide some protection to the eye during the initial period of exposure to sunlight, since the photochromic material typically requires about 30 seconds to become fully activated, after it is first exposed to sunlight. Such lenses will also provide some protection to a wearer who is exposed to sunlight behind a glass window, such as the windshield of a car, because photochromic material will generally not become activated behind a glass window, which generally absorbs the ultraviolet wavelengths that activate photochromic materials, but generally does not absorb the wavelengths, between 400 and 530 nm, that can be harmful to diabetics.

In addition, photochromic lenses may be more commercially useful if they have a color, indoors, that is a normal color for sunglasses, such as brown, gray, green or blue-gray, and not purple, red, pink, or yellow. Yellow lenses, with low transmission of blue light, may be used in eyeglasses prescribed for certain medical conditions, but are sometimes disliked by patients because they may feel stigmatized by wearing eyeglasses with lenses of a color that is only used for treating certain medical conditions. Lenses that have a more normal color for sunglasses, but that still have the therapeutic effect of reducing transmission of blue light, may be better accepted by these patients.

These goals may be difficult or impossible to achieve in combination using photochromic lenses that do not have added nanoparticles, but the method of flowchart 1500 is designed to prepare photochromic lenses with added nanoparticles, for example gold nanoparticles, that may achieve one or more or all of these goals. The potential advantage of adding nanoparticles to photochromic lenses is similar to the potential advantage of adding nanoparticles to non-photochromic sunglasses, as described above for FIGS. 14A and 14B. In both cases, the nanoparticles provide additional absorption in the wavelength range, 400 to 530 nm, that is important for protecting the eyes of diabetics, but which is not always adequately filtered by conventional dyes used in photochromic or non-photochromic sunglasses.

At 1502, a photochromic lens material is selected. The tests done by the inventors have used three popular photochromic lens materials, Q-CHANGE, made by Zhenjiang CV Optics 2019, and TR-7 and Gen-8, both made by Transition. These materials have different transmission curves, as a function of wavelength, between 400 and 530 nm, when their photochromic dye is activated by sunlight, and as a result, they may have different optimal choices for the type and concentration of added nanoparticles, to bring the transmission in this range down to 10% or less, without making the overall transmission of visible light, either in sunlight or indoors, too low for a wearer of the lenses to see easily.

In the tests done by the inventors, for adding nanoparticles to photochromic lenses, only gold nanoparticles have been used, and those are the results that will be described here, although other types of nanoparticles, including silver nanoparticles and nanoparticles comprising both silver and gold, as described above, may also be useful for photochromic lenses.

At 1504, a preparation temperature is chosen for preparing nanoparticles, for example gold nanoparticles. The preparation temperature is the temperature maintained when the solvent is stirred together with the mixture of gold and/or silver compounds, or with the reducing agent, for an extended time before the reducing agent is combined with the gold and/or silver compounds to precipitate the nanoparticles, and well as the temperature maintained when the solvent, the gold and/or silver compounds, and the reducing agent are stirred together for an extended time while the nanoparticles are precipitating, as described above for 104 and 108 in FIG. 1B, or, in the case of silver nanoparticles, for 206 and 210 in FIG. 2. As will be described in FIG. 16, using different preparation temperatures results in nanoparticles with different optical absorption properties as a function of wavelength, and the choice of preparation temperature for the nanoparticles may depend on the photochromic lens material that is selected.

At 1506, the nanoparticles are precipitated from a solution of gold and/or silver compounds, a solvent, and a reducing agent, for example using any of the methods described above for FIG. 1B or for FIG. 2.

At 1508, the precipitated nanoparticles, optionally after one or more of settling under gravity, centrifuging, filtering, and dispersing in water, for example, as described above for FIGS. 1B and 2, are added to water, and/or another polar solvent, such as an alcohol or acetone, for diffusing into a photochromic lens.

At 1510, a photochromic lens, of the selected lens material, is placed into the water, or other solvent, with the nanoparticles, at a selected diffusion temperature, for a selected diffusion period, causing the nanoparticles to diffuse into the lens, for example using the method described for FIG. 7. Optionally, the lens first receives a surface treatment, for example as described above for FIG. 5. Optionally, the diffusion takes place under a pressure above atmospheric pressure, for example in a pressure cooker, which allows the diffusion temperature to be greater than 100° C., as described above for FIGS. 3 and 4. The concentration of nanoparticles that ends up in the photochromic lens may depend on one or more of the concentration of nanoparticles in the water, the diffusion temperature, the surface treatment of the lens, if any, and the diffusion period. These parameters are optionally selected to achieve a desired concentration of nanoparticles in the lens, that will produce a transmission curve, as a function of wavelength, for the lens, that will give it the potentially advantageous properties that are described above for a photochromic lens, depending on the lens material and the properties of the nanoparticles. The parameters are also optionally selected to improve the production process, for example to shorten the diffusion period by using a higher diffusion temperature and/or by using surface treatment of the lens.

Optionally, only the back of the lens, the side that will be facing the eye of the person wearing the lens, is in contact with the water containing the nanoparticles, during the diffusion process. For example, the front of the lens is covered with a waterproof covering when it is immersed in the water with the nanoparticles, or the water is shallow and the front of the lens is above the top of the water. This has the potential advantage that the nanoparticles that enter the lens will be concentrated at the back of the lens, and will not block the photochromic material in the lens from absorbing the ultraviolet light that activates the dye, when the wearer is in sunlight, or at least will not block the photochromic material very much, even if the photochromic material is mixed into the bulk of the lens, as in Q-CHANGE lenses. But the nanoparticles will protect the wearer's eyes from the ultraviolet light in the sunlight. Limiting the nanoparticles to a thin layer at the back of the lens may be less important if the photochromic material is coated as a thin layer at the front surface of the lens, as in TR-7 and Gen-8 lenses. It may also be less important if there is a relatively low concentration of nanoparticles, as in the case of Gen-8 lenses described below.

Alternatively, instead of placing the photochromic lens into the water, with the nanoparticles, when the lens already incorporates the photochromic material, photochromic material is incorporated into the lens only after diffusing the nanoparticles into the lens, for example by coating the photochromic material onto the surface of the lens.

At 1512, at the end of the diffusion period, the photochromic lens, with the concentration of nanoparticles achieved by the diffusion, is removed from the water.

FIG. 16 shows a plot 1600 of the absorbance of light as a function of wavelength, for gold nanoparticles prepared using different preparation temperatures. The wavelength, from 350 nm to 800 nm, is shown on horizontal axis 1602, and the absorbance, in arbitrary units, is shown on vertical axis 1604. Curve 1606 shows the absorbance as a function of wavelength for gold nanoparticles prepared at room temperature, 20° C. to 25° C. Curve 1608 shows the absorbance for gold nanoparticles prepared at 60° C. Curve 1610 shows the absorbance for gold nanoparticles prepared at 80° C. Curves 1612 and 1614 both show the absorbance for gold nanoparticles prepared at 100° C., but for curve 1612, as well as for curves 1606, 1608 and 1610, the $HAuCl_4 \cdot 3H_2O$ was first added to the solvent, ethylene glycol, and they were mixed together for 30 minutes at the preparation temperature, and then the reducing agent, aniline, was quickly added to the mixture, within 1 or 2 seconds. For curve 1614, the reducing agent, aniline, was first added to the solvent, ethylene glycol, and they were mixed together for 30 minutes at the preparation temperature, and the $HAuCl_4 \cdot 3H_2O$ was then added quickly to the mixture, within 1 or 2 seconds. For all the nanoparticles used for the curves in FIG.

16, 90 mg of HAuCl$_4$·3H$_2$O, 40 mL of ethylene glycol, and 0.3 mL of aniline were used, yielding 28 mg of gold nanoparticles, as described above for FIG. 1B. As noted in the description of FIG. 1B, the procedure used to produce the nanoparticles of curve 1612 may produce nanoparticles 50 nm in diameter, while the procedure used to produce the nanoparticles of curve 1614 may produce nanoparticles 20 nm in diameter, which may account for the difference in their absorption properties.

The effect of preparation temperature on the absorption properties of the gold nanoparticles plotted in FIG. 16 is mostly in the relative absorption for 500-550 nm and for 400-450 nm. For gold nanoparticles prepared at or below 60° C., the absorption is greater for 400-450 nm than for 500-550 nm. For nanoparticles prepared at or above 80° C., the absorption is greatest, aside from ultraviolet wavelengths below 370 nm, at about 550 nm, and there is a broad dip in absorption around 400 nm, with a greater absorbance for 500-550 nm than for 400-450 nm.

Which nanoparticle preparation temperature is selected may depend not only on what color lenses are desired, but also on how much light the photochromic material itself absorbs, between 400 and 530 nm, when it is activated by sunlight. As will be shown in FIGS. 17A-17C and 18A-18C, if the activated photochromic lens transmits much more than 10% of the light at some wavelengths between 400 and 530 nm, then a relatively large concentration of gold nanoparticles will be needed to bring the transmission down to 10% to less throughout that range of wavelengths. This is true of Q-CHANGE and TR-7 lenses, for example. But if the activated photochromic lens transmits at most only a little more than 10% of the light, at all wavelengths between 400 and 530 nm, then only a relatively small concentration of gold nanoparticles will be needed to bring the transmission down to 10% or less throughout this range of wavelengths. That is true of Gen-8 lenses, for example.

The choice of nanoparticle preparation temperature may potentially depend not only on the desired color of the lens, but also on whether a relatively large concentration or only a relatively small concentration of nanoparticles is used in the lens, because the color of the lens, in indoor lighting conditions when the photochromic dye is not activated, will in general depend on both the concentration of nanoparticles and on their absorbance profile, which depends on the preparation temperature. Examples of this are discussed in the description of FIGS. 17A-18C.

FIG. 17A schematically shows a plot 1700 of the transmission as a function of wavelength for photochromic lenses made of TR-7, in indoor lighting conditions, without embedded nanoparticles, and with two different kinds of embedded gold nanoparticles, prepared using different preparation temperatures. Horizontal axis 1702 shows the wavelength in nanometers, and vertical axis 1704 shows the transmission in percent. The transmission curves for photochromic lenses without embedded nanoparticles, shown in FIGS. 17A-18C, are the transmission curves measured for the photochromic lenses before the nanoparticles have been diffused into them. In some embodiments of the invention, the nanoparticles are diffused into the lens at least in part before photochromic material has been incorporated into the lens. In those cases, a transmission curve for the photochromic lens without embedded nanoparticles may be understood as the transmission curve for a photochromic lens of the same form, defined as a lens of the same shape and size and material, the same surface treatment if any, and with photochromic material incorporated into it by the same process, as the photochromic lens with embedded nanoparticles, but without nanoparticles diffused into it.

Curve 1706 shows the transmission for the TR-7 lens without added nanoparticles, which is nearly flat, at about 90%, for wavelengths above 430 nm, then falls rapidly almost to 0% between 430 and 390 nm. Curve 1708 shows the transmission for a TR-7 lens with a quantity of added gold nanoparticles prepared at room temperature, 20° C. to 25° C. The quantity of nanoparticles added was just enough to bring the transmission down to or below 10%, for all wavelengths between 400 and 530 nm, when the lens is exposed to sunlight at 1000 W/m$^2$, as shown by curve 1812 in FIG. 18B. Curve 1710 shows the transmission for a TR-7 lens with a quantity of added nanoparticles prepared at 100° C. The quantity added was the same as for curve 1708, and was also just enough to bring the transmission down to or below 10%, for all wavelengths between 400 and 530 nm, when the lens is exposed to sunlight at 1000 W/m$^2$. In both cases, the nanoparticles were prepared using twice the quantity of HAuCl$_4$·3H$_2$O, ethylene glycol, and aniline, as described for the method of FIG. 1B, first mixing the ethylene glycol and HAuCl$_4$·3H$_2$O at the precipitation temperature for 30 minutes, then adding the aniline quickly, yielding 56 mg of gold nanoparticles. The nanoparticles were diffused into the TR-7 lens using a pressure cooker at 1.9 atmospheres, which is 0.9 atmospheres above atmospheric pressure, so the temperature of the water was 118.6° C., and the diffusion time period was 45 minutes.

The appearance of the TR-7 lens, with indoor lighting conditions, is very different for curve 1708 (preparation temperature 20° C. to 25° C.) and curve 1710 (preparation temperature 100° C.). For curve 1710, the average transmission, weighted respectively by the wavelength dependent sensitivities of the red, green and blue cones of the human eye, is about 35% for the blue and green cones, and about 70% for the red cones. As expected from curve 1710, this lens has been found by the inventors to have a fairly saturated red color, for indoor lighting. For curve 1708, the average weighted transmission is about 35% for the blue cones, about 55% for the green cones, and about 75% for the red cones. This lens looks brown for indoor lighting and is lighter overall than the lens with curve 1708. Because there is not generally much consumer demand for sunglasses that are a deep red color, while brown is a standard color for sunglasses, the nanoparticles prepared at a relatively low temperature, such as 20° C. to 25° C., are likely to be preferred over nanoparticles prepared at a relatively high temperature, such as 100° C., for TR-7 lenses. The curves for Q-CHANGE lenses look similar to the curves for TR-7 lenses, and for Q-CHANGE lenses also, nanoparticles prepared at low temperature are likely to be preferred over nanoparticles prepared at high temperature, because they give the lens a more acceptable color, brown rather than red, in indoor lighting.

FIG. 17B schematically shows a plot 1712 for transmission as a function of wavelength, for a Gen-8 photochromic lens, with and without added gold nanoparticles, for indoor lighting conditions. The wavelength in nanometers is shown on horizontal axis 1702, and the transmission in percent is shown on vertical axis 1704. Curve 1714 shows the transmission for the Gen-8 lens without added nanoparticles, which is similar to curve 1706 for a TR-7 lens in FIG. 17A. Curve 1716 shows the transmission for the Gen-8 lens with added gold nanoparticles prepared at 80° C. The concentration of added nanoparticles is just enough to bring the transmission down to 10% or below, for all wavelengths between 400 and 530 nm, when the lens is exposed to sunlight at 800 W/m², as shown by curve 1818 of FIG. 18C. Because the transmission is no higher than 13%, in this range of wavelengths, for a Gen-8 lens without added nanoparticles, at 800 W/m² of sunlight, as shown by curve 1816 of FIG. 18C, even a relatively low concentration of added gold nanoparticles is enough to bring the transmission down to 10% or lower. The lens, for curve 1716 and for curve 1818, was prepared using only 28 mg of gold nanoparticles, prepared from 90 mg of HAuCl$_4$·3H$_2$O, 40 mL of ethylene glycol, and 0.3 mL of aniline, as described for FIG. 1B, using a pressure cooker at 1.9 atmospheres, with a diffusion time period of only 10 minutes, so the concentration of nanoparticles in the lens was several times lower than for curves 1708 and 1710 in FIG. 17A. The average transmissions, weighted by the wavelength sensitivity of the red, green and blue cones, are about 85% for the red cones, about 80% for the green cones, and about 75% for the blue cones, and the lens has a very light brown color, an acceptable color for tinted eyeglasses. The gold nanoparticles added to photochromic lenses serve the purpose of somewhat reducing exposure to light between 400 and 530 nm indoors, in addition to reducing transmission of these wavelengths to no more than 10% in sunlight. It may be desirable to reduce the transmission of these wavelengths to 75% or less indoors, but for curve 1716 in FIG. 17B, the transmission at 530 nm is only reduced to 82%. FIG. 17C shows a plot 1718 with transmission curves, for indoor lighting, for an alternative configuration for a Gen-8 photochromic lens, with enough gold nanoparticles to reduce the transmission to 75% or less between 400 and 530 nm. This lens was prepared like the lens for curve 1716 in FIG. 17B, but the diffusion time period was 20 minutes instead of 10 minutes, so it has a higher concentration of nanoparticles.

In plot 1718 of FIG. 17C, horizontal axis 1702 shows the wavelength in nanometers, and vertical axis 1704 shows the transmission in percent. Curve 1714, as in FIG. 17B, shows the transmission for the Gen-8 lens without added nanoparticles. Two curves show the transmission for added gold nanoparticles. Curve 1720 shows the transmission when the gold nanoparticles are prepared at 100° C., which makes them similar to the nanoparticles prepared at 80° C. used for curve 1716 in FIG. 17B, while curve 1722 of FIG. 17C shows the transmission when the gold nanoparticles are prepared at room temperature, 20° C. to 25° C. Curves 1720 and 1722 illustrate why, for Gen-8 lenses, in contrast to Q-CHANGE and TR-7 lenses, it may be advantageous to use nanoparticles prepared at higher temperatures, such as 80° C. or 100° C., rather than at lower temperatures, such as room temperature. The difference has to do with the much lower concentration of nanoparticles needed in Gen-8 lenses, in order to get the transmission below 10% in sunlight, for all wavelengths between 400 and 530 nm. For curve 1722, the average transmission weighted by the sensitivity of blue cones, green cones, and red cones of the human eye is about 35% for blue cones, about 70% for green cones, and about 80% for red cones, and the lens has a fairly saturated yellow color. For curve 1720, the average weighted transmissions are about 70% for blue cones, about 75% for green cones, and about 85% for red cones, and the lens has a light brown color. Since there is not much demand for yellow eyeglasses, but a brown tint is a standard color for tinted eyeglasses, nanoparticles prepared at 80° C. or 100° C. may be a better choice than nanoparticles prepared at room temperature, for Gen-8 lenses.

The inventors have found that typically, if bringing the transmission below 10% for 400-530 nm, in sunlight, requires using a high enough concentration of gold nanoparticles so that the average transmission at 450-550 nm, the range of sensitivity of the green cones, is less than 60% with indoor lighting, then a relatively low preparation temperature, 60° C. or less, may be the best choice to produce a brown color, rather than a red color. While if a lower concentration of gold nanoparticles is needed, so that the average transmission at 450-550 nm is more than 70% with indoor lighting, then a relatively high preparation temperature, 80° C. or higher, may be the best choice to produce a light brown color, rather than a yellow color.

FIGS. 18A, 18B and 18C show transmission curves respectively for Q-CHANGE, TR-7 and Gen-8 lenses, in sunlight, with and without added gold nanoparticles, where the added nanoparticles have a great enough concentration to just bring the transmission below 10% for all wavelengths between 400 and 530 nm. The nanoparticles were prepared using a preparation temperature of 20° C. to 25° C. for FIGS. 18A and 18B, and a precipitation temperature of 80° C. for FIG. 18C, since, as explained for FIGS. 17A and 17C, these are the nanoparticle preparation temperatures that produce acceptable colors, in indoor lighting, for these types of lenses, with these concentrations of added nanoparticles. For all of FIGS. 18A-18C, horizontal axis 1802 shows the wavelength in nanometers, and vertical axis 1804 shows the transmission in percent.

In plot 1800 of FIG. 18A, curve 1806 shows the transmission as a function of wavelength for a Q-CHANGE lens exposed to simulated sunlight at 1000 W/m². This lens by itself, without added nanoparticles, does not offer very good protection for diabetics, since, even in full sunlight, the transmission is above 10% for wavelengths of 410-450 nm and 490-530 nm, and is as high as 18% at 425 nm and at 530 nm. Curve 1808 shows the transmission with added gold nanoparticles, prepared according to the method described for curve 1708 of FIG. 17A, preparing 56 mg of gold nanoparticles, and diffusing them into the lens using a pressure cooker at 1.9 atmospheres, for a diffusion time period of 45 minutes. This rather large concentration of gold nanoparticles is enough to bring the transmission down to 10% at 530 nm, and below 10% for all other wavelengths down to 400 nm.

In plot 1810 of FIG. 18B, curve 1812 shows the transmission as a function of wavelength for a TR-7 lens exposed to simulated sunlight at 1000 W/m². Like the Q-CHANGE lens, the TR-7 lens by itself does not offer very good protection for diabetics, since, in full sunlight, the transmission is above 10% for wavelengths in the ranges of 410-430 nm and 460-530 nm, with transmission as high as 15% at 500 nm. Curve 1814 shows the transmission with added gold nanoparticles, prepared with the method described for curve 1708 of FIG. 17A, and having the same concentration of gold nanoparticles. This brings the transmission down to 10% at 500 nm, and below 10% at all other wavelengths in the range between 400 and 530 nm.

In plot 1816 of FIG. 18C, curve 1818 shows the transmission as a function of wavelength for a Gen-8 lens, exposed to simulated sunlight at 800 W/m², without added nanoparticles. The transmission is above 10% in the range 420-460 nm, with a peak of 12% at 440 nm. Only a relatively small concentration of gold nanoparticles, the same concentration used for curve 1716 in FIG. 17B, is enough to bring the transmission down to 10% at 440 nm, and below 10% at all other wavelengths between 400 and 530 nm, as shown by curve 1820. If a slightly higher concentration of gold nanoparticles is used, the concentration used for curve 1720 in FIG. 17C, then the peak transmission, in the range of 400 to 530 nm, would be only 9%, at 440 nm. It should be noted that at 1000 W/m² of sunlight, the transmission is less than or equal to 10% for all wavelengths between 400 and 530 nm even without adding any nanoparticles. But without any added nanoparticles, the Gen-8 lens, like the Q-CHANGE and TR-7 lenses, has a transmission of about 90% between 430 and 530 nm in indoor lighting conditions, offering little protection to diabetics.

All three photochromic lenses, the Q-CHANGE lens, the TR-7 lens and the Gen-8 lens, offer good protection to diabetics in sunlight with added nanoparticles, bringing the transmission down to 10% or lower throughout the range from 400 to 530 nm. The Q-CHANGE and TR-7 lenses with added nanoparticles also provide some protection to diabetics in indoor lighting, bringing the transmission below 60% at 530 nm, and even lower at shorter wavelengths down to 400 nm. However, these lenses, with added nanoparticles, may be too dark overall to be comfortable for many wearers indoors, especially in relatively dim light. The Gen-8 lens, with added nanoparticles, also provides transmission less than 10% from 400 to 530 nm in sunlight, and is not likely to be too dark in indoor lighting, even relatively dim lighting. However, it provides less protection to diabetics indoors, only bringing the transmission down to 75% or 82% at 530 nm, depending on the concentration of added nanoparticles. The best compromise may be the Gen-8 lens with a somewhat higher concentration of nanoparticles, which has transmission curve 1720 of FIG. 17C, and is not too dark indoors.

It should be noted that the added nanoparticles in photochromic lenses, as shown in FIGS. 17A-18C, not only help to protect the eyes from wavelengths in the range of 400 to 530 nm, but also reduce the average transmission over all visible wavelengths, which may be helpful for preventing cataracts in diabetics, according to a study of cataract formation in a rat model of diabetes, described in the paper by Andrawus et al cited above.

It is expected that during the life of a patent maturing from this application many relevant transparent plastics for eyeglasses lenses, and many relevant nanoparticles and tints for affecting the transmission curves of eyeglass lenses, will be developed and the scope of the terms transparent plastic, nanoparticle, and tint are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of preparing an optical element made of a transparent plastic with embedded nanoparticles, the method comprising:
   a) activating the surface of the optical element by attaching sulfate groups to the surface, comprising immersing the optical element in an aqueous solution of sulfuric acid for a period of time at a maintained activation temperature range; and
   b) exposing the activated surface to nanoparticles, and allowing the nanoparticles to diffuse into the optical element;
   wherein a concentration of the sulfuric acid solution, the maintained activation temperature range, and the period of time are selected to:
   i) activate the surface sufficiently to at least double a diffusion rate of the nanoparticles into the optical element compared to a diffusion rate of the nanoparticles into the optical element using a same protocol but without activating its surface; and ii) not cause visible damage to the optical quality of the optical element.

2. A method according to claim 1, wherein the maintained temperature range is entirely between 70 and 85 degrees C.

3. A method according to claim 1, wherein exposing the surface to the nanoparticles and allowing the nanoparticles to diffuse into the optical element comprises immersing the optical element in a solution of the nanoparticles in water for a time interval at a maintained diffusion temperature range.

4. A method according to claim 3, wherein immersing the optical element in a solution of the nanoparticles in water for a time interval at a maintained diffusion temperature range comprises maintaining the water at a temperature greater than 100° C. at a pressure greater than 1 atmosphere.

5. A method according to claim 3, wherein the optical element comprises a lens, and the solution of nanoparticles in water has a great enough concentration of nanoparticles, the maintained diffusion temperature range is great enough, and the time interval is long enough, so that enough nanoparticles diffuse into the lens, or become firmly bound to the lens, so that the nanoparticles absorb at least 10% of the energy of light passing through the lens for at least one wavelength between 400 and 700 nm.

6. A method according to claim 3, wherein the solution of nanoparticles in water has a concentration of between 0.3 mg and 200 mg of nanoparticles per liter of water, the maintained diffusion temperature range is entirely between 85 and 100 degrees C., and the time interval is between 10 minutes and 3 hours.

7. A method according to claim 1, also including washing the optical element after the nanoparticles diffuse into or firmly bind to it.

8. A method according to claim 1, wherein the nanoparticles comprise gold, silver, or both.

9. A method according to claim 1, wherein an average diameter of the nanoparticles is between 5 nm and 100 nm.

10. A method according to claim 1, wherein the nanoparticles are substantially spherical with a standard deviation in diameter less than 20%.

11. A method according to claim 1, also comprising tinting the optical element by immersing it in a heated aqueous solution of a selected tint, for a tinting time period.

12. A method according to claim 11, wherein tinting the optical element is done before or after diffusing the nanoparticles into the optical element.

13. A method according to claim 1, wherein the optical element comprises one or more of polycarbonate (PC), diethylene glycol bis (allyl carbonate), polystyrene (PS), acrylics or polymethyl methacrylate (PMMA), polyethylene terephthalate (PET), polyether ether ketone (PEEK), MR7, MR8, MR-174, and photochromic material.

14. A method according to claim 1, wherein the optical element comprises an eyeglass lens.

15. A method according to claim 1, wherein the optical element comprises a lens, the method comprising coloring the transparent plastic with an added tint or using a transparent plastic that is already colored with an added tint, wherein a concentration of the added tint is great enough to absorb at least 10% of energy of white light between 400 and 700 nm that passes through the lens, the light uniformly distributed over the lens area, and propagating in a direction normal to the lens front surface at its center, and a sufficient quantity of the nanoparticles diffuse into or firmly bind to the optical element to absorb at least 10% of energy of white light between 400 and 700 nm that passes through the lens, the light uniformly distributed over the lens area, and propagating in a direction normal to the lens front surface at its center.

16. A method according to claim 1, wherein the optical element is photochromic, and exposing the activated surface to nanoparticles and allowing the nanoparticles to diffuse into the optical element comprises:

a) placing water and nanoparticles into a container; and b) leaving the optical element in the container with the water and nanoparticles for a nanoparticle diffusion period while the nanoparticles diffuse into the optical element.

17. A method according to claim 1, wherein the optical element comprises a photochromic material, the nanoparticles are between 2 and 100 nm in diameter, and the nanoparticles, when they are diffused into the optical element, decrease its transmission of light for at least some visible wavelengths.

18. A method according to claim 1, wherein the nanoparticles comprise gold nanoparticles with a specified characteristic of absorbance as a function of wavelength, the method also comprising:

a) selecting a preparation temperature according to the specified characteristic of absorbance as a function of wavelength;

b) mixing a gold compound with a solvent; and c) causing the gold compound to reduce to metallic gold and precipitate as gold nanoparticles between 2 and 100 nm in diameter at the selected preparation temperature.

\* \* \* \* \*